US007437521B1

(12) United States Patent
Scott et al.

(10) Patent No.: US 7,437,521 B1
(45) Date of Patent: Oct. 14, 2008

(54) MULTISTREAM PROCESSING MEMORY-AND BARRIER-SYNCHRONIZATION METHOD AND APPARATUS

(75) Inventors: Steven L. Scott, Eau Claire, WI (US); Gregory J. Faanes, Eau Claire, WI (US); Brick Stephenson, Chippewa Falls, WI (US); William T. Moore, Jr., Elk Mound, WI (US); James R. Kohn, Inver Grove Heights, MN (US)

(73) Assignee: Cray Inc., Seattle, WA (US)

( * ) Notice: Subject to any disclaimer, the term of this patent is extended or adjusted under 35 U.S.C. 154(b) by 899 days.

(21) Appl. No.: 10/643,741

(22) Filed: Aug. 18, 2003

(51) Int. Cl.
*G06F 12/00* (2006.01)
*G06F 9/52* (2006.01)

(52) U.S. Cl. ........................ 711/151; 711/154; 711/158; 712/3; 712/40; 712/225

(58) Field of Classification Search .............. 711/151, 711/154, 158; 712/3, 40, 225
See application file for complete search history.

(56) References Cited

U.S. PATENT DOCUMENTS

| | | | |
|---|---|---|---|
| RE28,577 E | 10/1975 | Schmidt | 179/15 BA |
| 4,412,303 A * | 10/1983 | Barnes et al. | 712/16 |
| 4,541,046 A | 9/1985 | Nagashima et al. | |
| 4,771,391 A | 9/1988 | Blasbalg | 364/514 |
| 4,868,818 A | 9/1989 | Madan et al. | 371/11 |
| 4,888,679 A | 12/1989 | Fossum et al. | |
| 4,933,933 A | 6/1990 | Dally et al. | 370/60 |
| 4,989,131 A * | 1/1991 | Stone | 712/203 |
| 5,008,882 A | 4/1991 | Peterson et al. | 370/943 |
| 5,031,211 A | 7/1991 | Nagai et al. | 379/221 |
| 5,036,459 A | 7/1991 | Den Haan et al. | 364/200 |
| 5,068,851 A | 11/1991 | Bruckert et al. | |
| 5,105,424 A | 4/1992 | Flaig et al. | 370/941 |

(Continued)

FOREIGN PATENT DOCUMENTS

EP 0353819 A2 2/1990

(Continued)

OTHER PUBLICATIONS

"Deadlock-Free Routing Schemes on Multistage Interconnection Networks", *IBM Technical Disclosure Bulletin*, 35, (Dec. 1992),232-233.

(Continued)

*Primary Examiner*—Sanjiv Shah
*Assistant Examiner*—Arpan Savla
(74) *Attorney, Agent, or Firm*—Schwegman, Lundberg & Woessner, P.A.

(57) ABSTRACT

A method and apparatus to provide specifiable ordering between and among vector and scalar operations within a single streaming processor (SSP) via a local synchronization (Lsync) instruction that operates within a relaxed memory consistency model. Various aspects of that relaxed memory consistency model are described. Further, a combined memory synchronization and barrier synchronization (Msync) for a multistreaming processor (MSP) system is described. Also, a global synchronization (Gsync) instruction provides synchronization even outside a single MSP system is described. Advantageously, the pipeline or queue of pending memory requests does not need to be drained before the synchronization operation, nor is it required to refrain from determining addresses for and inserting subsequent memory accesses into the pipeline.

11 Claims, 12 Drawing Sheets

U.S. PATENT DOCUMENTS

| | | | |
|---|---|---|---|
| 5,157,692 A | 10/1992 | Horie et al. | 375/38 |
| 5,161,156 A | 11/1992 | Baum et al. | 371/7 |
| 5,170,482 A | 12/1992 | Shu et al. | 395/800 |
| 5,175,733 A | 12/1992 | Nugent | 370/94 |
| 5,197,130 A | 3/1993 | Chen et al. | |
| 5,218,601 A | 6/1993 | Chujo et al. | 370/16 |
| 5,218,676 A | 6/1993 | Ben-ayed et al. | 395/200 |
| 5,239,545 A | 8/1993 | Buchholz | 370/95.3 |
| 5,247,635 A * | 9/1993 | Kamiya | 711/3 |
| 5,247,691 A * | 9/1993 | Sakai | 712/3 |
| 5,276,899 A | 1/1994 | Neches | 395/800 |
| 5,280,474 A | 1/1994 | Nickolls et al. | 370/60 |
| 5,313,628 A | 5/1994 | Mendelsohn et al. | 395/575 |
| 5,313,645 A | 5/1994 | Rolfe | 395/800 |
| 5,331,631 A | 7/1994 | Teraslinna | 370/60 |
| 5,333,279 A | 7/1994 | Dunning | 395/325 |
| 5,341,504 A | 8/1994 | Mori et al. | 395/800 |
| 5,347,450 A | 9/1994 | Nugent | 395/200 |
| 5,353,283 A | 10/1994 | Tsuchiya | 370/60 |
| 5,365,228 A | 11/1994 | Childs et al. | 340/825.8 |
| 5,375,223 A | 12/1994 | Meyers et al. | |
| 5,418,916 A | 5/1995 | Hall et al. | |
| 5,430,850 A | 7/1995 | Papadopoulos et al. | |
| 5,430,884 A | 7/1995 | Beard et al. | |
| 5,434,995 A | 7/1995 | Oberlin et al. | 395/550 |
| 5,440,547 A | 8/1995 | Easki et al. | 370/60 |
| 5,446,915 A | 8/1995 | Pierce | |
| 5,517,497 A | 5/1996 | LeBoudec et al. | 370/60.1 |
| 5,530,933 A | 6/1996 | Frink et al. | |
| 5,546,549 A | 8/1996 | Barrett et al. | 395/309 |
| 5,548,639 A | 8/1996 | Ogura et al. | 379/221 |
| 5,550,589 A | 8/1996 | Shiojiri et al. | 348/387 |
| 5,555,542 A | 9/1996 | Ogura et al. | 370/94.1 |
| 5,560,029 A | 9/1996 | Papadopoulos et al. | |
| 5,640,524 A | 6/1997 | Beard et al. | |
| 5,649,141 A | 7/1997 | Yamazaki | |
| 5,684,977 A * | 11/1997 | Van Loo et al. | 711/143 |
| 5,717,895 A * | 2/1998 | Leedom et al. | 711/140 |
| 5,721,921 A | 2/1998 | Kessler et al. | |
| 5,765,009 A | 6/1998 | Ishizaka | |
| 5,787,494 A | 7/1998 | Delano et al. | |
| 5,796,980 A | 8/1998 | Bowles | |
| 5,835,951 A | 11/1998 | McMahan | |
| 5,860,146 A | 1/1999 | Vishin et al. | |
| 5,897,664 A | 4/1999 | Nesheim et al. | |
| 5,987,571 A | 11/1999 | Shibata et al. | |
| 6,003,123 A | 12/1999 | Carter et al. | |
| 6,014,728 A | 1/2000 | Baror | |
| 6,088,701 A | 7/2000 | Whaley et al. | |
| 6,101,590 A | 8/2000 | Hansen | |
| 6,105,113 A | 8/2000 | Schimmel | |
| 6,161,208 A | 12/2000 | Dutton et al. | |
| 6,308,316 B1 | 10/2001 | Hashimoto et al. | |
| 6,317,819 B1 * | 11/2001 | Morton | 712/22 |
| 6,339,813 B1 | 1/2002 | Smith, et al. | |
| 6,356,983 B1 | 3/2002 | Parks | |
| 6,430,649 B1 * | 8/2002 | Chaudhry et al. | 711/100 |
| 6,490,671 B1 | 12/2002 | Frank et al. | |
| 6,496,902 B1 | 12/2002 | Faanes et al. | |
| 6,496,925 B1 * | 12/2002 | Rodgers et al. | 712/244 |
| 6,519,685 B1 | 2/2003 | Chang | |
| 6,591,345 B1 | 7/2003 | Seznec | |
| 6,665,774 B2 * | 12/2003 | Faanes et al. | 711/118 |
| 6,684,305 B1 | 1/2004 | Deneau | |
| 6,782,468 B1 | 8/2004 | Nakazato | |
| 6,816,960 B2 * | 11/2004 | Koyanagi | 712/4 |
| 6,922,766 B2 | 7/2005 | Scott | |
| 6,925,547 B2 | 8/2005 | Scott et al. | |
| 6,976,155 B2 | 12/2005 | Drysdale et al. | |
| 7,028,143 B2 | 4/2006 | Barlow et al. | |
| 7,334,110 B1 | 2/2008 | Faanes, et al. | |
| 7,366,873 B1 | 4/2008 | Kohn | |
| 2002/0116600 A1 * | 8/2002 | Smith et al. | 712/218 |
| 2002/0169938 A1 | 11/2002 | Scott et al. | |
| 2002/0172199 A1 | 11/2002 | Scott et al. | |
| 2003/0005380 A1 | 1/2003 | Nguyen et al. | |
| 2003/0097531 A1 | 5/2003 | Arimilli, et al. | |
| 2003/0167383 A1 | 9/2003 | Gupta et al. | |
| 2005/0044128 A1 | 2/2005 | Scott et al. | |
| 2005/0044339 A1 | 2/2005 | Sheets | |
| 2005/0044340 A1 | 2/2005 | Sheets et al. | |
| 2007/0283127 A1 | 12/2007 | Kohn, et al. | |

FOREIGN PATENT DOCUMENTS

| | | |
|---|---|---|
| EP | 0473452 A2 | 3/1992 |
| EP | 0475282 A2 | 3/1992 |
| EP | 0501524 A2 | 9/1992 |
| EP | 0570729 A2 | 11/1993 |
| WO | WO-87/01750 A1 | 3/1987 |
| WO | WO-88/08652 A1 | 11/1988 |
| WO | WO-95/16236 A1 | 6/1995 |
| WO | WO-96/10283 A1 | 4/1996 |
| WO | WO-96/32681 A1 | 10/1996 |

OTHER PUBLICATIONS

Adve, V. S., et al., "Performance Analysis of Mesh Interconnection Networks with Deterministic Routing", *Transactions on Parallel and Distributed Systems*, (Mar. 1994),225-246.

Bolding, Kevin, "Non-Uniformities Introduced by Virtual Channel Deadlock Prevention", *Technical Report 92-07-07, Department of Computer Science and Engineering, FR-35 University of Washington*; Seattle, WA 98195 (Jul. 21, 1992).

Bolla, F R., "A Neural Strategy for Optimal Multiplexing of Circuit and Packet-Switched Traffic", *Department of Communications, Computer and Systems Science (DIST), University of Genova*, 1324-1330.

Boura, Y M., et al., "Efficient Fully Adaptive Wormhole Routing in n-dimenstional Meshes", *IEEE*, (1994),589-596.

Bundy, A., et al., "Turning Eureka Stepsinto Calculations in Automatic Program", *UK IT, (IEE Conf. Pub. 316)*, (1991),221-226.

Chien, A. A., et al., "Planar-Adaptive Routing: Low-Cost Adaptive Networks for Multiprocessors", *Pro. 19th International. Symposium on Computer Architecture*, (May 1992),268-277.

Dally, W. J., et al., "Deadlock-Free Adaptive Routing in Multicomputer Networks Using Virtual Channels", *I.E.E.E. Transactions on Parallel and Distributed Systems*, 4(4), (Apr. 1993),466-475.

Dally, William, et al., "Deadlock-Free Message Routing in Multiprocessor Interconnection Networks", *IEEE Transactions on Computers, C-36*, (May 1987),547-553.

Dally, William, "Performance Analysis of k-ary n-cube Interconnection Networks", *IEEE Transactions on Computers*, 39(6), (Jun. 1990),775-785.

Dally, W. J., "Virtual Channel Flow Control", *Pro. 17th International Symposium on Computer Architecture*, pp. 60-68, May 1990.

Duato, J., "A New Theory of Deadlock-Free Adaptive Routing in Wormhole Networks", *I.E.E.E. Transactions on Parallel and Distributed Systems*, 4(12), (Dec. 1993),1320-1331.

Faanes, G. J., et al., "Decoupled Vector Architecture", U.S. Appl. No. 10/643,586, filed Aug. 18, 2003, 47 Pages.

Gallager, Robert, "Scale Factors for Distributed Routing Algorithm",*NTC '77 Conference Record*, 2, at 2-1 through 2-5.

Gharachorloo, Kourosh, "Two Techniques to Enhance the Performance of Memory Consistency Models", (1991).

Glass, C. J., et al., "The Turn Model for Adaptive Routing", *Pro. 19th International Symposium on Computer architecture*, (May 1992),278-287.

Gravano, L, et al., "Adaptive Deadlock- and Livelock-Free Routing with all Minimal Paths in Torus Networks", *IEEE Transactions on Parallel and Distributed Systems*, 5(12), (Dec. 1994),1233-1251.

Gupta, Rajiv, et al., "High speed Synchronization of Processors Using Fuzzy Barriers", *International Journakl of Parallel Programming* Feb. 19, 1990, No. 1, New York, US pp. 53-73.

Ishihata, Hiroaki, et al., "Architecture of Highly Parallel AP1000 Computer", *Scripta Technica, Inc.*, Systems and Computers in Japan 24, No. 7,,(1993),pp. 69-76.

Jesshope, C. R., et al., "High Performance Communications in Processor Networks", *Proc. 16th International Symposium on Computer Architecture*, (May 1989),pp. 150-157.

Kirkpatrick, S., et al., "Optimization by Simulated Annealing", *Science*, May 13, 1993, 220(4599), (May 1983),671-680.

Linder, Daniel H., et al., "An Adaptive and Fault Tolerant Wormhole Routing Strategy for K-ary N-cubes", *IEEE Transactions on Computers*,40(1), (1991),pp. 2-12.

Lui, Z, et al., "Grouping Virtual Channels for Deadlock-Free Adaptive Wormhole Routing", *PARLE '93 Parallel Parallel Architectures and Languages Europe, 5th International PARLE Conference*, Munich, Germany\, (Jun. 14-17, 1993),254-265.

Nuth, Peter, et al., "The J-Machine Network", *IEEE*, (1992),pp. 420-423.

O'Keefe, Matthew T., et al., "Static Barrier MIMD: Architecture and Performance Analysis", *Journal of Parallel and Distributed Computing* No. 2., (Mar. 25, 1995),pp. 126-132.

Scott, S. L., "Decoupled Store Address and Data in a Multiprocessor System", U.S. Appl. No. 10/643,742, filed Aug. 18, 2003, 27 Pages.

Scott, S. L., "Latency Tolerant Distributed Shared Memory Multiprocessor Computer", U.S. Appl. No. 10/643,585, filed Aug. 18, 2003, 17 Pages.

Scott, S. L., et al., "Relaxed Memory Consistency Model", U.S. Appl. No. 10/643,754, filed Aug. 18, 2003, 144 Pages.

Sheets, K., et al., "Remote-Translation Mechanism for a Multinode System", U.S. Appl. No. 10/643,758, filed Aug. 18, 2003, 42 Pages.

Shumay, M, "Deadlock-Free Packet Networks", *Transputer Research and Applications 2, NATUG-2 Proceedings of the Second Conference of the North American Transputer Users Group*, (Oct. 18-19, 1989),140-177.

Snyder, L., "Introduction to the Configurable, Highly Parallel Computer", *IEEE*, (Jan. 1982),pp. 47-56.

Talia, D., "Message-Routing Systems for Transputer-Based Multicomputer", *IEEE Micro*, vol. 13, No. 3, XP000380340, (Jun. 1993),62-72.

Wang, Weilin, et al., "Trunk Congestion Control in Heterogeneous Circuit Switched Networks", *IEEE*, (Jul. 1992),pp. 1156-1161.

Wu, Min-You, et al., "Do and Forall: Temporal and Spacial Control Structures", *Proceedings, Third Workshop on Compilers for Parallel Computers, ACPC/TR*, Jul. 1992.

Yang, C. S., et al., "Performance Evaluation of Multicast Wormhole Routing in 2D-Torus Multicomputers", *IEEE*, (1992),173-178.

Yantchev, J., et al., "Adoptive, low latency, deadlock-free packet routing for networks of processors\", *IEEE Proceedings*, 136, (May 1989),pp. 178-186.

"Cray Assembly Language (CAL) for Cray X1™ Systems Reference Manual", *Section 2.6, Memory Ordering*, http://docs.cray.com/books/S-2314-51/index.html, (Jun. 2003), 302 pgs.

"ECPE 4504: Computer Organization Lecture 12: Computer Arithmetic", *The Bradley Department of Electrical Engineering*, (Oct. 17, 2000), 12 pgs.

Abts, D, "So Many States, So Little Time: Verifying Memory Coherence in the Cray X1", *Parallel and Distributed Processing Symposium*, (Apr. 22, 2003), 11-20.

Carlile, Bradley R., "Algorithms and Design: The Cray APP Shared-Memory System", *COMPCON Spring '93. Digest of Papers.*, (Feb. 22, 1993), 312-320.

Chen, Y., et al., "UTLB: A Mechanism for Address Translation on Network Interfaces", *Proceedings of the Eighth International Conference on Architectural Support for Programming Languages and Operating Systems (ASPLOS)*, (1998), 193-204.

Ernst, D., et al., "Cyclone: A Broadcast-Free Dynamic Instruction Scheduler with Selective Replay", *30th Annual International Symposium on Computer Architecture (ISCA-2003)*, (Jun. 2003), 10 pgs.

Kontothanassis, L., et al., "VM-Based Shared Memory on Low-Latency, Remote-Memory-Access Networks", *Proceedings of the ACM ISCA '97*, (1997), 157-169.

Patterson, David A., et al., *Computer Architecture: A Quantitative Approach*, Second Edition, Morgan Kaufmann Publishers, Inc., San Francisco, CA,(1996), 39-41.

Patterson, David A., et al., *Computer Architecture: A Quantitative Approach*, 2nd Edition, Morgan Kaufmann Publishers, Inc., San Francisco, CA,(1996), 179-187, 373-384.

Scott, S., "Synchronization and Communication in the T3E Multiprocessor", *ASPLOS*, vol. II, (1996),pp. 26-36.

Wood, D. A., et al., "An In-Cache Address Translation Mechanism", *Proceedings of the 13th Annual International Symposium on Computer Architecture*, (1986), 358-365.

Patterson, D. A., et al., *Computer Architecture A Quantitative Approach*, 2nd Edition, Morgan Kaufmann Publishers, Inc., San Francisco,CA (1996), 255-260 & 308-317.

Patterson, D. A., et al., *Computer Architecture: A Quantitative Approach*, 2nd Edition, Morgan Kaufmann Publishers, San Francisco, CA (1996), 241-243.

Patterson, D., et al., *Computer Architecture: A Quantitative Approach*, Second Edition, Morgan Kaufmann Publishers Inc. (1996), 251-256.

"Msync—Synchronise Memory with Physical Storage", *The Single UNIX Â?Â® Specification, Version 2: Msync, The Open Group*, http://www.opengroup.org/nlinepubs/ 007908799/xsh/msync.html, (1997), 3 pgs.

Cohoon, J., et al., *C++ Program Design*, 2nd Edition, McGraw-Hill Companies, Inc., (1999), p. 493.

Patterson, D. A., et al., *Computer Architecture: A Quantitative Approach*, 2nd Edition, Morgan Kaufmann Publishers, Inc., San Francisco, CA, (1996), 699-708.

Patterson, D. A., et al., *Computer Architecture: A Quantitative Approach*, 2nd Edition, Morgan Kaufmann Publishers, Inc., San Francisco, CA, (1996), 194-197.

U.S. Appl. No. 10/235,898 Non Final Office Action mailed Jul. 7, 2004, 12 pgs.

U.S. Appl. No. 10/235,898 Notice of Allowance mailed Mar. 15, 2005, 4 pgs.

U.S. Appl. No. 10/235,898 Response filed Jan. 6, 2005 to Non Final Office Action mailed Jul. 7, 2004, 16 pgs.

U.S. Appl. No. 10/643,574, Non-Final Office Action Mailed Aug. 7, 2007, 31 pgs.

U.S. Appl. No. 10/643,574, Advisory Action mailed May 21, 2007, 3 pgs.

U.S. Appl. No. 10/643,574, Final Office Action mailed Mar. 5, 2007, 31 pgs.

U.S. Appl. No. 10/643,574, Non-Final Office Action mailed Jan. 30, 2006, 33 pgs.

U.S. Appl. No. 10/643,574, Non-Final Office Action mailed Jul. 28, 2006, 30 pgs.

U.S. Appl. No. 10/643,574, RCE and Response Under 37 C.F.R. 1.116 filed Jul. 12, 2007 to Final Office Action mailed Mar. 5, 2007, 19 pgs.

U.S. Appl. No. 10/643,574, Response filed Nov. 28, 2006 to Non-Final Office mailed Jul. 28, 2006, 15 pgs.

U.S. Appl. No. 10/643,574, Response filed May 1, 2006 to Non-Final Office Action mailed Jan. 30, 2006, 29 pgs.

U.S. Appl. No. 10/643,574, Response filed May 4, 2007 to Final Office Action mailed Mar. 5, 2007, 15 pgs.

U.S. Appl. No. 10/643,585, Advisory Action mailed Apr. 2, 2007, 3 pgs.

U.S. Appl. No. 10/643,585, Advisory Action mailed Aug. 14, 2006, 3 pgs.

U.S. Appl. No. 10/643,585, Amendment and Response filed Dec. 4, 2006 to Office Action mailed Oct. 23, 2006, 17 pgs.

U.S. Appl. No. 10/643,585, Amendment and Response filed Mar. 22, 2007 to Final Office Action mailed Jan. 25, 2007, 23 pgs.

U.S. Appl. No. 10/643,585, Amendment and Response filed Mar. 27, 2006 to Non-Final Office Action mailed Sep. 26, 2005, 7 pgs.

U.S. Appl. No. 10/643,585, Amendment and Response filed Aug. 3, 2006 to Final Office Action mailed Apr. 14, 2006, 9 pgs.

U.S. Appl. No. 10/643,585, Final Office Action mailed Jan. 25, 2007, 17 pgs.

U.S. Appl. No. 10/643,585, Final Office Action mailed Apr. 14, 2006, 13 pgs.

U.S. Appl. No. 10/643,585, Non-Final Office Action mailed Oct. 23, 2006, 12 pgs.

U.S. Appl. No. 10/643,585, Non-Final Office Action mailed Sep. 26, 2005, 9 pgs.
U.S. Appl. No. 10/643,585, Notice of Allowance mailed Jun. 11, 2007, 6 pgs.
U.S. Appl. No. 10/643,585, RCE and Amendment and Response filed Apr. 23, 2007 to Final Office Action mailed Jan. 25, 2007 and the Advisory Action mailed Apr. 2, 2007, 15 pgs.
U.S. Appl. No. 10/643,585, Response to Rule 312 Communication mailed Jul. 23, 2007, 2 pgs.
U.S. Appl. No. 10/643,586, Notice of Allowance mailed Oct. 23, 2007, 5 pgs.
U.S. Appl. No. 10/643,586, Advisory Action mailed Jan. 18, 2007, 3 pgs.
U.S. Appl. No. 10/643,586, Final Office Action mailed Oct. 19, 2006, 27 pgs.
U.S. Appl. No. 10/643,586, Non-Final Office Action mailed Feb. 8, 2006, 21 pgs.
U.S. Appl. No. 10/643,586, Non-Final Office Action mailed May 2, 2007, 36 pgs.
U.S. Appl. No. 10/643,586, RCE and Amendment and Response filed Feb. 16, 2007 to Final Office Action mailed Oct. 19, 2006 and the Advisory Action mailed Jan. 18, 2007, 19 pgs.
U.S. Appl. No. 10/643,586, Response filed Jan. 5, 2007 to Final Office Action mailed Oct. 19, 2006, 22 pgs.
U.S. App. No. 10/643,586, Response filed Aug. 1, 2006 to Non-Final Office Action mailed Feb. 8, 2006, 24 pgs.
U.S. Appl. No. 10/643,586 Response to Non-Final Office Action filed Sep. 4, 2007, 18 pgs.
U.S. Appl. No. 10/643,727, Non-Final Office Action mailed Feb. 16, 2006, 33 pgs.
U.S. Appl. No. 10/643,727, Non-Final Office Action mailed Aug. 11, 2006, 29 pgs.
U.S. Appl. No. 10/643,727, Notice of Allowance mailed Feb. 28, 2007, 5 pgs.
U.S. Appl. No. 10/643,727, Notice of Allowance mailed Jul. 19, 2007, 5 pgs.
U.S. Appl. No. 10/643,727, Response filed Jan. 11, 2007 to Non-Final Office Action mailed Aug. 11, 2006, 15 pgs.
U.S. Appl. No. 10/643,727, Response filed Jun. 15, 2006 to Non-Final Office Action mailed Feb. 16, 2006, 21 pgs.
U.S. Appl. No. 10/643,738 Response filed Jan. 16, 2006 non-final office action mailed Sep. 26, 2005, 13 pgs.
U.S. Appl. No. 10/643,738 Response filed Jul. 19, 2006 non-final office action mailed Feb. 17, 2006, 10 pgs.
U.S. Appl. No. 10/643,738, Final Office Action mailed Apr. 17, 2007, 12 pgs.
U.S. Appl. No. 10/643,738, Non-Final Office Action mailed Nov. 1, 2007, 19 pgs.
U.S. Appl. No. 10/643,738, Non-Final Office Action mailed Feb. 17, 2006, 9 PGS.
U.S. Appl. No. 10/643,738, Non-Final Office Action mailed Sep. 26, 2005, 11 pgs.
U.S. Appl. No. 10/643,738, Response filed Jul. 17, 2007 final office action mailed Apr. 17, 2007, 17 pgs.
U.S. Appl. No. 10/643,742, Non-Final Office Action mailed Jun. 4, 2007, 13 pgs.
U.S. Appl. No. 10/643,742, Response filed Oct. 11, 2007 to Non-final Office Action mailed Jun. 4, 2007, 18 pages.
U.S. Appl. No. 10/643,754, Advisory Action mailed Nov. 22, 2006, 3 pgs.
U.S. Appl. No. 10/643,754, Final Office action mailed Sep. 14, 2006, 21 pgs.
U.S. Appl. No. 10/643,754, Non-Final Office Action mailed Feb. 8, 2006, 16 pgs.
U.S. Appl. No. 10/643,754, Non-Final Office Action mailed Jul. 5, 2007, 23 pgs.
U.S. Appl. No. 10/643,754, Response filed Nov. 7, 2006 to Final Office Action mailed Sep. 14, 2006, 12 pgs.
U.S. Appl. No. 10/643,754, Response filed Mar. 30, 2007 to Advisory Action mailed Nov. 22, 2006, 10 pgs.
U.S. Appl. No. 10/643,754, Response filed Jul. 10, 2006 to Non-Final Office Action mailed Feb. 8, 2006, 12 pgs.
U.S. Appl. No. 10/643,754, Amendment & Response filed Oct. 9, 2007 to Non-final OA mailed Jul. 5, 2007, 14 pages.
U.S. Appl. No. 10/643,758 Notice of Allowance mailed Oct. 19, 2007, 4 pgs.
U.S. Appl. No. 10/643,758, Notice of Allowance mailed Jul. 19, 2007, 4 pgs.
U.S. Appl. No. 10/643,758, Advisory Action mailed May 1, 2007, 3 pgs.
U.S. Appl. No. 10/643,758, Amendment and Response filed Jul. 10, 2006 to Final Office Action Mar. 10, 2006, 9 pgs.
U.S. Appl. No. 10/643,758, Final Office Action mailed Feb. 6, 2007, 23 pgs.
U.S. Appl. No. 10/643,758, Final Office Action mailed Mar. 10, 2006, 13 pgs.
U.S. Appl. No. 10/643,758, Non-Final Office Action mailed Aug. 15, 2006, 15 pgs.
U.S. Appl. No. 10/643,758, Non-Final Office Action mailed Aug. 30, 2005, 8 pgs.
U.S. Appl. No. 10/643,758, Response filed Jan. 30, 2006 to Non-Final Office Action mailed Aug. 30, 2005, 9 pgs.
U.S. Appl. No. 10/643,758, Response filed Dec. 14, 2006 to Non-Final Office Action mailed Aug. 15, 2006, 17 pgs.
U.S. Appl. No. 10/643,758, Response filed Apr. 17, 2007 to Final Office Action mailed Feb. 6, 2007, 25 pgs.
U.S. Appl. No. 10/643,574, Response filed Nov. 7, 2007 to Non-final Office Action mailed Aug. 7, 2007, 15 pages.
U.S. Appl. No. 10/643,574, Notice of Allowance mailed Dec. 05, 2007, NOAR, 5 pgs.
U.S. Appl. No. 10/643,574, Response filed Jul. 12, 2007 to Advisory Action mailed Mar. 5, 2007, 16 pgs.
U.S. Appl. No. 10/643,577, Non-Final Office Action mailed Mar. 20, 2006, 13 pgs.
U.S. Appl. No. 10/643,577, Response filed Jan. 23, 2008 to Non-Final Office Action mailed Jul. 27, 2007, 18 pgs.
U.S. Appl. No. 10/643,577, Response filed May 2, 2007 to Final Office Action mailed Nov. 2, 2007, 12 pgs.
U.S. Appl. No. 10/643,577, Response filed Aug. 21, 2006 to Non-Final Office Action mailed Mar. 20, 2006, 14 pgs.
U.S. Appl. No. 10/643,585, Notice of Allowance mailed Dec. 11, 2007, NOAR, 6 pgs.
U.S. Appl. No. 10/643,585, Notice of Allowance mailed Apr. 08, 2008, NOAR, 2 pgs.
U.S. Appl. No. 10/643,586,Response filed Feb. 16, 2007 to advisory Action mailed Oct. 19, 2006, 18 pgs.
U.S. Appl. No. 10/643,727, Notice of Allowance mailed Apr. 28, 2008, NOAR, 8.
U.S. Appl. No. 10/643,727, Notice of Allowance mailed Nov. 27, 2007, NOAR, 5 pgs.
U.S. Appl. No. 10/643,742 Non-Final Office Action mailed Apr. 09, 2008, OARN, 16 pgs.
U.S. Appl. No. 10/643,742, Notice of ALlowance Mailed Nov. 7, 2007, 5 pgs.
U.S. Appl. No. 10/643,754, Amendment and Response filed Mar. 26, 2008 to Final Office Action mailed Sep. 26, 2007, 12 pages.
U.S. Appl. No. 10/643,754, Final Office Action mailed Nov. 26, 2007, 29 pgs.
U.S. Appl. No. 10/643,754, Response filed Jan. 25, 2008 to Final Office Action mailed Nov. 25, 2007, 20 pgs.
U.S. Appl. No. 10/643,758, Notice of Allowance mailed Jan. 07, 2008, NOAR, 4 pgs.
U.S. Appl. No. 10/643586, Supplemental Notice of Allowability Mailed Nov. 26, 2007, 2 pgs.
Handy, J., "The Cache Memory Book", *Academic Press* (1993), pp. 73-84.
US 7,243,211, 07/2007, Kohn (withdrawn)

* cited by examiner

MULTISTREAM PROCESSING MEMORY- AND BARRIER-SYNCHRONIZATION METHOD AND APPARATUS

FIELD OF THE INVENTION

This invention relates to the field of computers, and more specifically to a method and apparatus to support multistream processing with combined memory- and barrier-synchronization operations and/or instructions, for example in a vector supercomputer having multiple nodes, each node having a local memory and a plurality of processors.

BACKGROUND OF THE INVENTION

As processors run at faster speeds, memory latency on accesses to memory looms as a large problem. Commercially available microprocessors have addressed this problem by decoupling address computation of a memory reference from the memory reference itself. In addition, the processors decouple memory references from execution based on those references.

The memory latency problem is even more critical when it comes to vector processing. Vector processors often transfer large amounts of data between memory and processor. In addition, each vector processing node typically has two or more processing units. One of the units is typically a scalar unit. Another unit is a vector execution unit. In the past, the scalar, vector load/store and vector execution units were coupled together in order to avoid memory conflicts between the units. It has been, therefore, difficult to extend the decoupling mechanisms of the commercially available microprocessors to vector processing computers.

As multiple parallel processors are used to simultaneously work on a single problem, there is a need to communicate various status between processors. For example, status that each processor has reached a certain point in its processing (generally called a barrier synchronization, since no processor is allowed to proceed beyond the synchronization point until all processors have reached the synchronization point). See, for example, U.S. Pat. No. 5,721,921, which issued Feb. 24, 1998 entitled BARRIER AND EUREKA SYNCHRONIZATION ARCHITECTURE FOR MULTIPROCESSORS, which is incorporated in its entirety by reference. For another example, status that various memory operations specified before that point have completed and various memory operations after that point can rely on the fact that they have completed (generally called a memory synchronization).

What is needed is a system and method for hiding memory latency in a vector processor that limits the coupling between the scalar, vector load/store and vector execution units. Further what is needed is a fast, repeatable, and accurate way synchronizing operations within a processor and across processors.

SUMMARY OF THE INVENTION

The present invention provides a method and apparatus to provide specifiable ordering between and among vector and scalar operations within a single streaming processor (SSP) via a local synchronization (Lsync) instruction that operates within a relaxed memory consistency model. Various aspects of that relaxed memory consistency model are described. Further, a combined memory synchronization and barrier synchronization (Msync) for a multistreaming processor (MSP) system is described. Also, a global synchronization (Gsync) instruction provides synchronization even outside a single MSP system is described. Advantageously, the pipeline or queue of pending memory requests does not need to be drained before the synchronization operation, nor is it required to refrain from determining addresses for and inserting subsequent memory accesses into the pipeline.

DESCRIPTION OF THE PREFERRED EMBODIMENTS

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

The coupling together of the various units of a vector processor has made it difficult to extend the decoupling mechanisms used in commercially available microprocessors to vector processing computers. Standard scalar processors often decouple the address computation of scalar memory references and also decouple scalar memory references from scalar execution. The MIPS R10K processor is one example of this approach. A method of extending these concepts to a vector processor is discussed below.

Figure 1A:
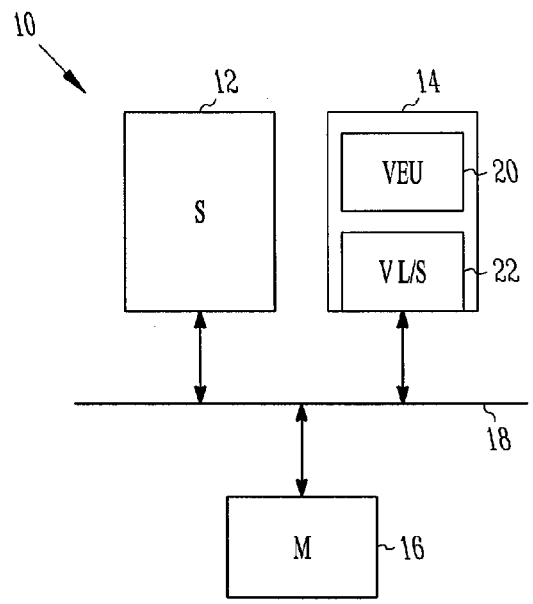
FIG. 1A illustrates a vector processing computer according to the present invention.

A vector-processing computer 10 is shown in FIG. 1A. Vector processing computer 10 includes a scalar processing unit 12, a vector processing unit 14 and a memory 16. In the example shown, scalar processing unit 12 and vector processing unit 14 are connected to memory 16 across an interconnect network 18. In some embodiments, vector processing unit 14 includes a vector execution unit 20 connected to a vector load/store unit 22. Vector load/store unit 22 handles memory transfers between vector processing unit 14 and memory 16.

The vector unit 14 and scalar unit 12 in vector processing computer 10 are decoupled, meaning that scalar unit 12 can run ahead of vector unit 14, resolving control flow and doing address arithmetic. In addition, in some embodiments, computer 10 includes load buffers. Load buffers allow hardware renaming of load register targets, so that multiple loads to the same architectural register may be in flight simultaneously. By pairing vector/scalar unit decoupling with load buffers, the hardware can dynamically unroll loops and get loads started for multiple iterations. This can be done without using extra architectural registers or instruction cache space (as is done with software unrolling and/or software pipelining).

In some embodiments, both scalar processing unit 12 and vector processing unit 14 employ memory/execution decoupling. Scalar and vector loads are issued as soon as possible after dispatch. Instructions that depend upon load values are dispatched to queues, where they await the arrival of the load data. Store addresses are computed early (in program order interleaving with the loads), and their addresses saved for later use.

In some embodiments, each scalar processing unit 12 is capable of decoding and dispatching one vector instruction (and accompanying scalar operand) per cycle. Instructions are sent in order to the vector processing units 14, and any necessary scalar operands are sent later after the vector instructions have flowed through the scalar unit's integer or floating point pipeline and read the specified registers. Vector instructions are not sent speculatively; that is, the flow control and any previous trap conditions are resolved before sending the instructions to vector processing unit 14.

The vector processing unit renames loads only (into the load buffers). Vector operations are queued, awaiting operand availability, and issue in order. No vector operation is issued until all previous vector memory operations are known to have completed without trapping (and as stated above, vector instructions are not even dispatched to the vector unit until all previous scalar instructions are past the trap point). Therefore, vector operations can modify architectural state when they execute; they never have to be rolled back, as do the scalar instructions.

In some embodiments, scalar processing unit 12 is designed to allow it to communicate with vector load/store unit 22 and vector execution unit 20 asynchronously. This is accomplished by having scalar operand and vector instruction queues between the scalar and vector units. Scalar and vector instructions are dispatched to certain instruction queues depending on the instruction type. Pure scalar instructions are just dispatched to the scalar queues where they are executed out of order. Vector instructions that require scalar operands are dispatched to both vector and scalar instruction queues. These instructions are executed in the scalar unit. They place scalar operands required for vector execution in the scalar operand queues that are between the scalar and vector units. This allows scalar address calculations that are required for vector execution to complete independently of vector execution.

The vector processing unit is designed to allow vector load/store instructions to execute decoupled from vector execute unit 20. The vector load/store unit 22 issues and executes vector memory references when it has received the instruction and memory operands from scalar processing unit 12. Vector load/store unit 22 executes independently from vector execute unit 20 and uses load buffers in vector execute unit 20 as a staging area for memory load data. Vector execute unit 20 issues vector memory and vector operations from instructions that it receives from scalar processing unit 12.

When vector execution unit 20 issues a memory load instruction, it pulls the load data from the load buffers that were loaded by vector load/store unit 22. This allows vector execution unit 20 to operate without stalls due to having to wait for load data to return from main memory 16.

Vector stores execute in both the vector load/store unit 22 and the vector execute unit 20. The store addresses are generated in the vector load/store unit 22 independently of the store data being available. The store addresses are sent to memory 16 without the vector store data. When the store data is generated in vector execute unit 20, the store data is sent to memory 22 where it is paired up with the store address.

The current approach allows scalar computation to execute independently of vector computation. This allows the scalar address and operand computation to execute in parallel, or ahead of the vector instruction stream. In addition, this approach allows vector address generation to execute independently of vector execution. Finally, this approach allows vector memory operations to execute ahead of vector execution, thus reducing memory latency.

This decoupling of the scalar, vector load/store, and vector execution does, however, make synchronizing of scalar and vector data more complex. Computer 10 incorporates specific instructions and hardware that reduce this complexity.

Memory Consistency Model

Most microprocessor architectures provide a memory consistency model, which describes the order in which memory references by different processors are observed.

The simplest, and "strongest" memory model is sequential consistency. This model states that references by each processor appear to occur in program order, and that the references of all the processors in the machine appear to be interleaved in some global order (it doesn't matter what this order is so much as that no two processors can observe a different order).

In a sequentially consistent multiprocessor, processors can synchronize with each other via normal memory references. If one processor writes a data value, and then a flag variable, for example, another processor can spin on the flag variable, and when it sees that change, can then read the data value and be guaranteed to see the value written by the first processor.

While this may be convenient for the programmer, it constrains the hardware in ways that can reduce performance. Hardware must in general not allow reads and writes to different memory locations by the same processor be performed out of order.

While many multiprocessors do not provide sequential consistency, most at least guarantee that references by a single processor will occur in program order (e.g.: a read to a memory location will observe the last write by the same processor). Even this can be difficult to do in a high-bandwidth vector processor, however.

One of the primary advantages of a vector architecture is that the instruction set conveys dependency information that allows for highly parallel execution. Groups of operations can be handed off to sequencers to be executed independently.

This distributed nature of a vector processor makes it difficult and performance limiting to coordinate all scalar and vector memory references and ensure program ordering. The X1 memory model is designed with this in mind.

X1 provides a very weak memory consistency model by default, but includes a rich suite of memory synchronization instructions for providing stronger ordering. The memory model is broken into two parts: single-processor ordering and multiple-processor ordering.

Single-Stream Processor Ordering

The architecture defines minimal guarantees on the ordering of the effects of vector memory reference operations with respect to each other and to scalar memory references. Explicit intra-SSP memory synchronization instructions normally must be used to guarantee memory ordering between multiple vector memory references and between vector and scalar memory references.

Define program order, a total ordering relation, between operations on a single SSP as the sequence observed by an implementation with a simple serial fetch/execute cycle. Each operation is the execution of a single scalar CPU instruction or a member of the sequence of elemental actions initiated by the execution of a vector instruction. We say that operation A is earlier than operation B if A precedes B in the program order.

Define dependence order, a partial ordering relation, as a subset of program order. Two operations A and B are ordered with respect to dependence (i.e.: B depends upon A) if A is earlier than B and at least one of these conditions holds:

A and B are scalar references to the same address.
  A synchronization instruction executes between memory references A and B in program order that orders A and B.
  B reads a scalar register or vector register element written by A, and no operation between A and B in program order writes that register or vector register element (true dependence).
  There exists an operation C between A and B in program order that depends upon A and upon which B depends (transitivity).
  A and B are elements of the same ordered scatter instruction.
  A and B are elements of a vector store with a stride value of zero.

Note that apparent output dependence and anti-dependence relations do not order operations in this definition of dependence order, for advanced implementations can use dynamic register renaming to avoid output dependence and anti-dependence constraints.

All implementations of this architecture must respect dependence order. A program is said to have data races if it performs memory reference operations A and B, not both loads, that reference the same byte of memory but are not ordered with respect to dependence. The apparent ordering of these operations is not guaranteed, and thus the program behavior may be unpredictable. Operations that are ordered by dependence will appear to the SSP issuing them to execute in program order. They will not necessarily appear to other SSPs in the system to execute in the same order.

Multiple SSP Ordering

This model applies to memory references performed and observed by multiple SSPs.

The multi-SSP memory ordering model provides only the following rules:

1. Writes to any given sword of memory are serialized. That is, for any given program execution, writes to a given location occur in some sequential order and no processor can observe any other order.
2. A write is considered globally visible when no SSP can read the value produced by an earlier write in the sequential order of writes to that location.
3. No SSP can read a value written by another MSP before that value becomes globally visible.

All other ordering between SSPs and MSPs must be provided by explicit memory synchronization instructions (Msync and Gsync instructions).

Providing Stronger Memory Models

The base memory model as stated above is fairly weak. Stronger consistency models can be obtained using memory ordering instructions.

Release consistency can be provided using the acquire Gsync and release Gsync instructions. Acquire events must use scalar loads and be followed by an acquire Gsync. Release events must use scalar stores and be preceded by a release Gsyncs. Atomic memory operations are considered as both integer loads and stores for this purpose.

Sequential consistency could in theory be provided by inserting Gsync instructions between all memory references. This would lead to unacceptable performance for production computing, however.

Virtual Address Space

The X1 uses byte addresses, with a 64-bit virtual address space. The top two bits (VA63 . . . 62) determine the memory region, which dictates the privilege level and type of address translation:

0=user virtual
  1=kernel virtual
  2=kernel physical (no translation)
  3=reserved VA61 . . . 48 are not implemented, and must be zero.

Distributed programming models such as UPC, shmem( ) and MPI will generally use certain bits of the virtual address to represent a "processing element" (PE). The hardware supports this model via a remote address translation mechanism that interprets VA47 . . . 38 as a virtual node number.

Typically, software will use one MSP as a distributed memory PE, in which case it would place the virtual PE number in VA47 . . . 36. If a single P chip were used as a distributed memory PE, the PE number would be placed in VA47 . . . 34. If a whole node were used as a distributed memory PE (perhaps with an OpenMP layer running under the distributed memory model), then the PE number would be placed in VA47 . . . 38.

Eight pages sizes are provided, varying from 64 KB to 4 GB (64 KB, 1 MB, 4 MB, 16 MB, 64 MB, 256 MB, 1 GB, 4 GB).

Physical Address Space

The X1 provides a maximum 46-bit (64 TB) physical memory address. The node is the unit over which a single physical page of memory is distributed. Access to all memory within a node is completely uniform for a given processor (equal bandwidth and latency). The node size for the X1 implementation. The physical memory format allows for up to 1024 nodes (4096 MSPs) and 64 GB of physical memory per node.

The X1 defines three parallel, physical address spaces, which are selected by PA47 . . . 46.

0=main memory (MEM)
  1=reserved
  2=memory-mapped registers (MMR)
  3=widget space (IO)

Accesses to the main memory space may or may not be cached, but are always coherent. Accesses to MMR and IO space are never cached. MMR space contains special processor state, such as coherence directories, routing tables, cache and memory ECC, and various system control and status registers. IO space provides access to memory-mapped I/O devices residing on the Crosstalk channels.

The operating system controls access to the various physical address spaces via the virtual-to-physical translations.

Address Translation

X1 supports two forms of address translation:
source translation, in which a virtual address is fully translated by a translation lookaside buffer (TLB) on the local P chip to a physical address on an arbitrary node, and
remote translation, in which the physical node number is determined by a simple translation of the virtual address Vnode field, and the remaining virtual address is sent to the remote node to be translated into a physical address offset via a remote translation table (RTT).

If enabled, remote translation is performed for user addresses when the virtual address Vnode field (VA47 ... 38) does not match the local virtual node number stored in a control register. Remote translation can be disabled in order to run distributed memory applications on a set of non-contiguous nodes, or run uniprocessor/SMP applications that exceed the memory of one node.

Source Translation

A TLB is a cache of page table entries, which is loaded on demand under software control. Each P chip contains three separate TLBs, for translating instructions, scalar references and vector references, respectively. The three TLBs are independent, and may contain different sets of page table entries. The vector TLB is replicated four times for bandwidth purposes, but will contain identical entries under normal operation.

Each TLB contains 256 entries and is eight-way set associative. Each way can be set to its own page size, ranging from 64 KB to 4 GB. The maximum TLB "reach" is thus 1TB (256 entries×4 GB/entry).

Translation involves first matching a virtual address against an entry of the TLB, and then using the matching entry, if found, to transform the virtual address into a physical address.

If a TLB match is not found, then a precise TLB Miss exception occurs. The miss handler can read the offending VA from a control register and load the TLB with the appropriate entry before resuming the process. It may also determine that a page must be swapped in from disk, or that the process has made an illegal reference and must be terminated.

Assuming a valid match, the physical address is formed by replacing the virtual page number in the virtual address (those bits above the page boundary), with the physical page number from the TLB entry. If the physical address is to a remote node, then the cache allocation hint is forced to non-allocate and the reference is not cached (Get/Put semantics).

illustrates a source virtual address translation. In this example, the way of the TLB containing the matching entry is set to a page size of 1 MB. Thus, bits 19 ... 0 of the virtual and physical addresses are below the page boundary. These bits are passed through, untranslated, from the virtual to physical addresses.

All bits of the virtual page number (VA47 ... 20), must match the corresponding bits of the VPN field in the TLB entry. These bits are completely replaced by the corresponding bits of the PPN field from the TLB (all bits above the page boundary). The top two bits of the physical address (47...46) specify the physical address space. This will be 00 for main memory accesses, 10 for MMR accesses or 11 for IO space accesses. VA63 ... 48 are all zero.

Remote Translation

A user's partition is defined by two values stored in a control register. BaseNode specifies the physical node on which the partition starts and NodeLimit specifies the size of the partition. In addition, MyNode specifies the virtual node number on which the local processor resides.

The remote translation process is illustrated in. When remote translation is enabled, the hardware treats VA47 ... 38 (the VNode field) as a virtual node number. All useg virtual addresses with a VNode value not matching MyNode are translated remotely.

In this case, the address is checked to make sure it does not exceed the user's partition defined by a NodeLimit. If VA47 ... 38 $ NodeLimit, then an Address Error exception occurs. The physical node number for the address is computed by adding VA47 ... 38 to BaseNode.

The virtual address Offset field (VA37 ... 0) is sent to the resulting physical node as a "remote virtual address" (RVA) to complete the translation. The cache allocation is forced to non-allocate and the reference is not cached (Get/Put semantics).

RVA requests bypass the Ecache, since they can never be cached. The M chips contain a set of four, 2-bit Global Address Space ID (GASID) registers, one for each of the local MSPs. When the local M chip sends a packet out the network with an RVA, it includes the value of the two bit GASID for the originating MSP. This is used to qualify the remote translation of the RVA at the destination M chip. It allows for up to four applications using remote translation to be sharing memory at a node.

At the remote M chip, remote virtual addresses go through a translation to a pure physical address, with a granularity of 16 MB. The two GASID bits, and bits 37 ... 24 of the RVA are used to index into a 64K-entry remote translation table (RTT). Each entry of this table contains a valid bit, and a 12-bit value representing PA35 ... 24 (the 16 MB physical page frame). This is appended to the lower 24 bits of the RVA to form a 36-bit physical memory address at the remote node.

The remote translation mechanism does not support demand paging. If the indexed RTT entry does not contain a valid translation, then the request cannot be satisfied, and the application will suffer a fatal error.

Remote translation allows the operating system at each node to independently manage its local memory. When space is needed for an application across all nodes of a user's partition, the physical pages can be allocated at different offsets on each node, even though the virtual offsets at each node will be the same. The BaseNode addition and NodeLimit check allow arbitrary partition sizes and alignments (as opposed to requiring power-of-two partition sizes and/or requiring partitions to start on naturally-aligned boundaries), making it easier to find partitions in which to run a user's distributed memory application.

Synchronization

AMOs

The NV ISA (New Vector Instruction Set Architecture) includes the following atomic memory operations. All operands are 64-bit integers and all memory addresses are dword-aligned.

Atomic fetch and add—Adds an addend (Ak) to the value in memory location Aj, saving the sum in memory and returning the previous value of the memory location into Ai. The read-modify-write of memory is performed atomically.

$Ai^2[Aj]$ $[Aj]^2[Aj]+Ak$

Atomic fetch and-exclusive or—ANDs the value of Ai with the value of memory location Aj, then XORs the result with the value of Ak, saving the result in memory and returning the original value of the memory location into Ai.

$tmp^2[Aj]$ $[Aj]^2(Ai\ and\ [Aj])\ xor\ Ak$ $Ai^2\ tmp$

1. This operation can be used to atomically set or clear individual bits in memory (for lock operations), perform various logical operations on memory (AND, OR, XOR, EQV), or perform byte or halfword stores into memory.
2. Atomic compare and swap—Compares the value of Ai with the value in memory location Aj. If they are equal, stores the value of Ak into the memory location. Returns the original value of memory into Ai.

$tmp^2[Aj]$ $[Aj]_2(Ai==[Aj])?Ak:[Aj]$ $Ai^2 tmp$

1. This operation is similar to a "load-linked/store-conditional" sequence (implemented in the MIPS and Alpha ISAs), and allows the implementation of arbitrary atomic operations on memory. A memory location is first loaded and the value used in an arbitrary way. The result is then conditionally stored back to memory, based on a comparison with the old value. If the value has been changed in the interim, the store fails, and the operation must be repeated.
2. Atomic add—This operation is just like the atomic fetch and add, except that no result is returned. This is useful when the value of memory is not needed, as it avoids reserving a result register.

$[Aj]^2[Aj]+Ak$

Atomic and-exclusive or—This operation is just like the atomic fetch and exclusive or, except that no result is returned. This is useful when the value of memory not needed, as it avoids reserving a result register.

$[Aj]^2(Ai==[Aj])?Ak:[Aj]$

All atomic memory operations in the X1 are performed at the memory controllers on the M chips. They are thus very efficient when multiple MSPs are performing operations on synchronization variables concurrently (that is, under moderate to heavy contention). Under light contention, when the same processor is likely to access the same synchronization variable with no intervening references from other MSPs, the X1 AMOs will not perform as well as a LL/SC sequence would, which can operate out of the local cache.

Barrier Synchronization

Barriers allow fast, global communication that all processors (or some subset of the processors) in a parallel program have reached a certain point in their execution.

The X1 provides hardware barrier support in the router ASICs only. Thus, all barrier routines will require a software barrier for the 8 MSPs on a node pair, at least. The barrier libraries can optionally configure and use the hardware barrier mechanism in the routers for the remainder of the barrier tree in systems that contain routers (small systems don't use routers).

The initial plans are to implement barrier routines fully in software, without using the hardware barrier mechanism at all. A good, hierarchical software barrier completes in O(log N) time, and is only a small constant factor longer than a hardware barrier. Implementing the library in software (using AMOs) avoids the complexity of managing the hardware barrier.

Interprocessor Interrupts

The X1 provides a mechanism for the operating system to deliver interrupts to remote processors, along with a small amount of extra state.

Each single-stream processor has four general-purpose, external interrupt lines, each of which is controlled by a memory-mapped trigger register. Interrupts can be delivered to a remote processor by simply writing to the trigger register for the desired interrupt line. The individual interrupts are internally maskable by the processor.

Each trigger register is 64 bits wide, with each bit representing an event flag. The meanings and usage of the various event flags are by software convention. A write to an interrupt trigger register generates an interrupt to the processor on the associated interrupt line and sets any bits in the register that are set in the write operand (that is, the write data is bitwise ORed into the trigger register).

Bits in the trigger register remain set until explicitly cleared. Upon interrupt, the processor can read the trigger register (or trigger registers) to determine what event(s) caused the interrupt. Event flags can be cleared by writing to another memory-mapped register.

Sync Instructions

As described below, the NV ISA provides very few memory ordering guarantees by default. Memory ordering, when required, can be provided by using one of the Sync instructions.

Lsyncs provide ordering among vector and scalar references by the same processor. The Lsync_s_v instruction guarantees that previous scalar references complete before subsequent vector references. The Lsync_v_s instruction guarantees that previous vector references complete before subsequent scalar references. Finally, the Lsync_v_v instruction guarantees that previous vector references complete before subsequent vector references. There are also a few other varieties that provide even lighter-weight guarantees.

These instructions are used when the compiler or assembly language programmer either knows of a data dependence, or cannot rule out the possibility of a data dependence between the various classes of memory references.

Msyncs provide ordering among memory references by the processors of an MSP. The Msync instruction is executed independently on multiple processors within the MSP (typically by either all processors, or a pair of processors performing a "producer/consumer" synchronization). The Msync instruction includes a mask indicating which processors are participating, and all participating processors must use the same mask, else hardware will detect the inconsistency and cause an exception.

The regular Msync orders all previous references by all participating processors within the MSP before all subsequent references by all participating processors. It is essentially a memory barrier and control barrier wrapped into one. The vector Msync acts the same, but only applies to vector references. Lastly, the producer Msync is intended to situations in which one processor is producing results for one or more other processors to consume. It doesn't require the producer to wait to see earlier results possibly written by the "consumers."

Msyncs are highly optimized in the X1. Vector store addresses are sent out to the E chips long before the actual data is available; the store data are sent along later. Load requests that occur after an Msync are checked against the earlier store addresses. If there is no match, the loads are serviced, even before the data for stores occurring before the Msync have been sent to the E chip.

Gsyncs provide ordering among references made by multiple MSPs. They are generally used whenever data is shared (or potentially shared) between MSPs. Like Msyncs, Gsyncs include a mask of participating processors within an MSP, and all participating processors must issue a Gsync with a consistent mask. The regular Gsync prevents any subsequent memory references by the participating processors from occurring until all previous loads have completed and all previous stores have become globally visible.

A Gsync should be used, for example, before performing a synchronization operation (such as releasing a lock) that informs other processors that they can now read this processor's earlier stores. Several variants of Gsync are provided, including versions optimized for lock acquire and lock release events.

Figure 1B:
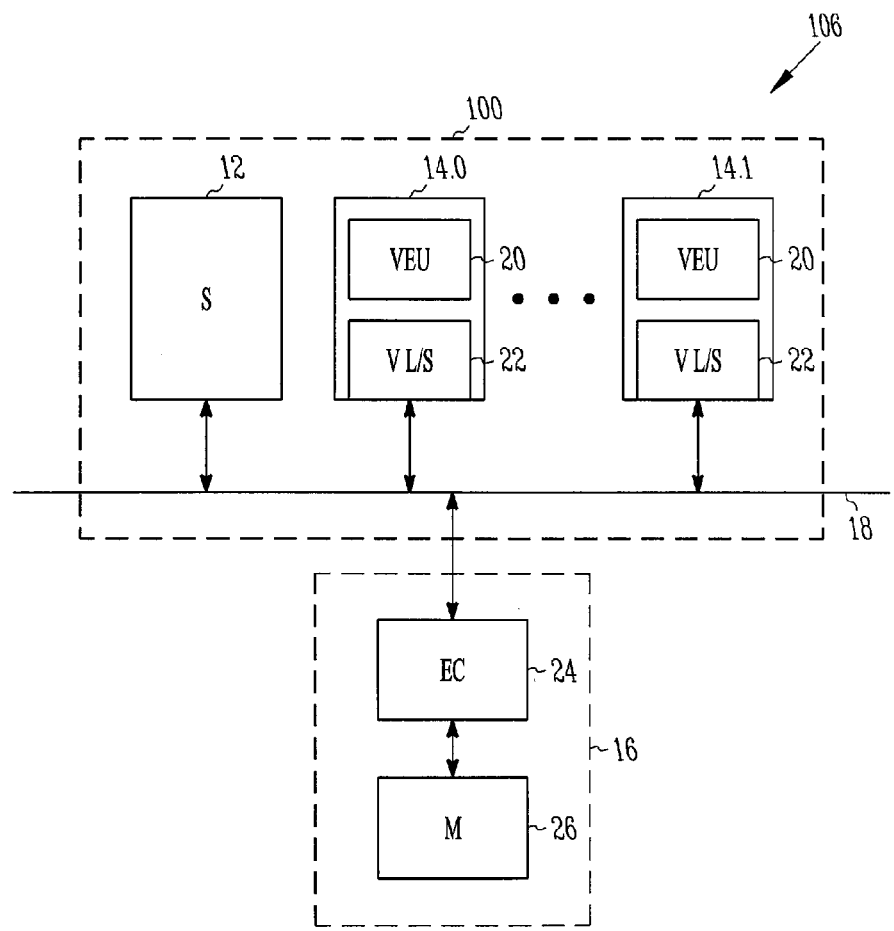
FIG. 1B illustrates an alternate embodiment of a vector processing computer according to the present invention.

FIG. 1B is a block diagram of a vector processing MSP (multistreaming processor) 106 used in some embodiments of the invention. Vector processing MSP 106 in FIG. 1B includes a processor 100. Typically, processor 100 is one of a plurality of processors connected to a common cache 24 and memory 26, however in some embodiments, such as that shown, only a single streaming processor (SSP) 100 is used. Processor 100 includes a scalar processing unit 12 and a plurality (e.g., two) vector processing units (14.0 and 14.1). Scalar processing unit 12 and the two vector processing units 14 are connected to memory 16 across interconnect network 18. In the embodiment shown, memory 16 is configured as cache 24 and distributed global memory 26. Vector processing units 14 include a vector execution unit 20 connected to a vector load/store unit 22. Vector load/store unit 22 handles memory transfers between vector processing unit 14 and memory 16.

Figure 1C:
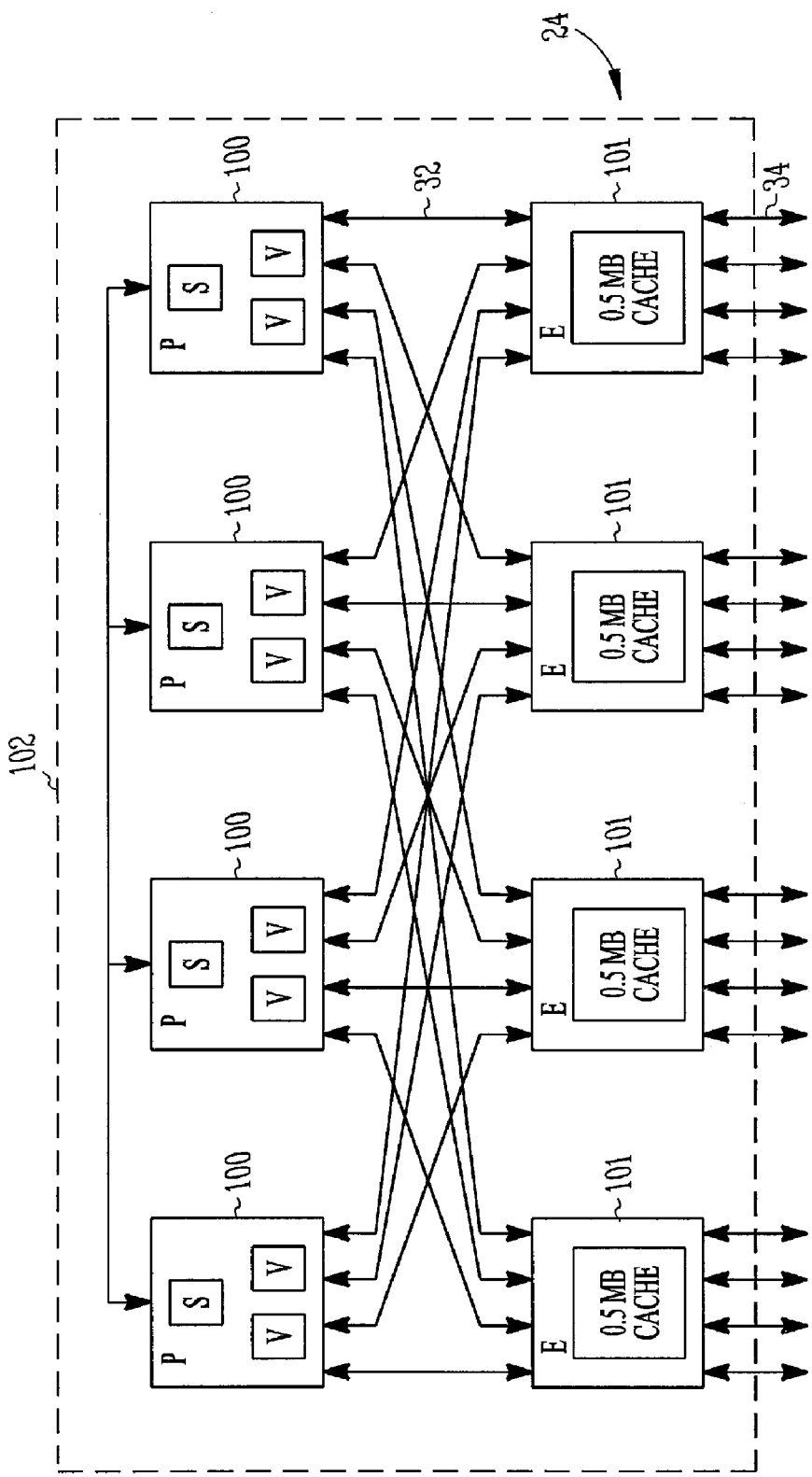
FIG. 1C shows a block diagram of an MSP 102 of some embodiments of the present invention.

FIG. 1C shows a block diagram of a multistreaming processor (MSP) 102 of some embodiments of the present invention. MSP 102 includes a plurality of P chips or P circuits 100 (each representing one single-streaming processor having a plurality of vector pipelines and a scalar pipeline), each P chip/circuit 100 connected to a plurality of E chips or E circuits 101 (each representing an external cache, synchronization, and memory-interface function). In some embodiments, every P chip/circuit 100 is connected to every E chip/circuit 101. In some embodiments, four P Chips 100 and four E Chips 101 form one MSP 102. Although the P Chip 100 and the E Chips 101 are sometimes described herein as "chips" as representing one embodiment, in other embodiments, they are implemented with a plurality of chips each, or with a single chip containing a plurality of P circuits 100 and/or E circuits 101.

In some embodiments, each scalar processing unit 12 delivers a peak of 0.4 GFLOPS and 0.8 GIPS at the target frequency of 400 MHz. Each processor 100 contains two vector pipes, running at 800 MHz, providing 3.2 GFLOPS for 64-bit operations and 6.4 GFLOPS for 32-bit operations. The MSP 102 thus provides a total of 3.2 GIPS and 12.8/25.6 GFLOPS. Each processor 100 contains a small Dcache used for scalar references only. A two-MB Ecache 24 is shared by all the processors 100 in MSP 102 and used for both scalar and vector data. In one embodiment, each processor 100 and e-circuit 101 of cache 24 are packaged as separate chips (termed the "P" chip and "E" chips, respectively).

In some embodiments, signaling between processor 100 and cache 24 runs at 400 Mb/s on processor-to-cache connection 32. Each processor-to-cache connection 32 shown in FIG. 1C uses an incoming 64-bit path for load data and an outgoing 64-bit path for requests and store data. Loads, in some embodiments, can achieve a maximum transfer rate of fifty-one GB/s from cache 24. Stores, in some embodiments, can achieve up to forty-one GB/s for stride-one and twenty-five GB/s for non-unit stride stores.

In some embodiments, global memory 26 is distributed to each MSP 102 as local memory 105. Each E Chip 101 has four ports 34 to M chip 104 (and through M chip 104 to local memory 105 and to network 107). In some embodiments, ports 34 are sixteen data bits in each direction. MSP 102 has a total of 25.6 GB/s load bandwidth and 12.8-20.5 GB/s store bandwidth (depending upon stride) to local memory.

Figure 1D:
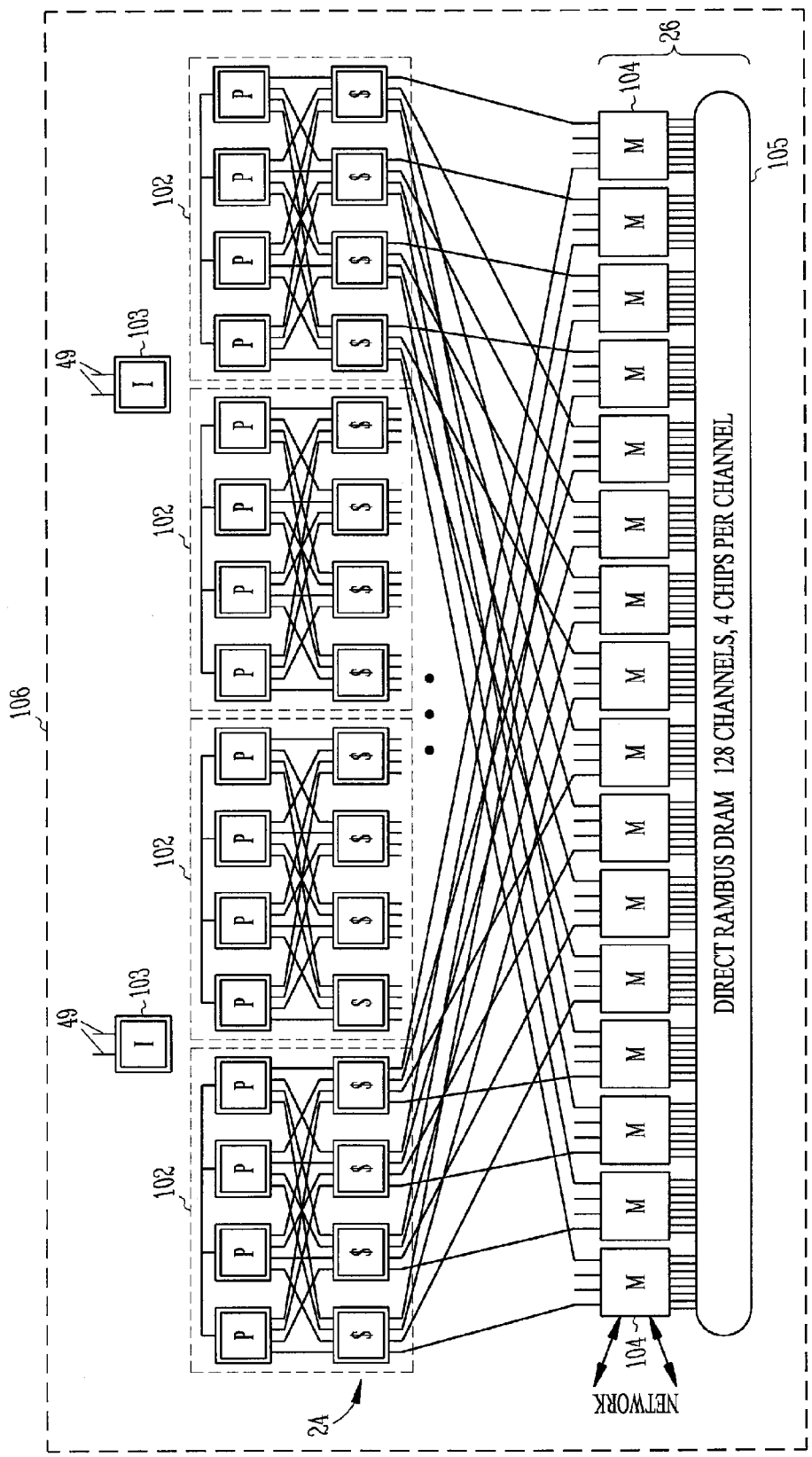
FIG. 1D shows a block diagram of a node 106 of some embodiments of the present invention.

FIG. 1D shows a block diagram of a node 106 of some embodiments of the present invention. In some embodiments, a node 106 is packaged on a single printed-circuit board. Node 106 includes a plurality of MSPs 102 each connected to a plurality of M chips 104, each M-chip 104 controlling one or more sections of memory 105. In some embodiments, each M chip 104 is connected to memory 105 using a plurality of channels (e.g., eight), each channel having a plurality of direct RAMBUS DRAM chips (e.g., four). In some embodiments, each node also includes a plurality of I/O channels 103 used to connect to a local-area network (e.g., one or more gigabit ethernet connections) and/or storage (e.g., disk storage or a storage-area network). Each node 106 also includes one or more network connections that interconnect the memories of a plurality of nodes, in some embodiments.

In some embodiments, each node 106 includes four MSPs 102 and sixteen M chips 104. M chips 104 contain memory controllers, network interfaces and cache coherence directories with their associated protocol engines. In one such embodiment, memory 26 is distributed round-robin by 32-byte cache lines across the sixteen M chips 104 at each node 106. Thus, the M chip for a particular address is selected by bits 8 . . . 5 of the physical address.

Each E Chip 101 is responsible for one fourth of the physical address space, determined by bits 5 and 6 of the physical address. A reference to a particular line of memory is sent to the associated E Chip 101 where the Ecache is consulted, and either the line is found in the Ecache or the request is sent on to an M chip. Bits 7 and 8 of the physical address select one of four M chips connected to each E Chip 101.

Each M chip 104 resides in one of sixteen independent slices of the machine, and the interconnection network 107 provides connectivity only between corresponding M chips on different nodes (thus there are sixteen parallel, independent networks). All activity (cache, memory, network) relating to a line of memory stays within the corresponding system slice.

Each M chip 104 contains two network ports 44, each 1.6 GB/s peak per direction. This provides a total peak network bandwidth of 51.2 GB/s in and 51.2 GB/s out. Single transfers to/from any single remote destination will use only half this bandwidth, as only one of two ports 44 per M chip 104 will be used. Also, contention from the other processors 100 on node 106 must be considered. Lastly, all inter-node data is packetized, resulting in a smaller ratio of sustained to peak than in the local memory subsystem. Protocol overheads vary from 33% (one way, stride-1 reads) to 83% (symmetric, non-unit-stride reads or writes).

Each node 106 also contains two I/O controller chips 103 ("I" chips) that provide connectivity between the outside world and network 107 and memory 26. In some embodiments, each "I" chip 103 provides two XIO (a.k.a. Crosstalk) I/O channels 49, with a peak speed bandwidth of 1.2 GB/s full duplex each. The I chips are connected to each other and to the sixteen M chips 104 with enough bandwidth to match the four XIO channels.

This partitioning provides low latency and high bandwidth to local memory 105. With a local memory size of up to sixteen GB (sixty-four GB, once 1 Gbit chips become available), most single-processor and autotasked codes should run locally, and most references in distributed-memory codes will be satisfied locally as well. Latency to remote memory will depend upon the distance to the remote node, and the level of contention in network 107.

In some embodiments, a limited operating system executes on each node, with a Unicos/mk-like layer across nodes 106. The limited OS will provide basic kernel services and management of two direct-attached I/O devices (a disk array and network interface). All other I/O connectivity is provided by a separate host system. In one such embodiment, the host system also provides the user environment (shell, cross compilers, utility programs, etc.), and can be used to run scalar compute applications.

Figure 1E:
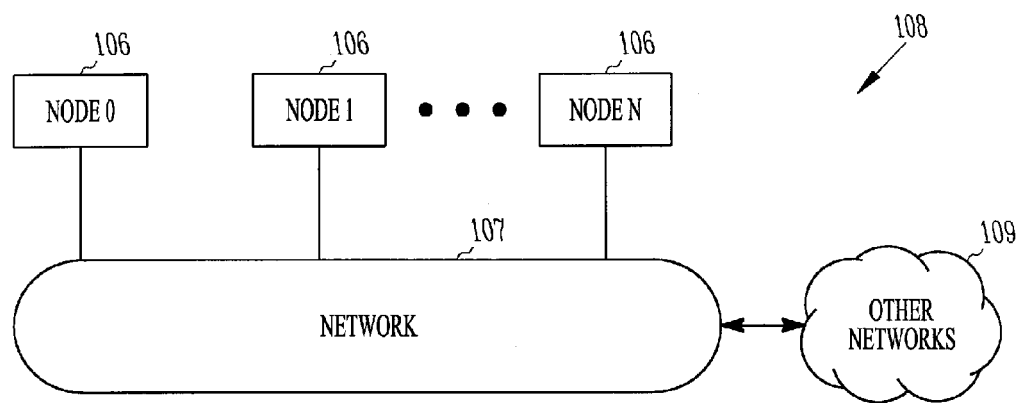
FIGS. 1E and 1F show block diagrams of a system 108 of some embodiments of the present invention.

FIG. 1E shows a block diagram of a system 108 of some embodiments of the present invention. System 108 includes a plurality of nodes 106 each connected to a common network 107. In some embodiments, network 107 is also connected to one or more other networks 109.

Figure 1F:
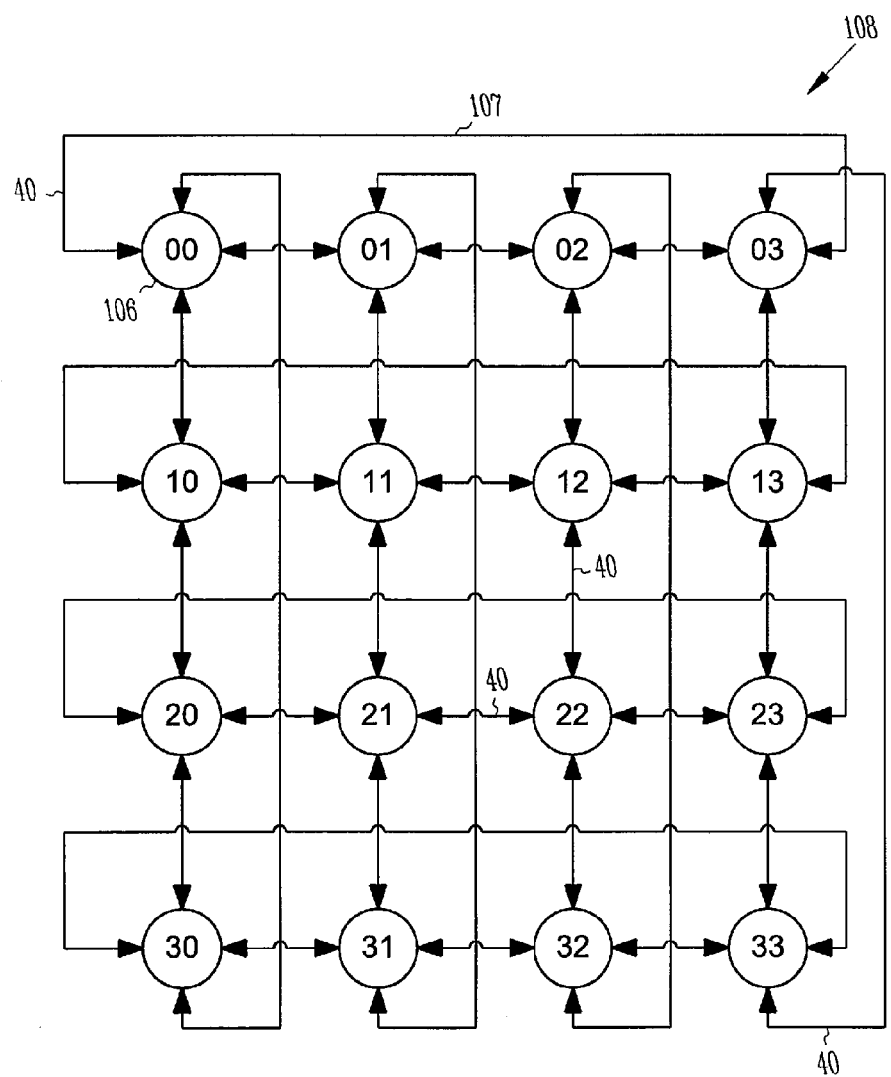

FIG. 1F shows an embodiment having a torus network. In some embodiments, each system 108 includes a plurality of nodes 106 interconnected with a network 107. In some embodiments, as is shown in FIG. 1F, network 107 includes high-speed links 40 used to connect nodes 106 either as a hypercube or as a torus. Other approaches for interconnecting nodes 106 could be used as well.

Figure 1G:
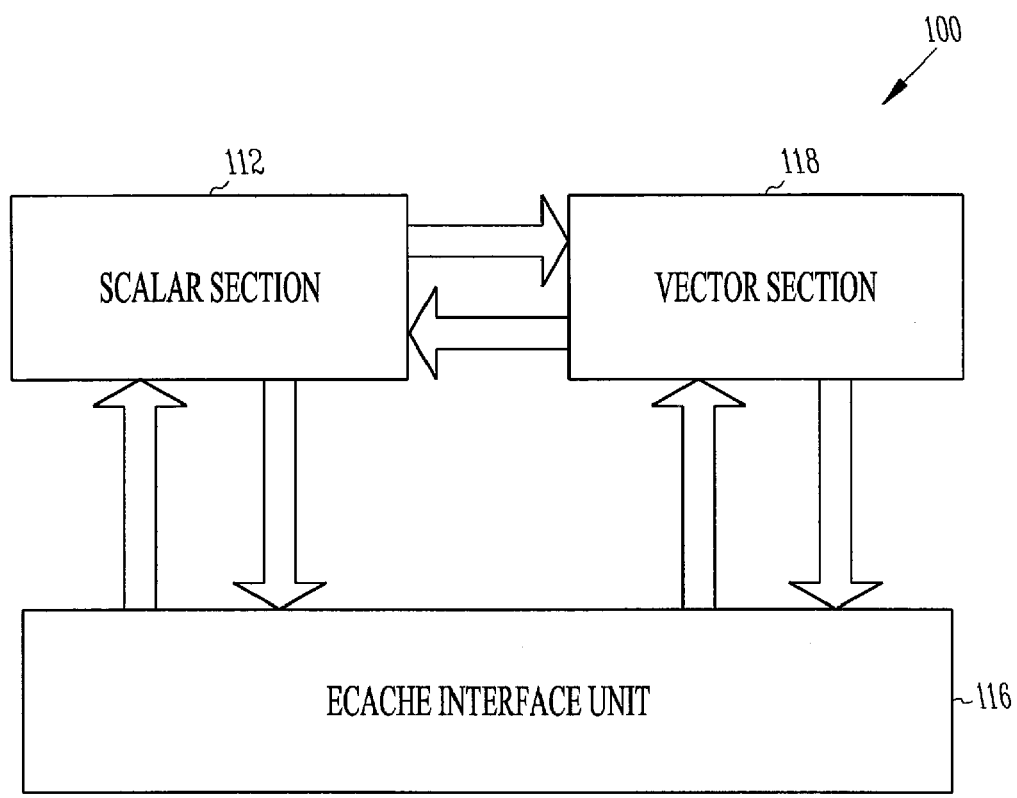
FIG. 1G illustrates a processor which could be used in the node of FIG. 1D.

FIG. 1G shows one embodiment of processor 100. In the embodiment shown, processor 100 includes three sections: a scalar section (SS) 112, a vector section (VS) 118 and an Ecache interface unit (EIU) 116. EIU 116 is the cache/network interface; it operates to ensure high bandwidth between the SS/VS and cache 24.

Figure 1H:
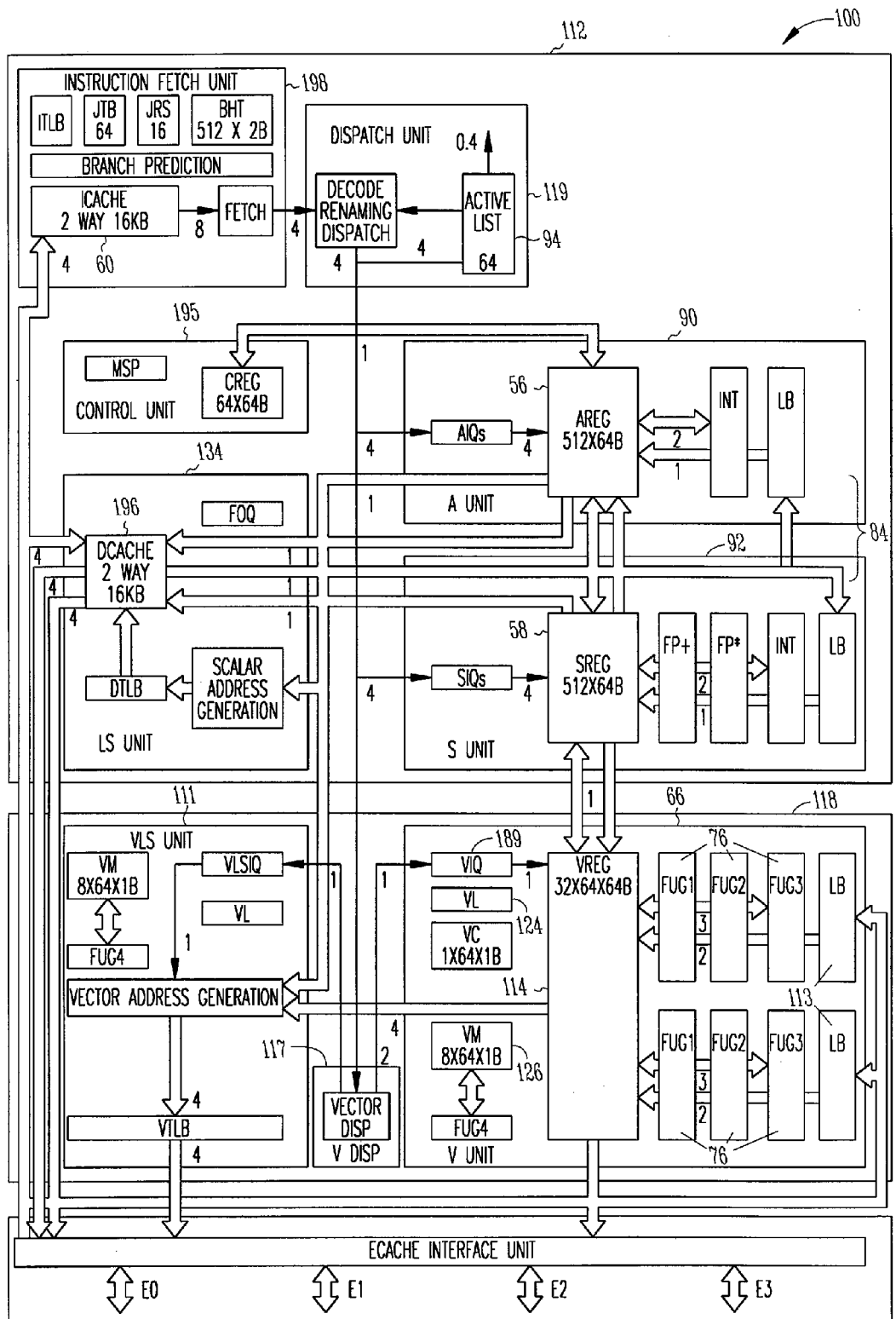
FIG. 1H is a more detailed diagram of a processor that could be used in the node of FIG. 1D.

A more detailed example of some embodiments of processor 100 is shown in FIG. 1H. In the embodiment shown in FIG. 1H, SS 112 includes a Instruction Fetch Unit (IFU) 198, a Dispatch Unit (DU) 119, an AS Unit (ASU) 84, a Load/Store Unit (LSU) 134, and a Control Unit (CU) 195. AS Unit 84 includes A Unit 90 and S Unit 92. In one such embodiment, SS 112 implements an out-of-order, 2-way issue superscalar processor.

In some embodiments, VS 118 implements a two-pipe vector processor capable of executing eight floating-point operations and 4 memory operations per Lclk. VS 118 includes a Vector Dispatch Unit (VDU) 117, a Vector Unit (VU) 113 and a Vector Load/Store Unit (VLSU) 111.

In some embodiments, SS 112 is a high performance superscalar processor that implements many of today's RISC superscalar features. It can dispatch, in-order, up to two instructions per Lclk, can then execute instructions out-of-order within the various units, and then graduate in-order up to two instructions per Lclk. The SS also implements speculative execution, register renaming, and branch prediction to allow greater out-of-order execution. The SS can predict up to two branch instruction and uses a Branch History Table (BHT), a Jump Target Buffer (JTB), and Jump Return Stack (JRS) to help insure a high branch prediction rate.

SS 112 also contains two 64-bit wide register files, A Registers (AR) and S Registers (SR) 58. The ARs are used mainly for address generation. In some embodiments, there are sixty-four logical ARs and 512 physical ARs that are renamed within A Unit 90. The SRs are used for both integer and floating-point operations. In some embodiments, there are sixty-four logical SRs and 512 renamed physical SRs within S Unit 92.

As noted above, SS 112 is capable of issuing up to two integer operations per Lclk using the ARs. In addition, SS 112 is capable of issuing one SR instruction per Lclk that can be either integer or floating point. The decoupled SLSU 134 (scalar load/store unit) of the SS 112 can issue, in order, one load or store per Lclk which may then execute out-of-order with respect to previous scalar memory operations. The SS 112 is also able to issue one branch instruction per Lclk, which allows one branch prediction to be resolved per Lclk.

The SS 112 includes separate first level of caches for instructions and scalar data. SS's Instruction Cache (Icache) 60 is 16 KBytes in size and is two-way set associative. Each Icache line is thirty-two bytes. Data Cache (Dcache) 196 is also 16 KBytes and two-way set associative with a thirty-two-byte line size. Icache 60 is virtually indexed and virtually tagged while Dcache 196 is virtually indexed and physically tagged. In some embodiments, Dcache 196 is write through.

SS 112 supports virtual memory addressing by maintaining precise exceptions for address translation errors on both scalar and vector memory references. Floating-point exceptions and other errors are not precise.

VS 118 is a two pipe vector processor that executes operations at the Sclk rate. Control for VS 118 executes at the LClk rate. In some embodiments, VS 118 includes three units, VDU 117, VU 113 and VLSU 111, that are all decoupled from SS 112 and are also decoupled from each other. VDU 117 receives instruction from the DU 119 of SS 112 and couples required scalar operands with these vector operations. The VDU 117 then dispatches these vector instructions to the VU 113 and VLSU 111. This allows scalar address generation for vector memory references to execute ahead of the vector operations and also permits the VLSU 111 to run ahead of the VU 118. This decoupling, similar to modern RISC CPUs, helps VS 118 conceal latency to both Ecache 24 and memory system 26.

VU 118 contains the large Vector Register (VR) file 70, which can operate in two widths, 32-bits or 64-bits. There are thirty-two logical and thirty-two physical VRs 70 that have a Maximum Vector Length (MaxVL) of sixty-four elements. No register renaming is performed on the VRs. When performing 32-bit operations, the VRs are 32-bits wide and when executing 64-bit operations the VRs are 64-bits wide. For both widths of operations, the MaxVL of the VRs remains at sixty-four elements. The VU also contains a Vector Carry Register (VC) that is 1-bit wide and MaxVL elements long. This register is used to support extended integer arithmetic.

The VU contains two other register sets that are used to control the vector operations of both the VU and VLSU. A Vector Length Register (VL) 72 is a single 64-bit register that contains a value between 0 and MaxVL. The VL serves to limit the number of operations a vector instruction performs. The VS118 also includes eight Vector Mask Registers (VM) 74 which are each 1-bit wide and MaxVL elements long. VMs 74 are used to control vector instructions on a per element basis and can also contain the results of vector comparison operations.

VU 113 is capable of issuing, in order, one vector operation per Lclk. The VU contains two copies, one for each vector pipe, of three Functional Groups (FUG s) 76, that are each capable of executing one operation per Sclk (a clock denoting or specifying a given amount of time or frequency). Each FUG 76 includes multiple functional units that share data paths to and from VRs 70. The FUGs 76 contain both integer and floating-point function units. Vector chaining is supported between the FUGs and writes to memory 26 but is not supported for reads from memory 26. Most 32-bit vector operations will be performed at twice the rate of 64-bit vector operations.

VLSU 111 performs all memory operations for VS 118 and is decoupled from VU 113 for most operations. This allows VLSU 111 to load vector memory data before it is used in the VU. The VLSU 111 can issue, in order, one instruction per Lclk. The VLSU 111 can generate four memory operations per Lclk. In some embodiments, the four addresses can be for stride loads, gathers, stride stores, or scatters.

To support decoupling of VLSU 111 from VU 113, VS 118 also contains a large Load Buffer (LB) 78. In some embodiments, LB 78 is a 512 by 64-bit element buffer. That is, there are eight vector-register-equivalent buffers that can be used as a staging area for vector loads. Memory load data is placed in LB 78 by VLSU 111 until VU 113 has determined that no previous memory operations will fault. VU 113 then moves the load data from LB 78 into the appropriate VR 70. In some embodiments, VLSU 111 rotates through the eight load buffers 78 as needed. On a Vector Translation Trap, the load buffer contents are ignored and the vector load instructions associated with the data in the load buffers are restarted.

VS 118 also supports virtual memory addressing by maintaining precise exception state for vector address translation errors.

EIU 116 maintains a high bandwidth between a P Chip 100 and E Chips 101. In some embodiments, EIU 116 is capable of generating a maximum of four memory references per Lclk to the E Chips 101 and can also receive up to four Dwords of data back from the E Chips 101 per Lclk.

EIU 116 supplies instructions to Icache 60 that are fetched from E Chips 101. EIU 116 also controls all scalar and vector memory requests that proceed to E Chips 101. The EIU contains buffering that allows multiple scalar and vector references to be queued to handle conflicts when multiple references request the same E Chip in a single Lclk.

EIU 116 also cooperates with DU 119, SLSU 134 and VLSU 111 to ensure proper local synchronization of scalar and vector references. This requires, in some embodiments, that EIU 116 have the capability to invalidate vector store addresses that are resident in Dcache 196.

Instruction Flow

All instructions flow through the processor 100 by first being fetched by IFU 198 and then sent to DU 119 for distribution. In the DU, instructions are decoded, renamed and entered in order into Active List (AL) 94 at the same time that they are dispatched to AU 90, SU 92 and VDU 117.

In some embodiments, a sixty-four-entry AL 94 keeps a list of currently executing instructions in program order, maintaining order when needed between decoupled execution units. Instructions can enter AL 94 in a speculative state—either branch speculative or trap speculative or both. A branch speculative instruction is conditioned on a previous branch prediction. An instruction is trap speculative if it or any previous instruction may trap. Speculative instructions may execute, but their execution cannot cause permanent processor state changes while speculative.

Instructions in the AL proceed from speculative to scalar committed, to committed, to graduated. The AL uses two bits to manage instruction commitment and graduation: trap and complete. An instruction that may trap enters the AL with its trap bit set and complete bit clear. The trap bit is later cleared when it is known the instruction will not trap. Both the trap and complete bits are set for a trapping instruction.

A scalar committed instruction is not branch speculative, will not generate a scalar trap, and all previous scalar instructions will not trap. Scalar commitment is needed for the Vector Dispatch Unit (VDU) to dispatch vector instructions to VU and VLSU. Instructions proceed from being scalar committed to committed.

Committed instructions are not branch speculative, will not trap, and all previous instructions will not trap. After commitment, an instruction proceeds to graduation and is removed from the AL. An instruction may only graduate if it and all previous instructions in the AL are marked complete and did not trap. In some embodiments, the AL logic can graduate up to four instructions per LCLK. Scalar shadow registers are freed at graduation and traps are asserted at the graduation point. Instructions cannot be marked complete until it can be removed from the AL. That requires, in some embodiments, at the least that all trap conditions are known, all scalar operands are read, and any scalar result is written. Some vector instructions are marked complete at dispatch, others at vector dispatch, and the remaining vector instructions are marked complete when they pass vector address translation.

Scalar instructions are dispatched by DU 119 in program order to AU 90 and/or to SU 92. Most scalar instructions in the AU and SU are issued out-of-order. They read the AR or SR, execute the indicated operations, write the AR or SR and send instruction completion notice back to the DU. The DU then marks the instruction complete and can graduate the scalar instruction when it is the oldest instruction in the AL.

All scalar memory instructions are dispatched to AU 90. The AU issues the memory instructions in-order with respect to other scalar memory instructions, reads address operands from AR 56 and sends the instruction and operands to SLSU 134. For scalar store operations, the memory instruction is also dispatched to the AU or SU to read the write data from the AR or SR and send this data to SLSU 134.

The SLSU 134 performs address translation for the memory operations received from the AU in-order, sends instruction commitment notice back to the DU, executes independent memory operations out-of-order. For scalar loads, when load data is written into the AR or SR, the AU or SU transmits instruction completion notice back to the DU. Scalar store instruction completion is sent by the EIU 116 to the DU when the write data has been sent off to cache 24.

Branch instructions are predicted in the IFU before being sent to the DU. The DU dispatches the branch instruction to either the AU or SU. The AU or SU issues the instruction, reads AR or SR, and sends the operand back to the IFU. The IFU determines the actual branch outcome, signals promote or kill to the other units and sends completion notice back to the DU.

The IFU supplies a stream of instructions to Dispatch Unit (DU) 119. This stream of instructions can be speculative because the IFU will predict the result of branches before the outcome of the branch is resolved. AU 90 and SU 92 communicate with the IFU to resolve any outstanding predicted branches. For branch instructions that are predicted correctly, the branch instruction is simply promoted by the IFU. For branch mispredictions, the IFU will signal a mispredict to the other units, restart fetching instructions at the correct instruction address and supply the proper instruction stream to the DU.

Instructions can enter the AL speculated on one or two previous branch predictions. Each instruction is dispatched with a two bit branch mask, one for each branch prediction register. Instructions can be dependent on either or both branch prediction. A new branch prediction is detected at the point in the instruction dispatch stream where a branch mask bit is first asserted. A copy of the AL tail pointer is saved on each new branch prediction. If the branch is later killed, the tail pointer is restored using the saved copy.

At most one new prediction can be dispatched per clock cycle. All predictions are either promoted or killed by the Branch Prediction Logic (BPL). There can be two promotions in a LCLK, but only one branch kill. If there are two outstanding branches, a kill of the older prediction implies a kill of the younger branch prediction. The tail will be restored using the saved tail from the older branch prediction, while the saved tail from the younger prediction is discarded.

Another responsibility of the AL logic is to maintain memory consistency. The AL logic orders memory references in the SLSU 134 and VLSU, it informs the SLSU 134 when scalar memory references have been committed so references can be sent to memory, and the AL logic communicates with other units to perform memory synchronization instructions. The AL logic uses the AL to perform these tasks.

Because of a potential deadlock, no vector store reference can be sent to memory prior to a scalar or vector load that is earlier in program order. Vector load to vector store ordering is done by a port arbiter in EIU 116 while the AL is used to enforce scalar load to vector store ordering.

A scalar load will have a reference sent bit set in the AL if the load hits in the Dcache, or when the port arbiter in the EIU acknowledges the scalar load. The AL has a "reference sent" pointer. This pointer is always between the graduation and scalar commit pointers. The reference sent pointer will advance unless the instruction it points to is a scalar load without its reference sent bit set. When the pointer advances past a vector store instruction, it increments a vector store counter in the VLSU. A non-zero count is required for the VLSU 111 to translate addresses for a vector store reference. The vector store counter is decremented when vector memory issue starts translation of addresses for a vector store instruction.

Scalar loads are initially dispatched in the may trap state. If the address generation and translation in the SLSU 134 results in either a TLB miss or an address error, the complete bit is set, indicating a trap. If translation passes, the trap bit is cleared. Scalar loads to non-I/O space may be satisfied in the Dcache or make memory references immediately after successful address translation. The instruction will later complete when the memory load data is written to a physical register. Scalar load references may bypass previous scalar stores provided the loads are to different addresses.

Prefetch instructions are initially dispatched to the SLSU 134 in the may trap state but never generate a trap. The trap bit is always cleared and complete bit set after address translation in the SLSU 134. If the address translation was unsuccessful, the prefetch instruction acts as a NOP, making no Dcache allocation or memory reference.

Vector instructions are dispatched in-order from DU 119 to VDU 117. VDU 117 dispatches vector instructions to both VU 113 and VLSU 111 in two steps. First, all vector instructions are vpredispatched in-order in the VDU after all previous instructions are scalar committed. The VDU 117 separates the stream of vector instructions into two groups of vector instructions, the VU instructions and VLSU instructions. All vector instructions are sent to the VU 113, but only vector memory instructions and instructions that write VL 124 and VM 126 sent to the VLSU 111.

Figure 1I:
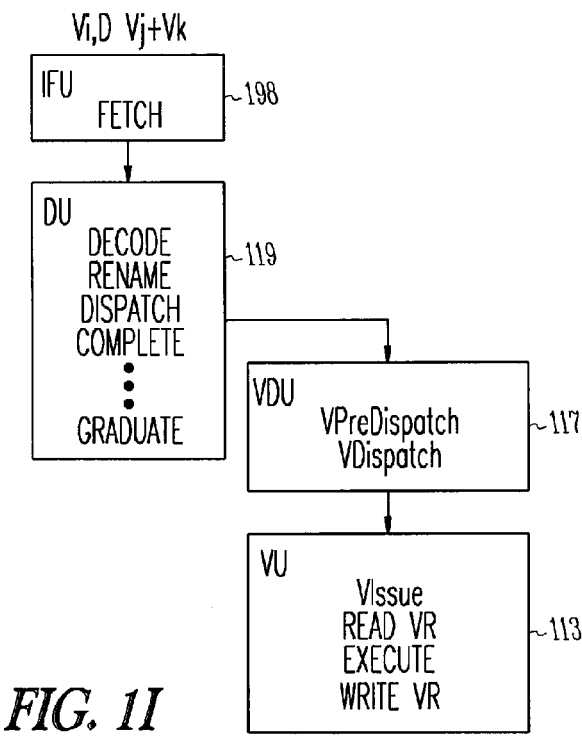
FIG. 1I shows instruction flow for some vector instructions according to the invention.

FIG. 1I shows instruction flow for some vector instructions according to the invention. Vector instructions that are not vector memory instructions or require no scalar operands are marked complete by the DU at dispatch. An example of the instruction flow of such a vector instruction is shown in FIG. 1I. This instruction class can then graduate from the active list before the VDU has vdispatched them to the VU.

Figure 1J:
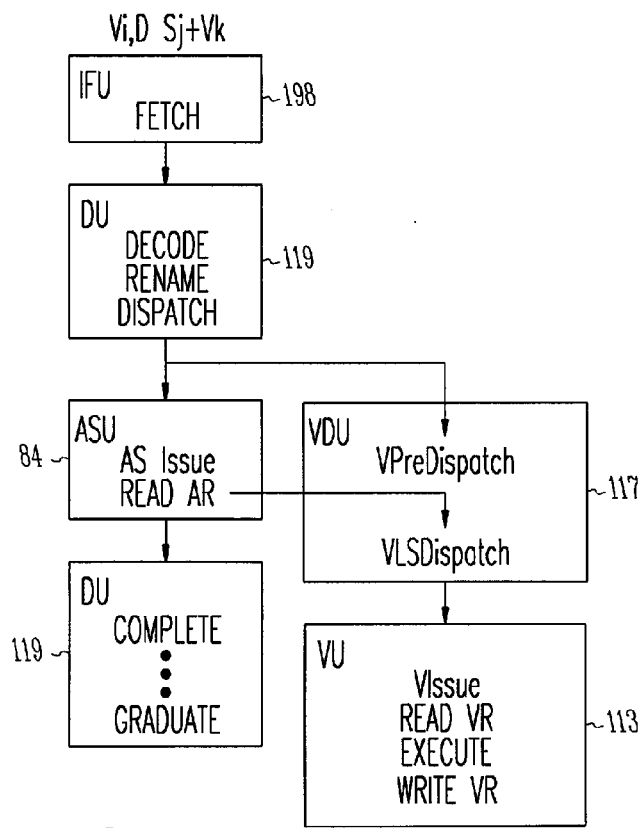
FIG. 1J shows instruction flow for some vector instructions according to the invention.

FIG. 1J shows instruction flow for some vector instructions according to the invention. For vector instructions that require scalar operands, the DU also dispatches the vector instructions to the AU and/or SU. An example of the instruction flow of such a vector instruction is shown in FIG. 1J. The vector instruction is issued out-of-order in the AU and/or SU, then reads AR and/or SR, and finally sends the scalar operand(s) to the VDU where it is paired with the vector instruction. VDU 117 then vdispatches the instruction and data in-order to the VU. Vector instructions that are not memory instructions but do require scalar operand(s), are marked complete in the AL when the scalar operand(s) have been read in the AU and/or SU.

Vdispatch and vlsdispatch are decoupled from each other. For vector instructions that are forwarded to the VLSU, the VDU collects all required scalar operands and vlsdispatches the instruction and data in-order to the VLSU.

Figure 1K:
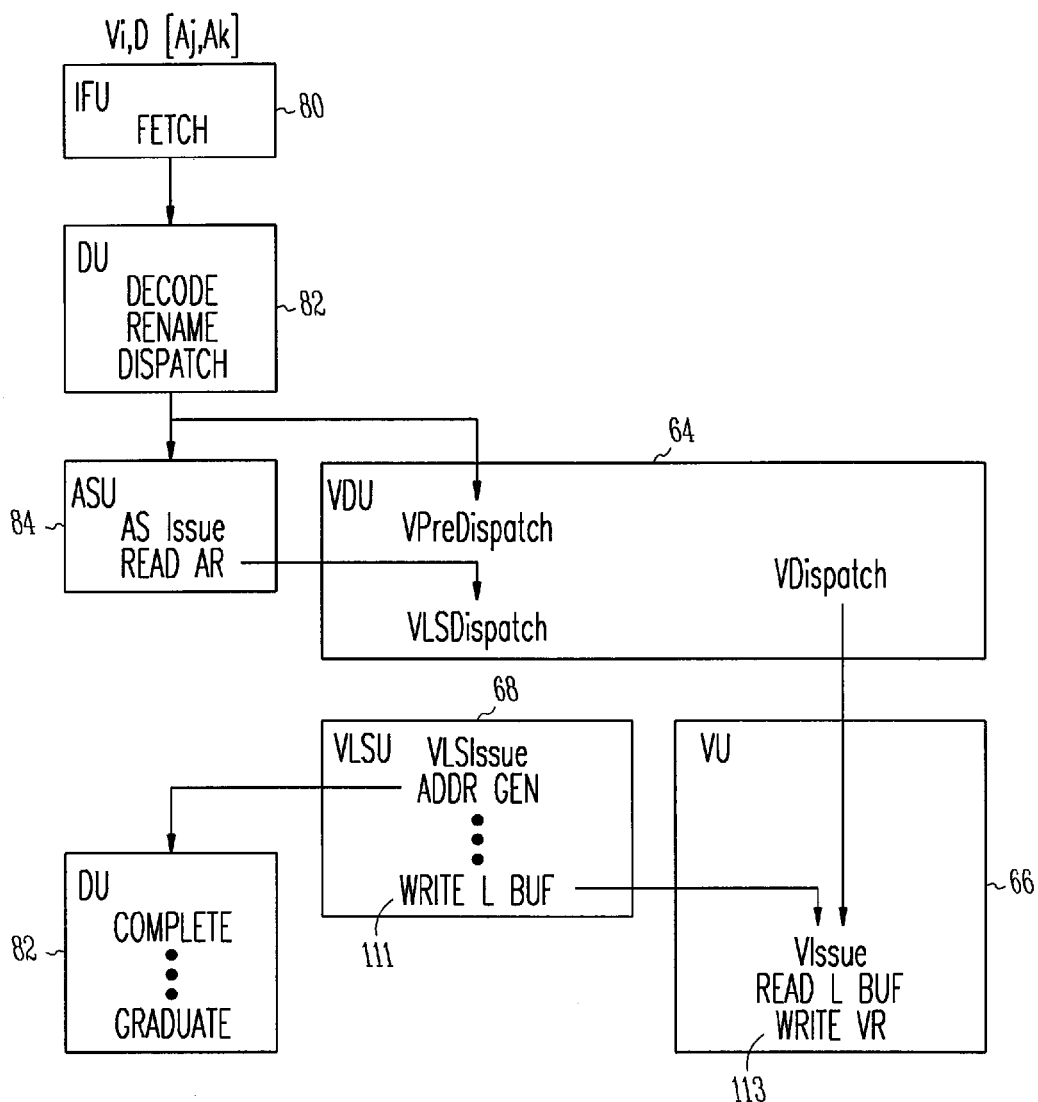
FIG. 1K shows instruction flow for some vector instructions according to the invention.

FIG. 1K shows instruction flow for some vector instructions according to the invention. Vector memory instructions are dispatched to both the VU 113 and VLSU 111. An example of the instruction flow of such a vector instruction is shown in FIG. 1K. Vector memory operations execute in the VLSU 111 decoupled from the VU 113 and send vector memory instruction completion notices back to the DU after vector address translation.

If a vector memory instruction results in a translation fault, VLSU 111 asserts a Vector Translation Trap. The instruction in DU 119 reaches the commit point but it won't pass the commit point. It stays there and the rest of the instructions move along and all graduate.

Instructions are not allowed to modify the permanent architectural state until they graduate. Since the instruction that caused the translation fault is not allowed to graduate, you have a clear indication of where to restart. The operating system patches up the memory and the program gets restarted at that point.

Errors in the VU 113 are handled differently. The vector execution unit makes all of its references and all of its instructions in order so, if it has a fault, it just stops.

For vector load instructions, the VU 113 issues the vector memory instruction in-order after address translation has completed in the VLSU 111 and all load data has returned from the memory system. Next, the VU 113 reads data from the LB and writes the elements in the VR.

For vector store instructions, the VU 113 waits for completion of address translation in the VLSU, issues the store instruction, and reads the store data from the VR.

For non-memory instructions, the VU 113 issues the vector instruction in-order, reads VR(s), executes the operation in the VU's two vector pipes and writes the results into the VR.

Instructions are dispatched to AU 90, SU 92 and VDU 117 by DU 119. The DU will dispatch one class of instructions to only one unit, other instructions to two units, and other instruction types to all three units.

In some embodiments, DU 119 receives a group of eight instructions from IFU 198 per LCLK. Only one of these instructions can be a branch or jump instruction. Some of these instructions in the group may be invalid.

The DU 119 decodes the instruction group, determines register dependencies, renames instructions that require renaming, dispatches up to four instructions per LCLK to the AU, SU, and/or VDU, and then tracks the state of the instructions in the execution units. Outgoing instructions are queued in the AU, SU, and VDU instruction queues. When instructions have completed in the execution units, the DU is informed and the instructions are graduated in order.

Decode Logic (DL) in the DU receives up to eight valid instructions from the IFU per LCLK. This instruction group is aligned to a 32-Byte boundary. Some of the instructions may not be valid because of branch and jump instructions within the group of eight instructions. A control transfer to a instruction within a group of eight, will have the instructions before the target instruction invalid.

The DL can decode up to 4 instructions per LCLK. These instructions must be naturally aligned on sixteen-byte boundaries. The DL will determine, for each instruction, the instruction attributes, instruction register usage, and instruction destinations for dispatch. The DL will then advance this decoded information to the register renaming logic.

Renaming Logic (RL) in the DU accepts up to 4 decoded instructions from the DL per LCLK. The RL determines instruction register dependencies and maps logical registers to physical registers. The AR and SR operand registers of the instructions in the group are matched against the AR and SR result registers of older instructions. This means that the operands must be compared to older instructions within the instruction group and also to older instructions that have already be renamed in earlier Lclk.

The RL uses a simpler method for register renaming than true general register renaming. This method is termed Register Shadowing. In register shadowing, AU 90 and SU 92 use RAM in their respective units for AR 56 and SR 58, respectfully. The logical AR/SR are mapped to the physical elements of the RAM to allow 8 specific physical elements of the RAM per logical AR/SR. This means that logical A5 will be mapped to only one of eight physical registers (A5, A69, A133, A197, A261, A325, A389, A453). Logical A0 and S0 will never be renamed because they are always read as zero.

The mapping of logical registers to physical registers for each AR and SR is maintained by a 3-bit user invisible Shadow Pointer (SP) for each logical register (SP_A0_SP_A63, SP_S0_SP_S63). At reset all SPs are cleared to zero.

When a AR/SR is used as an operand in a instruction, the SP of that register is used to determine the current physical register. This physical register number is then used as the operand register when the instruction executes in one of the execution units.

When an AR/SR is used as a result register, the SP is incremented by one to point to a new physical register. This physical register will then be written to when the instruction executes in one of the execution units. For any instructions after this instruction that use the same logical register as an operand, it will be mapped to this new physical register.

To control the renaming of the physical registers, each AR/SR logical register is mapped to a 3-bit user invisible Free Shadow Count (FC) register (FC_A0_FC_A63, FC_S0_FC_S63). At reset the FC registers are set to seven. For each assignment of a new physical register, the associated FC register is decremented by one. Each time an instruction is graduated that assigned a new physical register, the associated FC for that logical register is incremented by one. If the RL tries to rename a logical register that has a FC of zero, the RL holds this instruction and all younger instructions in the group until a physical register is free by graduating an instruction that assigned a physical register to that logical register.

The RL also controls the remapping of physical registers to logical registers after a branch mispredict. The RL needs to have the capability of restoring the mapping back to the mapping at the time of the branch instruction that was mispredicted. The RL accomplishes this by maintaining two user invisible 3-bit Branch Count registers (BC0, BC1) for each AR and SR. Each BC is associated with one of the two possible outstanding branch predictions.

The BCs count the number of allocations that have been made to a specific logical register since the predicted branch instruction. For each speculative physical register assignment after the speculative branch instruction, the current BC for that speculative branch and logical register is incremented by one. If a second branch is encountered before the first branch is resolved, the other sixty-four BC registers are incremented for register allocation.

When the outcome of a speculative branch is resolved, the SP, FC, BC0 and BC1 registers for all ARs and SRs may be modified. For branches that are predicted correctly, the associated BC is cleared to zero. For branches that are predicted incorrectly, the FC registers are incremented by the amount in both the BC0 and BC1 registers, the SP registers are decremented by the amount in both the BC0 and BC1 registers, and both BC0 and BC1 registers are cleared to zero. This restores the logical to physical mapping to the condition before the speculative branch.

The other circumstance where the RL needs to restore the register mapping is when a precise trap is taken. This could be for scalar or vector loads or stores that have a TLB exception. To recover back to the renamed state of the trapping instruction, the SP registers are set equal to the current contents of the SP registers minus seven plus the associated FC register. The FC registers are then set to seven, and the BC0 and BC1 registers are cleared.

Vector Unit (VU 113)

Figure 3:
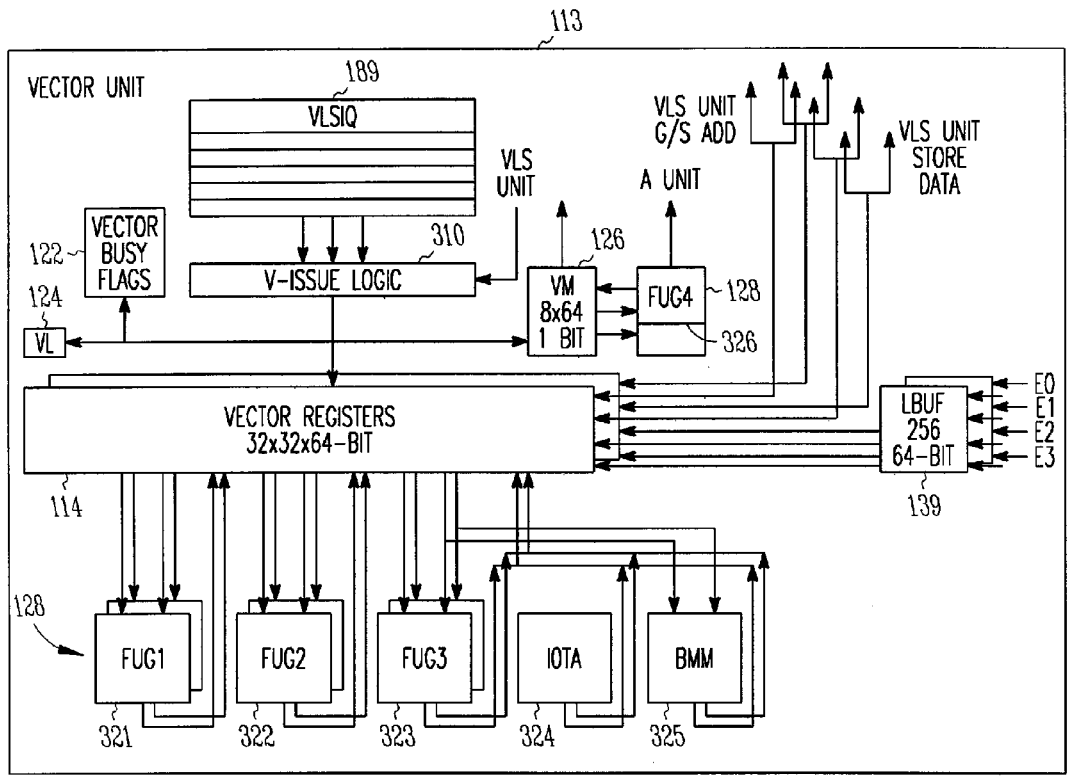
FIG. 3 shows a block diagram of VU 113 of some embodiments.

FIG. 3 shows a block diagram of VU 113 of some embodiments. The VU 113 performs the vector integer and floating-point operations in the Vector Section (VS) 118 and one component of vector memory operations. The VU, shown in FIG. 3, is a two-pipe vector unit that is decoupled from the Scalar Section (SS 112) and the Vector Load/Store Unit (VLSU 111). The VU 113 receives one vector instruction per LCLK from the Vector Dispatch Unit (VDU 117) in-order and v issues these instructions in-order at a maximum of one instruction per LCLK. For most vector instructions the VU 113 will then read multiple operand elements of the Vector Register (VR 114) file, execute multiple vector operation, and write multiple result elements to the VR. Different vector instructions can operate out-of-order within the VU 113.

Vector instructions are received from the VDU and placed in the Vector Instruction Queue (VIQ 189). The VIQ 189 can receive one vector instruction per LClk from the VDU 117 and can contain up to six valid instructions. If the vector instruction requires scalar operands, the operands are dispatched to VU with the vector instruction. If the vector instruction will write a VR, a Vector Busy Flag (VBFlag) index is also sent with the instruction. The VDU will not vdispatch a vector instruction to VU before all previous scalar instructions have been committed. All vector instructions are sent to the VU 113.

The Vector Issue Logic (VIL 310) of the VU reads the first valid vector instruction in the VIQ, resolves all VR conflicts, any functional unit conflicts, and then vissues the vector instruction. When a vector instruction is vissued, the VIL 310 sets the correct VR busy, busies the appropriate functional unit, and clears the indicated VBFlag if needed.

Most vector instructions in the VU 113 are executed in the two Vector Pipes (VP0, VP1). Each VP includes, in some embodiments, one copy of the Custom Block (CB) and some additional functions.

Vector Registers 114

The thirty-two 64-bit VRs, each 64-elements deep (MaxVL), are split between the two VPs as shown in The description Vector Registers for 64-bit Operations and The description Vector Registers for 32-bit Operations. There are 32 logical and 32 physical VRs with no register renaming. Each VP includes, in some embodiments, 32 elements of each VR and are stored in the Custom Register RAM (CRR) of the CB. The 64 elements are split between the VPs by bit 1 of the 6-bit element number. VP0 includes, in some embodiments, vector elements that have bit 1 set to 0, and VP1 includes, in some embodiments, vector elements that have bit 1 set to 1. When performing 64-bit operations, the VRs are 64-bits wide and each element is stored in one 64-bit CRR element. When performing 32-bit operations, the VRs are 32-bit wide and two consecutive elements in a VP are stored in one 64-bit CRR element. The MaxVL for 32-bit operations remains at 64 elements. This vector register organization has two benefits.

One, it allows for 64-bit to 32-bit and 32-bit to 64-bit converts to be executed within a VP. Second, it allows 32-bit operations to execute at 4 results per VP per LCLK. Because each VR can have a 64-bit element read and written per SClk, with two 32-bit elements packed to one 64-bit element of the CRR, reading 32-bit VR operands can operate at 4 elements per VP per LCLK.

Vector Functional Unit Groups 128

Each VP also includes, in some embodiments, the three Functional Unit Groups (FUG1 321, FUG2 322, FUG3$c$ 323). FUGs 124, in some embodiments, are groups of functional units that share common operand and result paths. By sharing paths, only one functional unit in the FUG can be executing at a time.

FUG1 321 includes, in some embodiments, the following vector integer and floating-point functional units: Integer Add/Subtract, Floating-point Add/Subtract, Logical, Integer Compare, and Floating-point Compare.

All FUG1's operations can be 32-bit or 64-bit operations. FUG1's functional units share two operand paths and one result path. Only one 64-bit operation can be performed in the FUG1 per SClk. Two 32-bit operations can be performed per SClk.

FUG2 322 includes, in some embodiments, the following integer and floating-point functional units: Integer Multiply, Floating-point Multiply, and Shift.

All FUG2's operations can be 32-bit or 64-bit operations. FUG2 also has it own two operand paths and one result path for the three functional units and can perform only one 64-bit or two 32-bit operation per SClk.

FUG3$c$ 323 includes, in some embodiments, the following integer and floating-point functional units: Floating-point Divide, Square Root, Leading Zero, Pop Count, Copy Sign, Absolute Value, Logical, Integer Convert, Floating-point Converts, and Merge.

All of FUG3's operations can be 64-bit or 32-bit operations. FUG3$c$ 323 has two operand paths, one result path. All operations but Div/Sqrt can perform one 64-bit or two 32-bit operations per SClk. FUG3$c$ can perform one 64-bit Div/Sqrt operation every fourth LCLK and 32-bit operations once every two LCLK. can Both FUG3$c$ for VP0 and VP1 shares one operand path and its result path with two functional units external to the VP0 and VP1.

The Bit Matrix Multiply (BMM 325) functional unit and the Iota (IOTA 324) functional unit are external to VP0 and VP1. To provide vector operands to the BMM 325, one of FUG3$c$'s operand paths in each VP is muxed to an external path. The two external operand paths from VP0 and VP1 are connected to the BMM unit. To move results of the BMM to the VR, the result path of FUG3$c$ in both VPs is muxed with the BMM result path. The BMM functional unit is capable of two 64-bit results per LCLK.

The IOTA functional unit 324 requires no vector operands but does generate two 64-bit vector results per LCLK. These results are also muxed to FUG3$c$'s result path in each VP.

FUG4 326 is a functional unit that performs the following operations on VMs: Fill, Last element set, First Element Set, Pop Count, and Logical.

This FUG4 326 does not read the VRs, but performs single operations by reading and writing the VMs. All these operations are MaxVL-bit operations (64). One FUG4 operation can be issued per LCLK.

Vector Control

To control the number of vector operations that are performed for each vector instruction, the VU 113 includes, in some embodiments, two other register sets, the Vector Length Register (VL 124) and eight Vector Mask Registers (VM 126).

The VL register 124 includes, in some embodiments, a value between 0 and MaxVL and limits the number of vector elements that are read, vector operations that are performed, and vector elements that are written when a vector instructions is vissued. The 64-bit VL register is set by an AR operand from the AU and can be read back to an AR.

The VM 126 are used to control vector instructions on a per element basis and can also contain the results of vector comparison operations. The eight VMs are each 1-bit wide and MaxVL elements long.

Not all vector instructions are performed under the control of VL and VMs. Vector instructions that do execute under the control of VL and/or VM are called elemental vector instructions. The description VL and VM Controlled Vector Instructions shows which vector instructions operate under the control of VL and/or VM.

For elemental vector instructions, the current contents of VL is read at vissue to determine the number of operations to perform. At vissue, if VL is currently zero, no vector operations are performed. The only elemental vector operations that are not executed under the control of VL are vi scan(ak, mj) and vi cidx(ak,mj). These two instructions always execute MaxVL elements.

Most elemental vector operations also use a VM to control the vector instruction on a per element basis. At vissue, the specified VM is used to control which of the VL elements are written. For VM's elements that are set to one, the indicated operations are performed on the corresponding elements. For VM elements that are cleared, the operations may still be performed but the VR elements will be written, no exception generate, and no data will be written to memory. The BMM vk vector instruction is not controlled by VM.

For instructions that are not elemental vector instructions, the number of operations performed is not determine by the contents of VL and VMs. Most non elemental vector operations are memory ordering instructions, single element moves between AR/SRs and the VRs, and VM operations.

Vector Operation

VDU 117 controls the vector instruction flow to VU 113 and VLSU 111. No branch speculative or scalar speculative vector instructions are sent to the VU 113 or VLSU 111 from the VDU. Because no scalar speculative vector instructions are sent to the VU 113 and VLSU, the vector units do not have to support a precise trap due to a previous scalar instruction that trapped in SS 112.

The VDU performs five functions. The first role of the VDU is to enforce the scalar commitment of previous scalar instructions. The second action of the VDU is to separate the vector instruction stream into two streams of instructions: VU instructions and VLSU instructions. The third role of the VDU is to establish the communication required between the VU 113 and VLSU 111 for vector instructions that are sent to both units and demand coupling. The fourth duty of the VDU is to assemble all scalar operands that are required for a vector instruction. The AU and SU will pass these scalar operands to the VDU. Finally, the VDU dispatches vector instructions to the VU 113 and VLSU. The VDU performs these functions in two stages.

The first stage of the VDU is the Vector PreDispatch Logic (VPDL). The VPDL performs the first three functions of the VDU. Vector instructions are dispatched to the Vector Pre-Dispatch Queue (VPDQ) in-order from the Dispatch Unit (DU). The VPDQ can receive two vector instructions per LCLK from DU 119 and can contain up to thirty-two vector instructions. Each LCLK, the VPDL attempts to vpredispatch the instruction at the head of the VPDQ to the Vector Dispatch Queue (VDQ) and/or the Vector Load/Store Dispatch Queue (VLSDQ).

Before the VPDL can pass the instruction to the VDQ and/or VLSDQ, all previous scalar instructions must be committed. Scalar commitment notice is sent from the Active List (AL) in the Dispatch Unit (DU). Each time the scalar commit pointer moves pass a vector instruction in the AL, the DU sends the VDU a go_vdisp signal that indicates that it is safe to remove a vector instruction from the VPDQ. VDU can receive up to four separate go_vdisp[0-3] signals per LCLK. The VDU maintains a counter that is incremented each time a go_vdisp signal is received. The VPDL determines that the vector instruction at the head of the VPDQ has no previous scalar speculative instructions if this counter is greater than zero. Each time the VPDL removes a instruction from the VPDQ, it decrements this counter.

Because the VU 113 and the VLSU 111 are decoupled from each other, there needs to be a method to ensure that the VLSU 111 does not execute instructions that require vector register operands before the last write of that register in the vector instruction stream in VU. To allow for this coupling between the VU 113 and VLSU, the VDU and VU 113 contain three structures.

The Vector Busy Flag (VBFlag) registers includes ninety-six 1-bit registers (VBFlag0-VBFlag95). One flag is assigned to each vector instruction that writes a vector register. These registers are located in VU 113.

At reset, VBFlags are cleared.

The Vector MAP (VMAP) structure contains thirty-two 7-bit registers (VMAP0_VMAP31) that contain the VBFlag register index which was assigned to the last vector instruction in program order that wrote to the corresponding vector register. VMAP0 will have the VBFlag index that is mapped to V0 and VMAP31 will contain the VBFlag for V31. The VMAP registers are located in the VDU.

At reset, VMAP0 is set to sixty-four, VMAP1 to sixty-five, etc.

The VDU also contains the Vector Busy Free Queue (VBFQ) which includes sixty-four 7-bit entries that contain the VBFlags that are currently not allocated to any vector instruction pass the VPDL.

At reset, the sixty-four entries are initialized to 0-63.

For each vector instruction that writes a VR a VBFlag must be mapped before the VPDL can send the vector instruction to the VDQ and/or the VLSDQ. The VPDL will read the current VMAP entry for Vi, the result register number, push this VBFlag index onto the VBFQ, dequeue the head of the VBFQ, and write this new VBFlag index into the corresponding VMAP entry. The new VBFlag register in VU 113 will be marked busy, and the VBFlag index will be passed to the VDQ and/or the VLSDQ with the instruction. When the vector instruction is issued in the VU, the indexed VBFlag will be cleared by the VU. Because the maximum number of vector instructions that can be active after the VPDL is less than ninety-six, there will always be a VBFlag index in the VBFQ.

For each vector gather/scatter instruction, the VPDL uses the Vk register number to index into the VMAP registers. The current VBFlag index contained in the VMAP table entry is read and passed with the vector instruction to VLSDQ. When the instruction tries to issue in the VLSU, the VBFlag that the index points to is checked to see if it is still set. If the VBFlag is set, the last write of the vector registers has not executed in the VU, so the instruction will hold issue. If the VBFlag is clear, the instruction is allowed to be issued if there are no other hold issue conditions.

Once the VPDL has receive notice from the AL and has mapped the VBFlags, it will vpredispatch the vector instruction to the VDQ and/or the VLSDQ. All vector instructions are vpredispatched to the VDQ but only vector memory instructions and vector instructions that write VL and VM are sent to the VLSDQ.

The second stage of the VDU, which performs the last two functions of the VDU, are executed in the Vector Dispatch Logic (VDL) and the Vector Load/Store Dispatch Logic (VLSDL). The VDL and the VLSDL perform the same functions, but execute decoupled from each other.

The VDL assembles the required AU and SU scalar operands for each vector instructions bound for VU 113 and then vdispatches these instructions and associated data to the VU. The VLSDL assembles the required AU operands for the vector instructions to be sent to VLSU 111 and vlsdispatches these instructions and required data to the VLSU. The VDL and VLSDL uses seven queues to gather the vector instructions and scalar operands:

1) The Vector Dispatch Queue (VDQ) can contain forty-eight valid entries of instructions bound for the VU. The queue can accept one instruction per LCLK from the VPDL and the VDL can remove one instruction per LCLK from VDQ.

2) The Vector AJoperand Queue (VAJQ) contains Aj operands that were read in program order in the AU and sent to the VDU. This queue can contain up to thirty-two valid entries and is capable of accepting one operand per LCLK from the AU.

3) The Vector AKoperand Queue (VAKQ) contains Ak operands that were read in program order in the AU and sent to the VDU. This queue can contain up to thirty-two valid entries and is capable of accepting one operand per LCLK from the AU.

4) The Vector SKoperand Queue (VSKQ) contains Sk operands that were read in program order in the SU and sent to the VDU. This queue can contain up to thirty-two valid entries and is capable of accepting one operand per LCLK from the SU.

5) The Vector Load/Store Dispatch Queue (VLSDQ) can contain forty-eight valid entries of instructions bound for the VLSU. The queue can accept one instruction per LCLK from the VPDL and the VLSDL can remove one instruction per LCLK from the VLSDQ.

6) The Vector Load/Store AJoperand Queue (VLSAJQ) contains Aj operands that were read in program order in the AU and sent to the VDU. This queue can contain up to thirty-two valid entries and is capable of accepting one operand per LClk from the AU.

7) The Vector Load/Store AKoperand Queue (VLSAKQ) contains Ak operands that were read in program order in the AU and sent to the VDU. This queue can contain up to thirty-two valid entries and is capable of accepting one operand per LClk from the AU.

All five operand queues can receive data from the AU or SU speculatively. If a branch was mispredicted, a kill signal will be sent from the IFU and all operand data that has been speculatively written into the operand queues after the mispredicted branch will be removed.

In operation, the VDL dequeues the head of the VDQ and determine if any operands are required for this vector instruction. If operands are required, the VDL attempts to read the head of the indicated operand queues. If all operands are ready, the VDL vdispatches the instruction and data together to the VU 113.

In operation, the VLSDL dequeues the head of the VLSDQ and determine if any operands are required for this vector instruction. If operands are required, the VLSDL attempts to read the head of the indicated operand queues. If all operands are ready, the VLSDL vlsdispatches the instruction and data together to the VLSU.

Order is maintained between the two instructions queues and operand queues by receiving instructions in program order from the VPDL and by also receiving operands from the AU and SU in program order.

VU 113 is a two pipe vector unit that is decoupled from SS 112 and VLSU 111. VU 113 receives one vector instruction per LClk from VDU sixty-four in-order and v issues these instructions in-order at a maximum of one instruction per LClk. For most vector instructions the VU 113 will then read multiple operand elements from a VR file 70, execute multiple vector operation, and write multiple result elements to the VR. Different vector instructions can operate out-of-order within VU 113.

Vector instructions are received from VDU 117 and placed in Vector Instruction Queue (VIQ) 81. VIQ 81 can receive one vector instruction per LClk from VDU 117 and can contain up to six valid instructions. If the vector instruction requires scalar operands, the operands are dispatched to VU 113 with the vector instruction. If the vector instruction will write a VR, a Vector Busy Flag (VBFlage) index is also sent with the instruction. VDU 117 will not vdispatch a vector instruction to VU 113 before all previous scalar instructions have been committed. All vector instructions are sent to VU 113.

Vector Issue Logic (VIL) of VU 113 reads the first valid vector instruction in VIQ 81, resolves all VR conflicts, any functional unit conflicts, and then vissues the vector instruction. When a vector instruction is vissued, the VIL sets the correct VR busy, busies the appropriate functional unit, and clears the indicated VBFlag if needed.

Most vector instructions in the VU 113 are executed in the two Vector Pipes (VP0, VP1).

The thirty-two 64-bit VRs, each 64-elements deep (MaxVL), are split between the two VPs. There are thirty-two logical and thirty-two physical VRs with no register renaming. Each VP contains thirty-two elements of each VR 70 and are stored in RAM in a similar manner to that used for SR 58 and AR 56.

The sixty-four elements are split between the VPs by bit 1 of the 6-bit element number. VP0 contains vector elements that have bit 1 set to 0, and VP1 contains vector elements that have bit 1 set to 1. When performing sixty-four-bit operations, the VRs are sixty-four-bits wide and each element is stored in one 64-bit CRR element. When performing 32-bit operations, the VRs are 32-bit wide and two consecutive elements in a VP are stored in one 64-bit CRR element. The MaxVL for 32-bit operations remains at sixty-four elements.

This vector register organization has two benefits. One, it allows for 64-bit to 32-bit and 32-bit to 64-bit converts to be executed within a VP. Second, it allows 32-bit operations to execute at 4 results per VP per LClk. Because each VR can have a 64-bit element read and written per SClk, with two 32-bit elements packed to one 64-bit element of the CRR, reading 32-bit VR operands can operate at 4 elements per VP per LClk.

In the embodiment of processor 100 shown in FIG. 1H, each vector pipe includes three functional unit groups (FUG1, FUG2 and FUG3). The functional unit groups share common operand and result paths. Since they share paths, only one functional unit in each FUG can be executing at a time.

In some embodiments, FUG1 contains the following vector integer and floating-point functional units: Integer Add/Subtract, Floating-point Add/Subtract, Logical, Integer Compare, and Floating-point Compare. All of FUG1's operations can be either 32-bit or 64-bit operations. FUG1's functional units share two operand paths and one result path. Only one 64-bit operation can be performed in FUG1 per SClk. Two 32-bit operations can be performed per SClk.

FUG2 contains the following integer and floating-point functional units: Integer Multiply, Floating-point Multiply, and Shift. All FUG2's operations can be either 32-bit or 64-bit operations. FUG2's functional units also share two operand paths and one result path for the three functional units. It also can perform only one 64-bit or two 32-bit operation per SClk.

FUG3c contains the following integer and floating-point functional units: Floating-point Divide, Square Root, Leading Zero, Pop Count, Copy Sign, Absolute Value, Logical, Integer Convert, Floating-point Convert, and Merge.

All of FUG3's operations can be either 64-bit or 32-bit operations. FUG3c has two operand paths and one result path. All operations but Divide and Square Root can perform one 64-bit or two 32-bit operations per SClk. FUG3c can perform one 64-bit Divide or Square Root operation every fourth LClks and 32-bit operations once every two LClks. Both FUG3c for VP0 and VP1 shares one operand path and its result path with two functional units external to the VP0 and VP1 (the Bit Matrix Multiply Unit and the Iota Functional Unit).

FUG4 is a functional unit that performs the following operations on VMs: Fill, Last element set, First Element Set, Pop Count, and Logical. This functional unit does not read the VRs, but performs single operations by reading and writing the VMs. All these operations are MaxVL-bit operations (sixty-four). One FUG4 operation can be issued per LClk.

To control the number of vector operations that are performed for each vector instruction, the VU 113 contains two other register sets, the Vector Length Register (VL) 122 and eight Vector Mask Registers (VM) 126.

The VL register 122 contains a value between 0 and MaxVL and limits the number of vector elements that are read, vector operations that are performed, and vector elements that are written when a vector instructions is vissued. The 64-bit VL register 122 is set by an AR operand from the AU and can be read back to an AR.

The Vector Mask Registers are used to control vector instructions on a per element basis. They can also contain the results of vector comparison operations.

The eight VMs are each 1-bit wide and MaxVL elements long. Not all vector instructions are performed under the control of VL 124 and VM 126. Vector instructions that do execute under the control of VL 124 and/or VM 126 are called elemental vector instructions For elemental vector instructions, the current contents of VL 124 are read at vissue to determine the number of operations to perform. At vissue, if VL 124 is currently zero, no vector operations are performed. The only elemental vector operations that are not executed under the control of VL 124 are vi scan(ak,mj) and vi cidx(ak,mj). These two instructions always execute MaxVL elements.

Most elemental vector operations also use a VM register to control the vector instruction on a per element basis. At vissue, the specified VM is used to control which of the VL elements are written. For VM register elements that are set to one, the indicated operations are performed on the corresponding elements. For VM register elements that are cleared, the operations may still be performed but no VR elements will be written, no exception generate, and no data will be written to memory. The bit matrix multiply (BMM vk) vector instruction is not controlled by VM.

For instructions that are not elemental vector instructions, the number of operations performed is not determined by the contents of the VL 124 and VM registers. Most non-elemental vector operations are memory ordering instructions, single element moves between AR/SRs and the VRs, and VM operations.

Vector Load/Store Operations

Vector memory load and store instructions perform different than the instructions that are executed in the FUGs. Vector memory operations are executed in both the VU 113 and the VLSU. The VLSU 111 executes decoupled from the VU, generates the addresses for the vector loads and stores, and sends them to EIU 116.

For vector loads, the VU 113 moves the memory data into the VR. For vector stores, the VU 113 reads a VR and sends the store data to the EIU. The store address and data is sent decoupled to the EIU. This process is described in patent application Ser. No. 10/643,742, entitled Decoupled Store Address and Data in a Multiprocessor System", filed on even day herewith, the description of which is incorporated herein by reference.

Vector load and gather instructions are executed using the load buffers 78 of the two VPs. Each VP of VU 113 contains a 256 by 64-bit entry load buffer (LB) 78 that is loaded with vector memory data by VLSU 111. In some embodiments, LBs 78 are separated into eight individual load buffers (LBUF0-LBUF7), each sixty-four 64-bit elements deep.

When a vector load instruction reaches the head of the VIQ 81, the Vector Issue Logic performs two issue checks. First, the vector result register must be not busy. Second, VLSU 111 must have generated all the vector memory addresses without an address fault, and indicated this to VU 113 by setting the control for one of the eight LBs 78. The VIL will then issue the vector load or gather instruction to the control section of one of the eight LBs. When all the memory load data has been loaded into the LB for this load, the LB control will move the elements from the LB into the VR. Only the elements specified by VL 124 and the VM will be written into the VR. Eight moves from the LB to the VR can occur per LClk. When all of the elements have been removed from the LB, the LB is marked clear by VU 113 so VLSU 111 can reallocate it. If the addresses generated in the VLSU 111 generated a fault, VU traps.

Vector store and scatter instructions are also executed in both the VU 113 and VLSU 111. For vector store instructions, the VLSU 111 again generates all of the memory addresses, transmits them to the EIU, and send notice to the VU 113 if the addresses generated a fault. The VU, then waits for the vector store instruction to reach the head of the VIQ 81, checks if the VR to be stored is busy, verifies that the addresses generated in the VLSU 111 did not fault and then send the store data to the EIU for the elements that are indicated by the VL 124 and the VM. Each VP has an operand path from the VR to an external path that is linked to the EIU. This allows for four vector store data operands to be sent per LClk.

VLSU 111 will be discussed next. VLSU 111 is the vector address generation engine of processor 100. As note above, execution within VLSU 111 is decoupled from SS 112 and VU 113.

VLSU 111 generates addresses for VU 113. The VLSU 111 receives its vector instructions from VDU 117, interfaces with VU 113 for gather and scatter index operands, and transmits memory requests to EIU 116.

The VLSU 111 receives one instructions from the VDU per LClk. Instructions are placed in VLSIQ, which can contain up to six valid instructions. The VLSIQ receives any scalar operands needed for the vector instructions from VDU 117 with the instruction. The VLSU 111 receives all vector memory instructions and any vector instruction that writes a VL 124 or VM register. (VLSU 111 receives instructions that write VL 124 and VM registers because the VLSU 111 maintains its own private copy of the VL 124 and VM registers.

The Vector Load/Store Issue logic executing in VLSU 111 performs all the required checks for the vector memory instructions at the head of the VLSIQ and attempts to issue the instruction to Vector Address Generation logic. The Vector Load/Store Issue logic can issue one instruction per LClk.

The Vector Address Generation logic 130 generates four memory requests per LClk, performs four address translations per LClk using the four Vector TLBs (VTLB), and places the four physical addresses in one of four Vector Request Buffers (VRB0-VRB3).

As noted above, for vector loads, the VLSU 111 assigns one of eight LBs 78. For strided vector loads, the Vector Load/Store Issue logic only checks for a free LB 78 that can be allocated. If an LB 78 is free, it issues the load to the Vector Address Generation logic 130, assigns one of the eight LBs 78 to the vector load and informs VU 113 that the selected LB is valid. For vector gather instructions, the Vector Load/Store Issue logic needs to check for an allocatable LBUF and also that the VR needed for the index is valid and ready. The Vector Load/Store Issue logic uses the VBFlags to check to see that the VR needed for the index is valid and ready.

In some embodiments, VU 113 contains ninety-six VBFlags. For each vector instruction that writes a VR 114, VDU 117 assigns a VBFlag index to that instruction and sets the indexed VBFlag busy. When VU 113 issues the vector instruction, it clears this flag.

When a gather instruction is sent from VDU 117 to VLSU 111, it includes the last VBFlag index of the vector index (Vk). When the gather instruction reaches the head of the VLSIQ, the Vector Load/Store Issue logic checks to see if the indexed VBFlag in the VU is still set. If it is, the last write of the k-operand has not occurred and the Vector Load/Store Issue logic holds issue. If the VBFlag is cleared, the Vector Load/Store Issue logic 120 then requests the VR from the VU. When the VR is free, (it might still be busy from the instruction that cleared the VBFlag) the VU 113 will send the VR elements to the VLSU 111 four elements per LClk. The VU 113 reads these elements from the VR and sends them to the VLSU 111 through an external register path. The Vector Load/Store Issue logic also assigns an LB 78 to the gather instruction.

In some embodiments, all vector store instructions require verification that all previous scalar and vector loads have been sent to memory. Vector load to store ordering is done by EIU 116 while the scalar load to vector store ordering is enforced by Active List 94 in the DU 119 and by the Vector Load/Store Issue logic 120. The VLSU 111 receives a signal from AL 94 each time the "reference sent" pointer passes a vector store instructions. The VLSU 111 can receive four reference sent signals per LClk. The VLSU 111 increments a vector store counter each time it receives a signal. For the Vector Load/ Store Issue logic to issue a vector store instruction, the vector store counter must be non-zero. Each time a vector store instruction is issued, the counter is decremented.

For scatter operations, the VLSU 111 conducts the same VBFlag busy check that is performed for gather instructions. When the VBFlag is cleared, the VLSU 111 again asks the VU 113 for the VR and the VU 113 send the VLSU 111 four elements per LClk when the register if available.

The Vector Address Generation logic of the VLSU 111 receives the base address from the Vector Load/Store Issue logic. For strided references, it also receive the stride value from the VLSIL. For gather and scatter vector instructions it receives the vector indexes from the VU. The Vector Address Generation logic can generate up to four addresses per LClk. The number of addresses generated are determined by the contents of VL 124 and the selected VM. If the VL 124 is currently zero, no vector addresses are generated. For non-zero VL, the Vector Address Generation logic generates VL addresses. If the corresponding element in the selected VM is not set, this address is not passed to VTLB.

In some embodiments, VLSU 111 contains four VTLBs (VTLB0_VTLB3). All vector addresses are translated by the VTLBs and perform the required address check. The VTLB reports completion of translation and any error back to the DU. Possible errors are:

1) Address Error: unaligned access, or access to a privileged or reserved memory region;
2) VTLB Fault: miss in the TLB;
3) VTLB Conflict: multiple hits in the TLB; and
4) VTLB Modify Fault: store to a page marked read only.

After VTLB physical addresses are placed in Vector Request Buffers (VRB0-VRB3). Each VRB can contain sixty-four valid addresses.

For vector load instructions, the Vector Address Generation logic also creates a Vector Outstanding Request Buffer (VORB) entry for each vector address. The VORB contains 512 entries that is indexed by the transaction ID (TID) sent to the E Chip 101 in the request packet and returned in the response. Each VORB entry contains LB 78 indexes that point to the LB 78 entry that the data should be loaded into when it returns from E Chip 101.

Figure 1L:
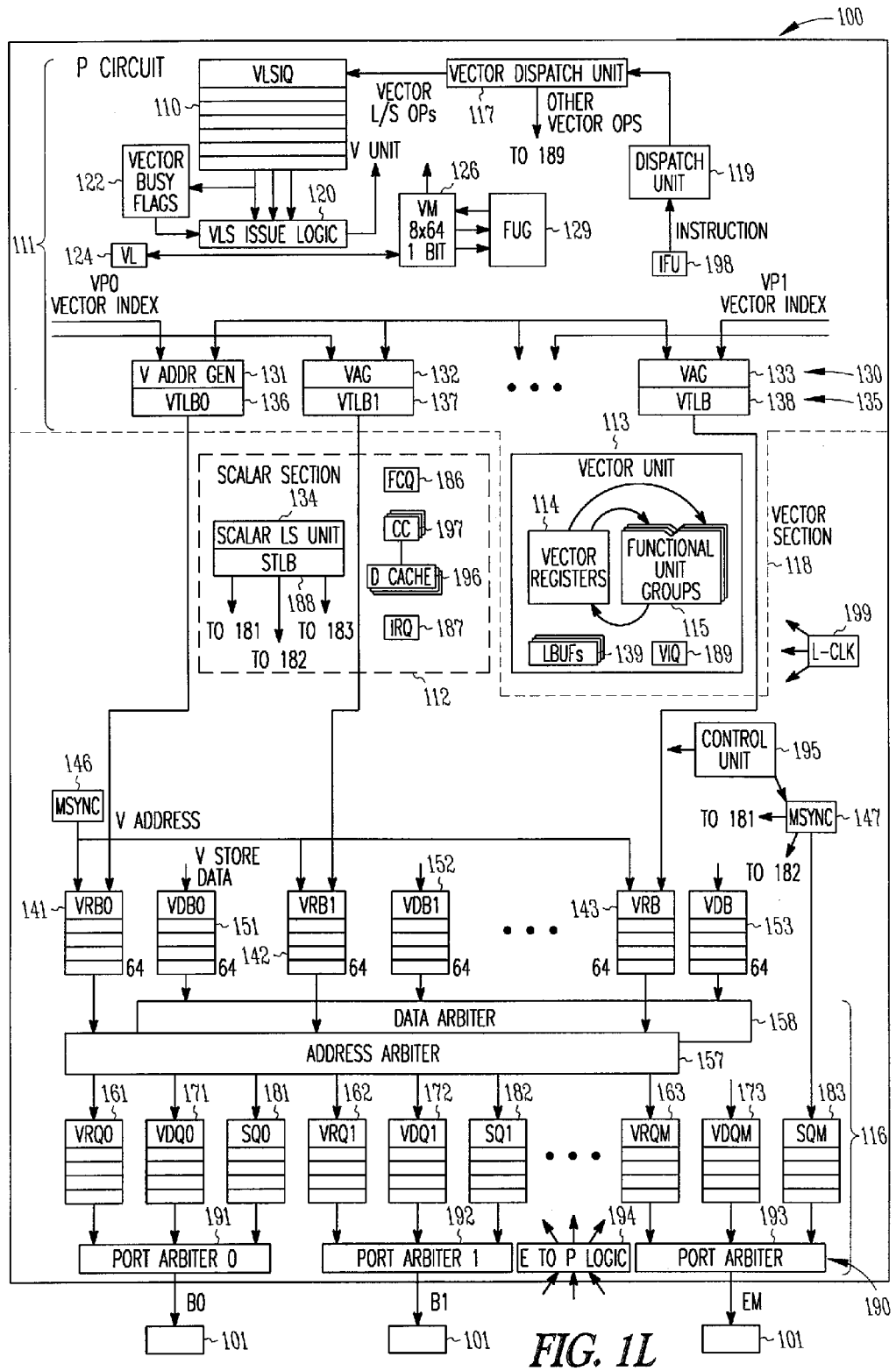
FIG. 1L shows a block diagram of a P chip/circuit 100 of some embodiments of the present invention.

FIG. 1L shows a block diagram of a P chip/circuit 100 of some embodiments of the present invention. In some embodiments, P chip/circuit 100 represents one single-streaming processor having one or more vector pipelines supported by a vector load-store unit (VLSU) 111 and one or more scalar pipelines supported by a scalar load-store unit (SLSU) 134.

Since various vector operations are internally decoupled (i.e., the addresses and commands to load (or store) elements can be generated out-of-order, rather than sequentially in element order), and various vector and scalar load and store operations are decoupled (i.e., there is no guarantee that loads and stores will complete in the order specified in the program code), there is an occasional need for synchronization instructions that can be inserted into the code that command that the hardware complete some or all memory operations for instructions that issued earlier before proceeding to execute memory operations for instructions that issued later. The present invention provides a plurality of different synchronization instructions that can be inserted into the code to obtain the needed guarantees of ordering.

Since the processor generates memory requests in a pipelined manner, sync tags for the synchronization operations can be inserted into early stages of various pipelines involved with the operations, and then processed (synchronized with other sync tags in other pipelines) at later stages, rather than waiting for the pipelines to empty to do the synchronization.

As described in detail below, there are three forms of Sync instructions. Local processor syncs (Lsync) provide ordering among the scalar and vector units of a single processor. MSP syncs (Msync) provide memory ordering among the processors of a single Multi-Stream Processor. Global syncs (Gsyncs) provide memory ordering among multiple processors in the machine.

Vector Load/Store Unit (VLSU) 111

The Vector Load/Store Unit (VLSU) 111 is the vector address generation engine of the P Chip 100. The VLSU's execution is decoupled from the Scalar Section (SS) 112 and the Vector Unit (VU) 113.

The VLSU 111 generates addresses (virtual addresses of memory operands) for load and store instructions for the VU 113. The VLSU 111 receives its vector instructions from the Vector Dispatch Unit (VDU) 117, interfaces with the VU 113 for gather and scatter index operands, and transmits memory requests to the E-chip Interface Unit (EIU) 116.

The VLSU 111 receives one instructions from the VDU 117 per Lclk 199 (a certain clock that specifies a particular unit of time in the processor). Instructions are enqueued in the Vector Load/Store Instruction Queue (VLSIQ) 110, which can contain up to six valid instructions, in some embodiments. The VLSIQ 110 receives any scalar operands needed for the vector instructions from the VDU 117 with the instruction. The VLSU 111 receives all vector memory instructions and any vector instruction that writes VL (vector length register) 124 or VMs (vector mask registers) 126. The VLSU 111 receives instructions that write VL 124 and VMs 126 because the VLSU 111 maintains its own private copy (shown) of VL 124 and VMS126.

The Vector Load/Store Issue Logic (VLSIL) 120 performs all the required checks for the vector memory instructions at the head of the VLSIQ 110 and attempts to issue the instruction to the Vector Address Generation (VAG) 130 (in some embodiments, a plurality of VAGs 131, 132, . . . 133 (e.g., four) operate in parallel, each generating an address per Lclk). The VLSIL 120 can issue one instruction per Lclk. In some embodiments, each one or the plurality of VAGs 131-133 has a corresponding vector translation look-aside buffer (VTLB) 136-138, and vector request buffer (VRB) 141-143)

In some embodiments, the VAG 130 then generates four memory requests per Lclk, performs four address translations per Lclk using the four Vector TLBs (VTLB 136, 137, . . . 138), and places the four physical addresses in one of the four Vector Request Buffers (VRB0-VRB3).

For vector loads, the VLSU 111 assigns one of eight Load Buffers (LBUF0_LBUF7) 139 and informs the DU 119, if any addresses faulted. For vector stores, the VLSU 111 only informs the DU 119 if any addresses faulted.

Vector Loads

For strided vector loads (wherein each successive element of the vector register is loaded from a memory location having a specified distance from the memory location of the prior element), the VLSIL 120 only checks for a free LBUF 139 that can be allocated. If a LBUF is free, it issues the load to the VAG 130, assigns one of the eight LBUFs 139 to the vector load and informs the VU 113 that the selected LBUF 139 is valid. For vector gather instructions (wherein each successive element of the vector register (VR) is loaded from a memory location having an address specified by an element in another vector register having address offsets from the address in a specified base address register), the VLSIL 120 needs to check for an allocatable LBUF and also that the VR needed for the index (address offset) is valid and ready. The VLSIL 120 uses the VBFlags (vector busy flags) 122 for this.

The VU 113 includes, in some embodiments, 96 VBFlags 122. For each vector instruction that writes a vector register (VR) 114, the VDU 117 assigns a VBFlag index to that instruction and sets the indexed VBFlag 122 busy. When VU 113 issues the vector instruction it clears this flag. When a vector gather instruction is sent from the VDU 117 to the VLSU 111, it includes the last VBFlag index of the vector index (Vk, or the "k-operand"). When a vector gather instruction reaches the head of the VLSIQ 110, the VLSIL 120 checks to see if the indexed VBFlag 122 is still set. If it is, the last write of the k-operand has not occurred and VLSIL 120 holds issue (waits before issuing the instruction). Once the VBFlag 122 is cleared, VLSIL 120 then requests the VR 114 from the VU 113. When the VR 114 is free, (it might still be busy from the instruction that cleared the VBFlag 122) the VU 113 will send the VR elements to the VLSU 111 four element per Lclk 199. The VU 113 reads these elements from the VR 114 and sends them to the VLSU 111 through an external register path. The VLSIL 120 also assigns an LBUF 139 to the gather instruction.

Vector Stores

In some embodiments, all vector store instructions require, because of a potential deadlock between the P Chip 100 and the E Chip 101, that all previous scalar and vector loads have been sent to memory. Vector load to store ordering is done by the EIU 116 while the scalar load to vector store ordering is enforced by an Active List (AL) in the DU 119, and by the VLSIL 120. The VLSU 111 will receive a signal from the AL each time the "reference sent" pointer passes a vector store instructions. The VLSU 111 can receive four reference sent signals per Lclk 199. The VLSU 111 increments a vector store counter each time it receives a signal. For the VLSIL 120 to issue a vector store instruction, the vector store counter must be non-zero. Each time a vector store instruction is issued, the counter is decremented.

For vector scatter operations (wherein each successive element of the vector register (VR) is stored to a memory location having an address specified by an element in another vector register having address offsets from the address in a specified base address register), the VLSU 111 conducts the same VBFlag busy check that is performed for gather instructions. When the VBFlag 122 is cleared, the VLSU 111 again asks the VU 113 for the VR 114 and the VU 113 sends the VLSU 111 four elements from the VR 114 per LCLK when the register if available.

Vector Address Generation

The VAG 130 of the VLSU 111 receives the base address from the VLSIL 120. For strided references, it also receive the stride value from the VLSIL 120. For gather and scatter vector instructions it receives the vector indexes from the VU 113. The VAG 130 can generate up to four addresses per LCLK. The number of addresses generated are determine by the content of VL (length, or number of elements) 124 and the selected VM 126 (mask to determine which elements are selected or not). If the VL 124 is currently zero, no vector addresses are generated. For non-zero VL 124, the VAG 130 generates VL number of addresses. If the corresponding element in the selected VM is not set, this address is not passed to VTLB 135.

The VLSU 111 includes, in some embodiments, a plurality of VTLBs 136, 137, . . . 138, which for some embodiments is four VTLBs (VTLB0_VTLB3). All vector addresses are translated by the VTLBs 130 and perform the required address check. The VTLB 130 reports completion of translation and any error back to the DU 119. Possible errors are:

Address Error: unaligned access, or access to a privileged or reserved memory region VTLB Fault: miss in the TLB VTLB Conflict: multiple hits in the TLB VTLB Modify Fault: store to a page marked read only.

After VTLB 135, physical addresses are placed in the Vector Request Buffers 142, 142, . . . 143 (e.g., in some embodiments, VRB0-VRB3). Each VRB, in some embodiments, can contain 64 valid addresses.

For vector load instructions, the VAG 130 will also create a Vector Outstanding Request Buffer (VORB) entry for each vector address. The VORB includes, in some embodiments, 512 entries that is indexed by the transaction ID (TID) sent to the E Chip 101 in the request packet and returned in the response. Each VORB entry includes, in some embodiments, LBUF indexes that point to the LBUF entry that the data should be loaded into when it returns from the E Chip 101.

In some embodiments, the VLSU 111 does some type of cache line reference for stride one and stride two vector references.

All sync instructions are sent to the VLSU 111. The VLSU 111 simply passes all "Lsync" to the EIU 116 through the VRBs 141-143. Msync markers are also passed to the EIU 116 through the VRBs 141-143, but will hold the VLSIL 120 from issuing further vector instructions until it receives a Msync-completion marker back from the E Chip 101.

Memory Interface Section (MS)/E-chip Interface Unit (EIU) 116

The E-chip Interface Unit 116 provides the Scalar Section 112 and Vector Section 118 a path to and from the plurality of (e.g., four) E Chips 101. It also performs the memory synchronization required between the SLSU 134 and the VLSU 111.

The EIU 116 includes, in some embodiments, queueing for vector load/store addresses, vector store data, scalar load/store addresses, and scalar data sent to the E Chips 101. The EIU 116 also includes, in some embodiments, a Port ARBiter (PARB) 191-193 for each of the plurality of E Chips 101. Each arbiter 190 performs the Lsync operations, generates the packets that are sent to the E Chips, and arbitrates between vector addresses, scalar addresses and store data, and vector store data. The PARBs 191-193 also send vector store addresses to the four Cache Controllers (CC0-CC3) 197 to invalidate lines in the Dcache 196 when a store address is sent to an E Chip 101.

For data and requests returning from the four E Chips 101, the EIU 116 routes the data to the IFU (instruction fetch unit) 198, the CCs 197 in the SLSU 134, or the VLSU 111. For external invalidate requests sent from the E Chips 111, the EIU 116 routes these requests to the CC 197.

P Chip to E Chip Interface

In some embodiments, the Vector Request Buffers 141-143 are sixty-four-element buffers that contain vector load or store addresses generated by the VLSU 111. The EFU 116 includes, in some embodiments, a Address Arbiter 157 that routes these addresses to the Vector Request Port Queues (VRQs) 161-163. Each VRQ 161-163 is associated with one E Chip 101. In some embodiments, Address Arbiter 157 routes the request to the correct VRQ 161-163 based on physical address bits (6.5) of the physical memory address.

The Vector Data Buffers 151-153 are also sixty-four-element buffers, and contain vector store data. Vector store data is sent to the E Chips 101 decoupled from the vector store address (i.e., they could be sent before, at the same time, or, most likely after the corresponding address, but the individual data elements are sent in the same order as the corresponding addresses for those elements). The EIU 116 routes the store data to the Vector Data Queues 171-173 in the same order that vector store addresses were sent to VRQs 161-163. This is ensured, in some embodiments, by capturing flow information when the store addresses were routed to the VRQs 161-163.

The EIU 116 includes, in some embodiments, four scalar queues from the four CCs 197 in the SS 112. The Scalar Queues 181-183 contain scalar addresses and scalar store data that have been sent from the corresponding CC 197.

PARBs 191-193 of the EIU 116 control requests to the corresponding E Chips 101. Each PARB 191-193 arbitrates between vector load addresses, vector store data, and scalar load/store addresses and data. For each LClk, the PARB 191-193 will look at the head of the corresponding VRQ 161-163, VDQ 171-173, and SQ 181-183. In some embodiments, if more than one queue includes a valid request, the PARB 191-193 uses a rotating priority to determine which queue makes a E Chip request. Each PARB 191-193 can send one request packet to its E Chip 101 per LClk.

E Chip to P Chip Interface

The E Chip to P Chip communication is split into four E Chip to P Chip logic blocks (E0toP-E3toP) 194 which are associated with each E Chip 101. When response packets return from the E Chip 101, they are routed to the Instruction Fetch Unit (IFU) 198, the CC 197, the VU 113, or the Control Unit (CU) 195. The Transaction ID (TID) that was sent with each request to the E Chip 101 is also returned in the response packet. The EtoP logic routes the packet to the correct unit, based on the TID for that packet. Instruction cache line requests are returned to the IFU 198, scalar references are sent to the CC 197, vector references are returned to the VU 113 and Msync acknowledgments are sent to the CU 195. The EtoP logic 194 also receives unsolicited cache line invalidates from the E Chip 101. The EtoP logic 194 will recognize these requests from a unique TID and routes these requests to the CCs 197.

Scalar Load/Store Unit (LSU) 134

The scalar load/store unit (LSU) 134, includes, in some embodiments, an address generator and four cache controllers 197. Each cache controller 197 includes, in some embodiments, an interface to one of the four PARB ports 191-193, and the portion of the Dcache 196 associated with that port.

Address Generation

The SLSU 134 processes scalar loads, scalar stores, prefetches, syncs, and atomic memory operations. Instructions are received from the Address Unit (AU), and can be processed when the required address operands (Aj and optionally Ak) have arrived.

The address add is performed for prefetches and all aligned loads and stores to generate a virtual address. AMOs (atomic memory operations) and unaligned loads and stores use Aj directly as an address.

All instructions that reference memory (all but the syncs) are then translated by STLB 188 as needed and checked for address errors. The STLB 188 reports completion of translation and any errors back to the Active List.

Possible errors include:
Address Error: unaligned access, or access to a privileged or reserved memory region
STLB Fault: miss in the STLB 188
STLB Conflict: multiple hits in the STLB 188
STLB Modify Fault: store to a page marked read only.
Errors for prefetch instructions are ignored, and the instruction is simply discarded.

After the STLB 188, instructions are placed into the Initial Request Queue (IRQ 187). The IRQ 187 includes, in some embodiments, 8 entries, allowing up to 8 scalar references to be translated after an "Lsync V,S" instruction before the Lsync completes. While these scalar references can't access the Dcache 196 until the Lsync completes, allowing them to pass translation can permit subsequent vector instructions to be dispatched, which will improve performance for certain loops.

From the IRQ 187, instructions are sent to one of the four Cache Controllers (CC0-CC3) 197, steered by physical address bits 6 . . . 5. Sync instructions are broadcast to all four cache controllers 197. A Flow Info Queue maintains steering information for scalar store and AMO data values. Each entry records the type of operand(s) and the port to which they should be steered. Data values arrive in order from each of the address unit (AU) and scalar unit (SU), and are steered accordingly. Ak values are used only for AMOs with two operands.

Cache Controller Operation

Each Cache Controller 197 "x" includes, in some embodiments, the tag, state and data arrays for that portion of the Dcache 196 corresponding to E-Chip port (PARB 191-193) "x" (i.e.: having physical address bits 6 . . . 5=x). It includes two primary request-processing pipelines: the IRQ 187, from the address generation logic, and the Forced Order Queue (FOQ 186), through which requests are routed when they cannot be serviced immediately from the IRQ 187.

In some embodiments, physical address bits 12 . . . 7 of a request are used as the index into the local Dcache 196 (which includes, in some embodiments, 64 indices times two ways, for a total of 128 cache lines). A request from the IRQ 187 simultaneously indexes into the Dcache tag, state and data arrays, and also performs an associative, partial address match with all entries in the FOQ 186. The indices and control information for all FOQ entries are replicated for this purpose in an FOQ index array. No request is allowed to leave the IRQ 187 until it is not branch speculative.

Read requests that hit in the Dcache 196 and have no potential matches in the FOQ 186 are serviced immediately. Read and write requests that miss in the Dcache 196 and have no potential matches in the FOQ 186 cause the line to be allocated in the Dcache 196. A request packet is sent to the Ecache 24 (in E Chips 101) immediately, and the instruction is placed into the FOQ 186 to await the response from the responding E chip 101.

In the case of a Dcache allocation, the state of the line is immediately changed to valid; there is no "pending" state. The simple presence of a request for a given line in the FOQ 186 serves the same purpose as a pending state. A subsequent request to the line that is processed from the IRQ 187 before the newly-allocated line has arrived back from the E chip 101 will detect the matching request in the FOQ 186 and will thus not be satisfied from the Dcache 196.

If a new request from the IRQ 187 matches the partial address of any valid entry in the FOQ 186, then there is a potential exact address match with that entry, and the request is routed through the FOQ 186 to maintain proper request ordering. All AMOs and I/O space references are sent through the FOQ 186, as they do not allocate Dcache lines and can never be serviced from the Dcache 196.

Requests that miss in the Dcache 196 and would otherwise have allocated a Dcache line do not do so when they match an FOQ entry; they are run through the FOQ 186 and passed on to the Ecache 24. Simplifying the handling of this relatively infrequent event significantly simplifies the SLSU 134.

The FOQ 186 is logically two separate queues unified in a single structure: one queue for accesses to the Dcache 196, and one queue for accesses to the Ecache 24 (see FIG. 2) in E Chips 101. Each entry in the FOQ 186 can be marked as accessing the Dcache 196 and/or accessing the Ecache 24. FIFO (first-in, first-out) ordering within each class is preserved. That is, all Dcache requests are kept in order with respect to each other, and all Ecache requests are kept in order with respect to each other. However, Dcache-only requests and Ecache-only requests may be dequeued in a different order than they were enqueued.

An FOQ entry that is marked to access both the Ecache 24 and Dcache 196 may logically be dequeued from the Ecache queue before being dequeued from the Dcache queue. After doing so, the request will still remain in the FOQ 186, but be marked only as a Dcache request. This might happen, for example, for a write request which is able to send its write through to the Ecache 24, but not yet able to write to the Dcache 196 because a newly allocated Dcache line has not yet returned from memory. In general, we expect the Ecache queue to "run ahead" of the Dcache queue, as the head of the Dcache queue will often be waiting for a response from the E chip 101, whereas requests to the E chip 101 can generally be sent as soon as they are ready.

Sync instructions are always sent through the FOQ 186. A marker for an "Lsync S,V" is simply passed on to the E chip port PARB 191-193 after all Ecache requests in front of it have been sent. This marker informs the Echip port arbiter 191-193 that previous scalar references from this port have been sent to E Chip 101. A Gsync instruction marker is similarly passed through the FOQ 186 and sent to the E chip port arbiter (PARB 191-193) after all previous scalar references have been sent.

Processing an "Lsync V,S" instruction from the IRQ 187 causes the head of the IRQ 187 to block, preventing subsequent scalar references from accessing the Dcache 196 or being sent to the Ecache 24 until all vector references have been sent to the Ecache 24 and all vector writes have caused any necessary invalidations of the Dcache 196. Vector write invalidations are performed using a separate port to the Dcache tags. Once all vector writes before the Sync have been run through the Dcache 196, the SLSU 134 is signalled to unblock the IRQ 187s at each cache controller 197. In the meantime, each cache controller sends its "Lsync V,S" marker through its FOQ 186 and on to the E chip port arbiter (PARB) 191-193.

Markers for Msync instructions are also sent through the FOQ 186 and passed to the port arbiter. Processing a regular Msync instruction (not a producer or vector Msync) from the IRQ 187 causes the cache controller to go into Dcache bypass mode. In this mode, reads and writes are forced to miss in the Dcache 196 and are sent to the Ecache 24 following the Msync marker. This causes them to see the results of memory references made before the Msync by other P chips 101 participating in the Msync.

Once an E chip port arbiter 191-193 has received the Msync marker from the scalar SLSU 134 and the vector VLSU 111, it sends an Msync marker to the associated E Chip 101. Once all participating P chips have sent their Msync markers to an E Chip 101, and E Chip 101 has sent the Dcaches 196 any invalidations from writes before the Msync, the E Chip 101 sends Msync completion markers back to the P chips 100. An Msync completion marker from a given E chip 100 turns off Dcache-bypass mode at the associated cache controller 197. External invalidations received from the Ecache 24 in E Chips 101 are performed using a separate port to the Dcache tags.

In some embodiments, while in bypass mode, read requests that would otherwise hit in the Dcache 196 actually cause the corresponding Dcache line to be invalidated. This is done so that a subsequent read that is processed just after Dcache bypass has been turned off will not read a line out of the Dcache 196, effectively reading earlier data than an earlier read request which is heading out to the Ecache 24 via the FOQ 186. The Dcache bypass mode can also be permanently turned on via a DiagConfig control register in the event of a bug in the SLSU 134.

Prefetch instructions are checked in the STLB 188 for possible discarding. Prefetches that would cause STLB misses, would cause addressing exceptions, or translate with a non-allocate hint or to I/O (input/output) or MMR (memory-mapped register) space are discarded. Other prefetches are converted into regular allocating loads to A0 or S0.

In some cases, a message is sent directly to the E chips 101 (via the port arbiter 191-193) by the IRQ 187 tag/state engine. In two cases, the request is serviced directly from the Dcache 196 and in all others it is placed into the FOQ 186. An entry marked pending will always be marked as a Dcache entry as well. It cannot be dequeued from the head of the Dcache queue until the matching response arrives from the Ecache 24, clearing its pending status.

All requests that will receive a response from E allocate an ORB (Outstanding Request Buffer) entry. An ORB includes, in some embodiments, 16 entries, and is indexed by the transaction ID (TID) sent to the Ecache 24 in the request packet and returned in the response. Each ORB entry includes, in some embodiments, a request type, load buffer index, A or S register number, Dcache index and way, FOQ index, s/dword (single/double word) flag, and physical address bits 4 . . . 2 of the request.

The ORB entry specifies what to do with the response when it is received from E Chip 101. A "Read" entry causes the response to be placed into the Dcache 196 and the requested word to be sent to a register. A "ReadUC" entry causes the result to be sent only to a register, not written into the Dcache 196. A "Prefetch" entry causes the result to be written to the Dcache 196, but not returned to a register.

All scalar requests that allocate an ORB entry expect either a single s/dword (e.g., four or eight bytes, in some embodiments) or a full cache line (32 bytes, in some embodiments) in return. For full cache line requests, the requested word will be returned first, with the rest of the cache line following in increasing address, modulo the cache line size. For both word and cache line requests, the requested s/dword is returned directly to the register from the E port via the load buffers associated with the respective scalar section or vector section. Thus, the FOQ entry for a load that caused a Dcache allocation is marked as a dummy. It exists solely so that subsequent IRQ requests to the same line will detect a match and not access the pending line before it returns from E Chip 101. When a dummy request is dequeued from the FOQ 186, it is simply discarded; it does not access the Dcache 196.

Accesses to the Dcache 196 from the IRQ 187 and from the FOQ 186 are arbitrated by the SLSU 134 so that at most one occurs per LClk across the four cache controllers 197. Thus, at most one Dcache hit occurs per cycle, allowing the result to be routed directly to the A or S registers via an external data path.

In some embodiments, the enqueue bandwidth is increased to the small FIFO used to buffer these load results outside the custom blocks used for the scalar section 112, to allow two Dcache accesses per LClk. This is because each time a load request goes through the FOQ 186 (except for the one that causes the allocation), it makes two Dcache accesses: one from the IRQ 187 and one from the FOQ 186. If one only allows one Dcache access per LClk, the IRQ access will waste a cycle of load bandwidth.

Ecache requests at the head of the FOQ 186 can be dequeued when the following criteria are met:
  Regular writes, I/O writes, AMO reads (which return data) and writes (which do not) must all be committed and their data available,
  I/O reads must be committed,
  Syncs must be committed, or
  ReadUC and ReadNA requests can be dequeued immediately.

Dcache requests at the head of the FOQ 186 can be dequeued when the following criteria are met:
  Dummy requests can be dequeued after their matching response from E has returned and written the Dcache 196,
  Reads can be dequeued immediately,
  Allocating writes (those that were marked pending) can be dequeued after their matching response from E has returned and written the Dcache 196, they are committed and their store data is available, or
  Other writes must be committed, and their store data available.

Control Unit (CU) 195

The Control Unit (CU) 195 of the Scalar Section includes, in some embodiments, 64 Control Registers (CR), an interface to the A Unit, an interface to the other P Chips 101 in its MSP 102 and the logic to perform all traps and system related functions.

Figure 2:
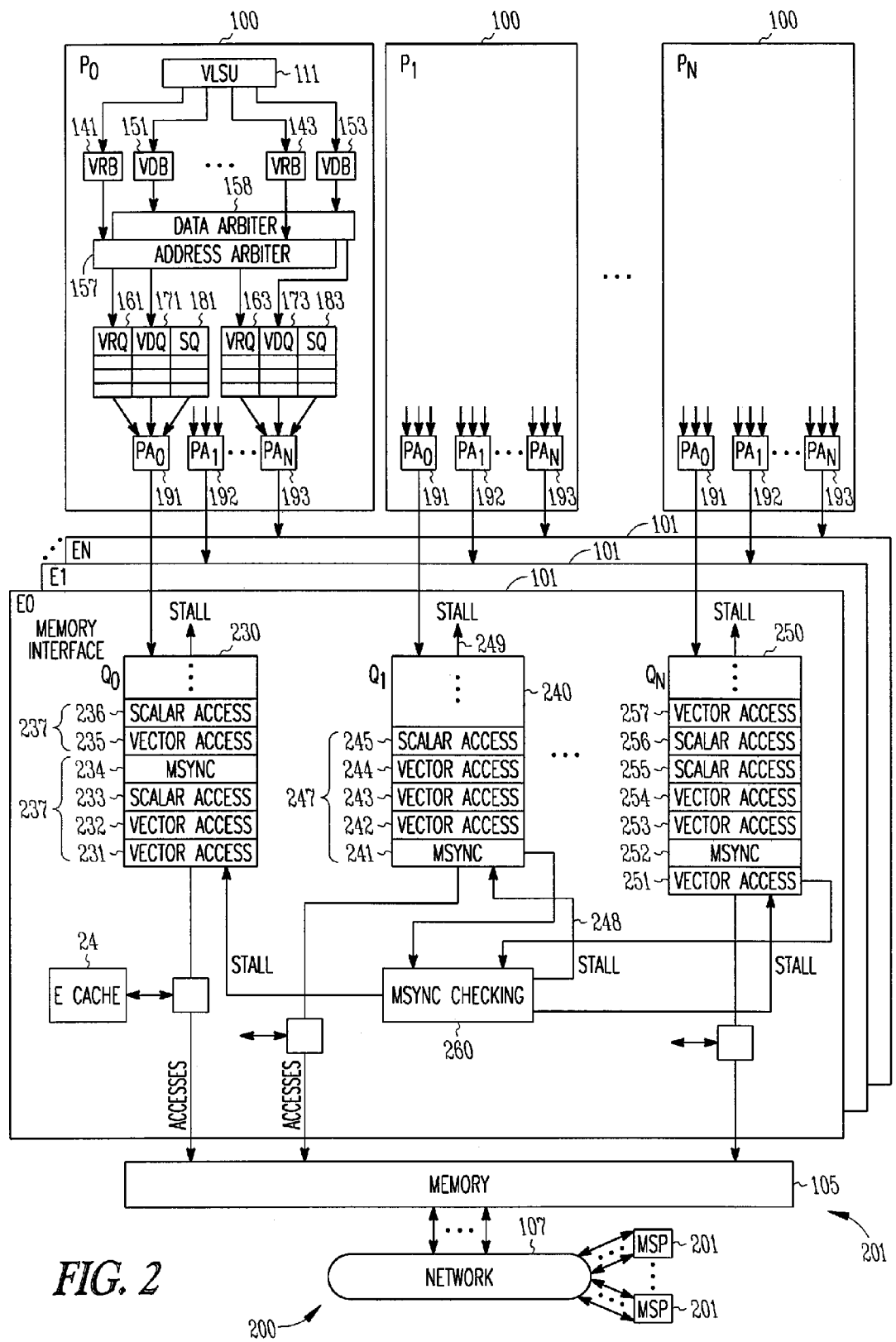
FIG. 2 shows a block diagram of a system 200 of some embodiments of the invention.

FIG. 2 shows a block diagram of a system 200 of some embodiments of the invention. System 200 includes a plurality of processors 100 as described in FIG. 1L, each connected to a plurality of E circuits or E Chips 101, which are in turn connected to memory 105. A plurality of MSPs-with-memory 201 are connected to a network 107.

Various types of sync instructions cause corresponding types of sync markers to be inserted into the VRQs 161-163 and SQs 181-183. Thus a sync instruction, such as an Msync (described below), that requires the memory references before the sync instruction to complete (OB references) to include all scalar and vector references, would insert corresponding markers in both a VRQ (e.g., 161) and the corresponding SQ (e.g., 181). Both markers would need to be at the port arbiter 191 of P0 chip 100 in order for it to send one Msync marker to Q0 230 on E0 Chip 101.

In some embodiments, on each E Chip 101 there is a plurality of queues 230, 240, . . . 250 corresponding to the number of P Chips 100 (one or more queues per P chip). In some embodiments, as shown, one queue is provided per P Chip 100. In such embodiments, all memory references from a particular processor would be stopped once an Msync marker reached the head of that processor's queue (e.g., as shown in queue 240 for processor P1, where an Msync marker 241 is at the head of queue Q1 240). In other embodiments, the memory is divided into sections, with each processor having a separate queue for each section.

In the example of FIG. 2, Msync checking circuit 260 sees the Msync marker 241, but no corresponding Msyncs at the heads of queues Q0 230 or QN 250, and thus stalls (e.g., with a stall signal 248) further memory accesses from queue 240. If Q1 240 later fills up with more memory requests or Msync markers, a stall signal 249 stops processor P1 from sending any more requests to Q1 240. Thus, in some embodiments, Q1 240 can accept up to 63 additional commands or requests after its Msync 241 reaches the head of the queue, blocking further processing out of that Q1 240.

Memory requests 237 are in Q0 230 and memory requests 247 are in Q1240.

At a later time, QN 250 will have processed vector access request 251, and its Msync marker 252 will reach the head of that queue, and similarly stall further execution of later requests (e.g., 253-257) from that queue.

At likely a still later time, Q0 230 will have processed vector access request 231, vector access request 232, and scalar access request 233, and its Msync marker 234 will reach the head of that queue, and would similarly stall further execution of later requests (e.g., 235-236) from that queue. However, suppose that all three Msyncs 234, 241, and 252 had participation masks (e.g., 4-bits masks in each Msync marker, obtained from the Msync instructions, that indicated which of the four processors 100 are expected to send corresponding Msyncs to their respective queues 230-250) that matched and indicated that only these three processors were participating. Then all three Msyncs would have completed the barrier they are part of, and an Msync-complete signal would be sent back to the respective processors, and further memory requests from all queues 230-250 (i.e., the read or write requests 235, 236, 242, 243, 244, 245, and 253-257) would be allowed to immediately proceed.

In this way, many memory requests can possibly be queued in, e.g., VRB 141, VRQ 161, and Q0 230 with the Msync marker 234 waiting at the head of Q0 230 for the corresponding Msyncs to arrive in the other queues 23-250 that correspond to its participation mask.

Sync Instruction Processing by the Hardware

This section describes the hardware implementation, according to some embodiments, of the various Sync instructions, which involve many different parts of the P Chip 100. In some embodiments, up to three forms of Sync instructions are provided. Local processor syncs (Lsync) provide ordering among the scalar and vector units of a single processor (in some embodiments, P Chip 100). MSP syncs (Msync) provide memory ordering among the processors of a single Multi-Stream Processor 102. Global syncs (Gsyncs) provide memory ordering among multiple processors (in some embodiments, separate P Chips 100) in the same or different MSPs 102 in the system 108. See the section "Instruction-Set Architecture for the Synchronization Instructions" below for a more complete description from the software programmer's point of view.

Lsync V, V

Vector-vector ordering happens, in some embodiments, by default inside the vector unit 113.

The Lsync_v_v is instruction is dispatched after scalar commit to the VLSU 111 and the VU 113.

The Lsync_v_v is ignored and discarded at the head of the VIQ 189, which handles issuing instructions that involve non-memory instructions to the vector registers 114.

When the Lsync_v_v reaches the head of the VLSIQ 110, the VLSU 111 normally passes an Lsync_v_v marker through towards the PARB 191-193.

If the SlowLsyncVV bit is set, then the VLSU 111 waits until earlier vector references have cleared the port arbiter before allowing the Lsync_v_v to pass the head of the VLSIQ 110.

The Lsync_v_v marker is ignored and discarded by the PARB.

Lsync Vj, V

Implemented exactly the same as Lsync V, V.

Lsync Vj, V, el

Implemented exactly the same as Lsync V, V.

Lsync S, V

The Lsync_s_v instruction is dispatched to the SLSU 134 and (after scalar commit) to the VLSU 111.

The VLSU 111 sends the Lsync_s_v marker down the path towards all four port arbiters (PARB) 191-193 in program order with the references. These references arrive at the PARB 191-193 in the vector request port queues (VRQ) 161-163.

When the Lsync_s_v marker reaches the head of an initial request queue (IRQ 187), it is held until it is not branch speculative, and then sent to all four cache controllers (CCs 197).

At each CC 197, the Lsync_s_v marker flows through a forced order queue (FOQ 186) marked as an Ecache entry.

Once the Lsync_s_v marker has been removed from the IRQ 187, subsequent scalar references may be processed out of the IRQ 187, potentially being sent to the PARB 191-193 before the Lsync_s_v marker which is in the FOQ 186.

When the Lsync_s_v marker reaches the head of the FOQ 186 and is committed, it is sent on to the corresponding PARB 191-193 through its scalar queue (SQ) 181-183.

When the Lsync_s_v marker from the CC 197 reaches the head of the SQ 181-183, if the lsync_s_v_flag is clear, then the PARB 191-193 sets the lsync_s_v_flag and removes the Lsync_s_v marker from its SQ 181-183. Following scalar references from the SQ 181-183 can then be sent to its E Chip 101.

If the Lsync_s_v marker reaches the head of the SQ 181-183 and the lsync_s_v_flag is still set from a previous Lsync_s_v, then the marker waits at the head of the SQ 181-183 until the flag is cleared (by an Lsync_s_v marker from the VRQ 161-163), blocking subsequent scalar references.

When the Lsync_s_v marker from the VLSU 111 arrives at the head of the VRQ 161-163, if the lsync_s_v_flag is set, then the PARB 191-193 clears the lsync_s_v_flag and removes the Lsync_s_v marker from the VRQ 161-163, allowing following vector requests to proceed to the E Chip 101.

If the Lsync_s_v marker from the VLSU 111 reaches the head of the VRQ 161-163 and the lsync_s_v_flag is not set, then the marker waits at the head of the VRQ 161-163 for the lsync_s_v_flag to be set (by an Lsync_s_v from the SQ 181-183), blocking subsequent vector requests. Once the flag is set, the marker can proceed as described above.

Lsync V,S

The Lsync_v_s instruction is dispatched to the SLSU 134 and (after scalar commit) to the VLSU 111.

The VLSU 111 sends the Lsync_v_s marker down the path to all four port arbiters (PARB) 191-193 in program order with the references. These references arrive at each PARB 191-193 in the vector request port queues (VRQs) 161-163.

As vector write requests pass the PARB 191-193, the addresses are sent to the corresponding CC 197, where they are checked against the contents of the Dcache 196 and invalidate any matching Dcache entries.

When the Lsync_V_s marker from the VLSU 111 reaches the head of the VRQ 161-163, if the lsync_v_s_flag is clear, then the PARB 191-193 sets the lsync_v_s_flag and removes the marker from the VRQ 161-163. Following vector references from the VRQ 161-163 can then be sent to E Chip 101.

If the Lsync_v_s marker reaches the head of the VRQ 161-163 and the lsync_V_s_flag is still set from a previous Lsync_v_s, then the marker waits at the head of the VRQ 161-163 until the flag is cleared (by an Lsync_v_s marker from the SQ 181-183), blocking subsequent vector references.

When the Lsync_v_s marker in the SLSU 134 reaches the head of the IRQ 187, it is held until it is not branch speculative. It is then sent to all four cache controllers (CCs 197), and the IRQ 187 is blocked until vector_reference_complete signals are received from each of the four PARBs 191-193.

At each CC the Lsync_v_s marker flows through the forced order queue (FOQ 186) marked as an Ecache entry (sending the marker through the FOQ 186 is not strictly necessary for ordering, but this is the same way it is done for the Lsync_s_v marker).

When the Lsync_v_s marker reaches the head of the FOQ 186 and is committed, it is sent on to the corresponding PARB 191-193 through the scalar queue (SQ 181-183).

When the Lsync_v_s marker from the CC 197 arrives at the head of the SQ 181-183, if the lsync_v_s_flag is set, then the PARB 191-193 clears the lsync_v_s_flag, removes the Lsync_v_s marker from the SQ 181-183, and sends a vector_reference_complete signal to the initial request queues (IRQ 187) in the SLSU 134. This signal follows any previous vector write Dcache invalidates.

If the Lsync_v_s marker from PARB 191-193 reaches the head of the SQ 181-183 and the lsync_v_s_flag is not set, then the marker waits at the head of the SQ 181-183 for the lsync_v_s_flag to be set (by an Lsync_v_s from the VRQ 161-163), at which time it can proceed as described above.

When the vector_reference_complete signals from all four PARBs 191-193 have been received at the IRQ 187, the IRQ 187 is re-enabled, allowing subsequent scalar references to proceed.

Lsync Vr, S

Implemented exactly the same as Lsync V, S.

Lsync fp

Main dispatch is held after an Lsync_fp.

The control unit (CU 195) holds issue of the Lsync_fp until the active list is empty.

The CU 195 then sends the vector unit (VU 113) a quiet request.

After the quiet signal is received from the VU 113, dispatch is released.

Lsync I

Instruction fetch is held after an Lsync_i

The control unit (CU 195) holds issue of the Lsync_i until it is committed.

The Icache is then invalidated and instruction fetch is resumed.

Msync and Gsync Processing by the Control Unit

Msyncs and Gsyncs have a lot of common functionality. For all the Msyncs and Gsyncs (except "Gsync A", which is described separately below):

The Sync instruction (i.e., for this section, either Msync or Gsync) is dispatched to the SLSU 134, an ASRQ (issues to the control unit), and, when scalar committed, to the VU 113 and VLSU 111. It enters the active list in the Trap Speculative state.

The Sync can be issued by the control unit (CU 195) when:
the Sync is the oldest uncommitted instruction
the CU 195 is not waiting for any Sync Completes from the E Chips 101 for a previous Msync or Gsync (only one Msync or Gsync may be active at a time) and
there are no unacked (unacknowledged) Syncs in the VLSU 111 and less than 4 unacked Syncs in the VU 113.

The CU 195 goes through a "check-in" procedure, as described in The description "Check-ins for Msyncs and Gsyncs" below, to determine if the Msync will succeed or trap (with a Sync Error, Sync Timeout or MINT Pending exception).

If the Sync traps, then:
the CU 195 sends the VLSU 111 and the VU 113 a check-in_complete signal with a trap indication,
the Sync is marked as trapping in the AL by setting both the complete and trap bits,
when the Sync reaches the graduation point, the CU 195 sends a "request quiet" to the VLSU 111 and the VU 113,
when the trapping Sync reaches the head of the VLSIQ 110, and VLSU 111 activity has completed, the VLSU 111 sends a "quiet" to the VU 113,
when the V 113 has received the quiet from the VLSU 111, the VU 113 has received the "request quiet" from the CU 195, the trapping Sync has reached the head of the VIQ 189, and all vector activity has completed, the VU 113 sends a "quiet" signal to the CU 195,
the CU 195 then sends a "kill" to the VLSU 111 and VU 113, which cleans out any following instructions from the vector side, and
the CU 195 initiates exception handling as described in The description "Check-ins for Msyncs and Gsyncs" below.

If the Sync checkin completes successfully, then:
the Sync is marked committed in the AL by clearing its trap bit (it will later be completed by the SLSU 134),
the CU 195 sends the VLSU 111 and the V 113 a checkin_complete signal without a trap indication, indicating that the Sync has been committed,
when the committed Sync reaches the head of the VLSIQ 110, the VLSU 111 sends a Sync acknowledgment to the CU 195 (only one Sync may be committed but unacknowledged by the VLSU 111), and
when the committed Sync reaches the head of the VIQ 189, the VU 113 sends a Sync acknowledgment to the CU 195 (at most four Msyncs or one Gsync can be completed but unacknowledged by the VU 113).

I Msync

Assuming that a Msync checkin completes successfully:
When the Msync reaches the head of the VIQ 189 and its checkin_complete signal has been received, it is discarded and the checkin_complete is acknowledged.
When the Msync reaches the head of the VLSIQ 110, and its checkin_complete signal has been received, the checkin_complete is acknowledged and an Msync marker is passed on to the port arbiter (PARB 191-193), in order with respect to the vector reference stream, via the vector request queues (VRQ0-3) 161-163.
When an Msync marker reaches the head of the initial request queue (IRQ 187) in the SLSU 134, it is held until it is not branch speculative, and then sent to all four cache controllers (CCs 197). It also must be held if any of the Dcaches 196 are currently in bypass mode due to an earlier Msync.

At each CC 197 the Msync marker flows through the forced order queue (FOQ 186) marked as an Ecache entry.
When the Msync marker reaches the head of the FOQ 186 and is committed, it is sent on to the corresponding PARB 191-193 through the scalar queue (SQ 181-183).
After removing a regular Msync marker from the IRQ 187, the four Dcaches 196 are put into bypass mode, and the IRQ 187 is blocked until the Msync markers have been removed from the FOQ 186 in all four CCs 197. This keeps the Msync ordered with respect to later scalar references going to E Chip 101. Vector Msyncs and producer Msyncs do not order subsequent scalar references, so they do not put the Dcache 196 into bypass mode, nor do they block the IRQ 187.
At each PARB 191-193, Msync markers from the VRQ 161-163 and SQ 181-183 are held until they match, preventing any subsequent vector or scalar references from being sent to the E Chip 101 until both markers have been received.
Once the scalar and vector Msync markers have been received, the PARB 191-193 sends an Msync marker to E Chip 101, and the PARB 191-193 can then process additional scalar and vector requests.
When an E Chip 101 returns a Sync Complete packet, it is sent to the CU 195. It is also sent to the corresponding CC 197, where it turns off Dcache bypass mode if bypass is on due to an Msync.

Msync P

Implemented exactly the same as Msync, except that the CCs 197 do not go into bypass mode when the Msync marker is removed from the IRQ 187.

Msync V

Implemented exactly the same as Msync P.

Gsync

Assuming that a Gsync checkin completes successfully:
After a Gsync is dispatched, main dispatch (i.e., of all instructions) is halted until the Gsync completes.
When a Gsync reaches the head of the VIQ 189, and its checkin_complete signal has been received, it is discarded and the checkin_complete is acknowledged.
When a Gsync reaches the head of the VLSIQ 110, and its checkin_complete signal has been received, the checkin_complete is acknowledged and a Gsync marker is passed on to the port arbiter (PARB 191-193), in order with respect to the vector reference stream, via the vector request queues (VRQ0-3) 161-163.
When a Gsync marker reaches the head of the initial request queue (IRQ 187) in the SLSU 134, it is held until it is not branch speculative, and then sent to all four cache controllers (CCs 197). It also must be held if any of the Dcaches 196 are currently in bypass mode due to an earlier Msync.
At each CC the Gsync marker flows through the forced order queue (FOQ 186) marked as an Ecache entry.
When the Gsync marker reaches the head of the FOQ 186 and is committed, it is sent on to the corresponding PARB 191-193 through the scalar queue (SQ 181-183).
After removing a Gsync marker from the IRQ 187, the IRQ 187 is blocked until the Gsync markers have been removed from the FOQ 186 in all four CCs 197. Of course, there won't be any references behind the Gsync anyway, as dispatch was halted.
At each PARB 191-193, Gsync markers from the VRQ 161-163 and SQ 181-183 are held until they match.

Once the scalar and vector Gsync markers have been received, the PARB 191-193 sends one Gsync marker to E Chip 101.

When an E Chip 101 returns a Sync-Complete packet, it is sent to the CU 195. It is also sent to the corresponding CC, where it turns off Dcache bypass mode if bypass is on due to an Msync (of course, for Gsync, this won't be the case, but the Sync-Complete packet is generic, so the PARB 191-193 sends it to the CCs 197).

When the CU 195 has received all four Sync-Complete signals from the E Chips 101, then main dispatch is re-enabled.

Gsync R

Implemented exactly the same as Gsync.

Gsync CPU

Gsync_cpu operates like the Gsync, described in The description "Gsync" above, except:
after a successful check-in, the CU 195 sends a "request quiet" to the VU 113, and
the CU 195 waits for the "quiet" to be returned from the VU 113 in addition to receiving the Sync Completes from the E Chips 101 before re-enabling main dispatch.

Gsync A

The CU 195 handles the Gsync_a as described in The description "Msync and Gsync processing by the control unit" above, except:
it is not dispatched to VLSU 111 or VU 113,
checkin_complete signals (with or without trap indications) are not sent to the VLSU 111 and VU 113, and
issue is not held back by unacked Sync commitments to the VLSU 111 and VU 113.

Gsync_a operates like the Gsync, described in The description "Gsync" above, except:
when a Gsync_a marker reaches the PARB 191-193 via the SQ 181-183, it is not held at the PARB 191-193. Instead it is immediately removed, and a Gsync_a marker (rather than a regular Gsync marker) is sent to the E chip.

Check-Ins for Msyncs and Gsyncs

Msync and Gsync instructions must be issued with consistent masks and within a software-selectable time window by all processors participating in the Sync. Hardware is responsible for verifying correct execution via the Sync "check-in" mechanism described in this section. Throughout this section, we use the term "Sync" to mean either an Msync or Gsync.

If the processors use inconsistent masks, then the hardware detects this during check in and generates a Sync Error exception on all processors involved. Similarly, if one or more participating processors do not check in before the first processor's Sync timer goes off, then all processors that have issued Syncs will take a Sync Timeout exception. The MSPs implement a mechanism, described below, to precisely interrupt all participating processors in the event of a Sync Error or Timeout.

In some embodiments, the ISA requires processors participating in a Gsync to all issue the same flavor (release, acquire, etc.), while processors participating in an Msync may use different flavors (producer, vector, etc.). This also implies that processors may not (legally) mix Gsyncs and Msyncs. However, the P Chips 100 are not able to determine whether all processors participating in a Gsync or Msync are issuing the same flavor of Sync instruction. The P chip check-in procedure looks only at the participation masks.

While correct program execution is not ensured, the hardware must not lock up if software issues mixed Syncs with matching masks. Each P Chip 100 behaves internally according to the flavor of Sync issued on that P Chip 100. Sync markers sent to E include two mask bits, which indicate whether the Sync should wait for outstanding loads and/or stores to complete (Msyncs wait for neither, acquire Gsyncs wait for loads only and other Gsyncs wait for both loads and stores). The E Chips 101 treat Sync operations with mixed types as the "strongest" of the types. That is, if any of the Sync markers is for a regular Gsync, the operation is treated as a Gsync, else if any of the markers is for an acquire Gsync, the operation is treated as an acquire Gsync, else the operation is treated as an Msync.

Software running within an MSP 102 must be able to interrupt the other processors 100 of the MSP 102 in response to interrupts or traps that require a context switch. The MINT instruction is used for this purpose. It is implemented in a way very similar to the Sync Timeout mechanism.

To support Sync instructions, each P Chip 100 has the following I/O signals:
a four-bit Sync mask output to each of the other three P Chips 100,
an MSP interrupt (Mint) line to each of the other three P Chips 100,
a Freeze line to each of the other three P Chips 100,
a four-bit mask input from each of the other three P Chips 100,
an MSP interrupt line from each of the other three P Chips 100, and
a Freeze input line from each of the other three P Chips 100.

Internally, each P Chip 100 maintains:
a four-bit input mask register (IMR) for each of the four P Chips 100,
a four-bit participation mask register (PMR) for the current executing M/Gsync instruction, derived from the mask in the M/Gsync instruction, and
a Sync timer.

Normal Operation

Sync instructions are executed by the control unit (CU 195). An M/Gsync instruction may issue as soon as all instructions prior to the Sync are committed (the Sync reaches the commitment point). When a Sync issues, the P Chip 100 converts the 4-bit mask in the instruction to a physical mask (using information in the MSPControl register). The Sync mask must include the current processor, else a Sync Error exception will occur and the Sync will be aborted. Only one Sync may be executing at a time; it must complete before another Sync instruction may issue.

Assuming a valid mask, the P Chip 100 places the physical mask for the executing Sync into the PMR (participation mask register) and sends a copy of this mask to each of the other processors indicated in the mask over the mask output lines. The outgoing masks are asserted until the Sync checkin completes.

Figure 4:
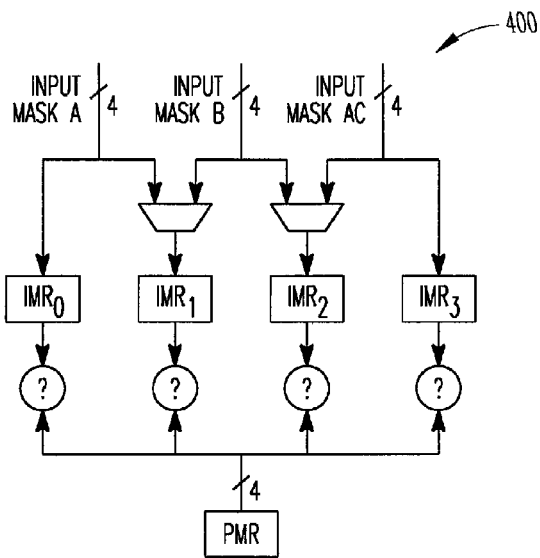
FIG. 4 shows an M/Gsync logic block diagram 400 of some embodiments.

FIG. 4 shows an M/Gsync logic block diagram 400 of some embodiments. The three incoming mask sets are aligned as shown in FIG. 4 (M/Gsync logic block diagram) into the set of four IMRs (input mask registers), using the CPU field of the Config control register. One of the four IMRs corresponds to the local processor, and will be ignored by the matching logic. Whenever a P Chip 100 detects a transition from a zero value to a non-zero value (any of the four bits are set) on the mask input lines from any other P Chip 100, it latches the 4-bit value into the IMR for that processor. The IMRs are cleared when the Sync completes or the corresponding mask inputs drop to zeros.

An executing Msync checkin completes as soon as matching masks have been received from all other processors indicated by the PMR (the IMR corresponding to the local P Chip 100 is ignored for this purpose). That is, for each set bit j in the PMR, j for the local processor, IMR j must match the contents of the PMR. At this point, the PMR and the selected IMRs are cleared, the outgoing participation mask values are set to zeros and the Sync is considered committed.

Once the Sync checkin completes, the P Chip 100 sends Msync markers or Gsync markers to each of the four E Chips 101, as described in the earlier sections for each Msync and Gsync instruction.

Because the Sync instructions must reach the commitment point on all participating P Chips 100, and the P Chips 100 verify that the masks are consistent, the E Chips 101 are guaranteed to receive a consistent Sync marker from all participating processors. E may receive markers belonging to multiple Sync instructions, and must group subsets of Syncs with consistent (matching) participation masks. However, because the P Chips 100 do not perform a new check-in until the previous M/Gsync has been acknowledged from the E Chips 101, markers from different Syncs on an E-Chip 101 are guaranteed to have disjoint participation masks.

Sync Mask Mismatch Errors

If an IMR selected by the PMR for a currently executing Sync does not match the PMR, then the program running on the MSP has generated inconsistent Sync masks. In this case, the Sync instruction is aborted, generating a Sync Error exception, and the outgoing participation masks are set to zeros. The IMRs are not cleared, other than by having their senders drop them. The Sync Error will be detected on all P Chips 100 that have issued a Sync and received at least one inconsistent participation mask. Other processors may have received a participation mask for a Sync involved in a Sync Error but not detected the error themselves. These incoming participation masks will be automatically cleared by the hardware, however, when the transmitting processors (which have detected the Sync Error) drop their outgoing mask values.

Time-Outs

Each processor starts its own Sync timer when it issues a Sync. If a timer goes off, the processor initiates a freeze of the local MSP in order to prevent race conditions and allow all processors to see a consistent view of the active Sync instructions. To do this, the processor asserts its Freeze line to all four processors in the MSP. Multiple processors might do this at about the same time, and that's okay.

When a processor sees one of its incoming Freeze lines asserted, it asserts its own Freeze lines to all processors in the MSP. Thus, all processors in the MSP will quickly raise all their Freeze lines. As each processor sees all its Freeze inputs asserted, it knows that the MSP is fully frozen, and that no more Sync mask inputs will arrive.

Any Sync input masks that arrive at a processor during the freeze procedure are allowed to take effect, possibly allowing an active Sync to complete. Any Syncs that complete during the freeze procedure clear the associated PMR and IMRs.

Once all the Freeze inputs are asserted and any input mask processing has completed, each processor checks its PMR and IMRs. Any processor that has a non-zero PMR (indicating an issued, but incomplete Sync) clears its PMR and IMRs, sets its outgoing participation masks to zero and takes a local "Sync Time-out" interrupt. The Sync instruction traps precisely; earlier active instructions are drained and later instructions are killed.

Any processor that has a zero PMR (indicating that it does not have an issued but incomplete Msync) clears its IMRs (they may or may not be non-zero), drops its Freeze outputs and resumes processing. Processors are prohibited from raising their Freeze lines again until all their Freeze inputs return to zero. If the Sync that caused the time-out completes during the freeze procedure, it is possible that no processor will see an incomplete Sync, and thus no processor will take a Sync Time-out interrupt.

When a processor determines that a Sync Timeout interrupt will be generated, it attempts to finish the instructions before the trapping Sync in the active list. In the event that there is a completed Sync at a processor after a freeze completes, the completed Sync instruction will graduate rather than trap.

Sync Interaction with Traps and External Interrupts

When a processor receives an external interrupt, it stops dispatch, and tries to complete all its currently active instructions before servicing the interrupt. If one of the current instructions traps, then both the trap and the interrupt will be communicated to the processor (but the trap will be reported in the Cause register ExcepCode field, as traps have higher priority than interrupts).

In some embodiments, Msyncs and Gsyncs are treated like other instructions that can take a precise trap. When draining the instructions in response to an interrupt, if one of the active instructions is an Msync or Gsync, the processor will wait for the Sync to complete. The Sync may end up timing out, in which case we follow the procedure outlined above, and signal both the interrupt and the Sync Time-out to the processor (but the Sync Time-out will be reported in the Cause register ExcepCode field, as it has higher priority than interrupts).

Similarly, if a processor takes a TLB fault or other precise trap, and there is an earlier Sync instruction active, the Sync will either complete or fail. If it fails, only the Sync Time-out exception will be signalled to the processor, as it was earlier in program order than the faulting memory reference.

MSP Interrupts (MINTs)

When a processor handles an external interrupt or TLB fault, it may return quickly before the other processors in the MSP even notice. If, however, the OS decides to interrupt the other processors, it issues a MINT instruction. This causes the processor to go through a procedure similar to the Sync Time-out. It asserts both its Freeze and Mint lines to all processors in the MSP. In response to the Freeze signal, the processors all enter the frozen state, as described in The description "Timeouts" above.

Once the freeze completes, all processors in the MSP will see the Mint line asserted from the processor that issued the MINT instruction. If another processor performed a MINT at about the same time, then the processors will see the Mint lines asserted from both of the processors. If another processor initiated an Msync time-out at about the same time, this information will be hidden by the MSP interrupt. In any event, the processors will interpret the event as a MINT, rather than as a Sync time-out.

In some embodiments, MINTs set IP bit 4 in the Cause control register, and are processed in the same way as other interrupts. MINTs do not cause precise exceptions on the processor issuing them.

While attempting to drain the currently active instructions after a MINT, the processor may encounter an Msync or Gsync instruction. In this case, the Sync instruction takes a precise MSP Interrupt Pending exception (rather than attempting to perform a Sync check-in). Although the occurrence of the MINT is still communicated to software via the IP4 bit, the precise exception has higher priority and is reported in the Cause control register ExcepCode field. This will happen even if the Msync or Gsync is already in the middle of a Sync check-in when the MINT occurs. Software will presumably treat an MSP Interrupt Pending exception in the same way as an MSP Interrupt.

If another MINT instruction is encountered when draining the active instructions after a MINT occurs, then that new MINT instruction is executed. This will have little effect on the processor encountering the new MINT instruction: it will set IP4 (which is already set), and then continue trying to drain the remaining active instructions. The second MINT could have a more visible effect on other processors. If another processor had already jumped to its exception handler and cleared IP4, then the execution of a second MINT would cause IP4 to be set again on that processor, possibly causing another exception to be taken on that processor after it returned from the first exception handler.

Figure 5:
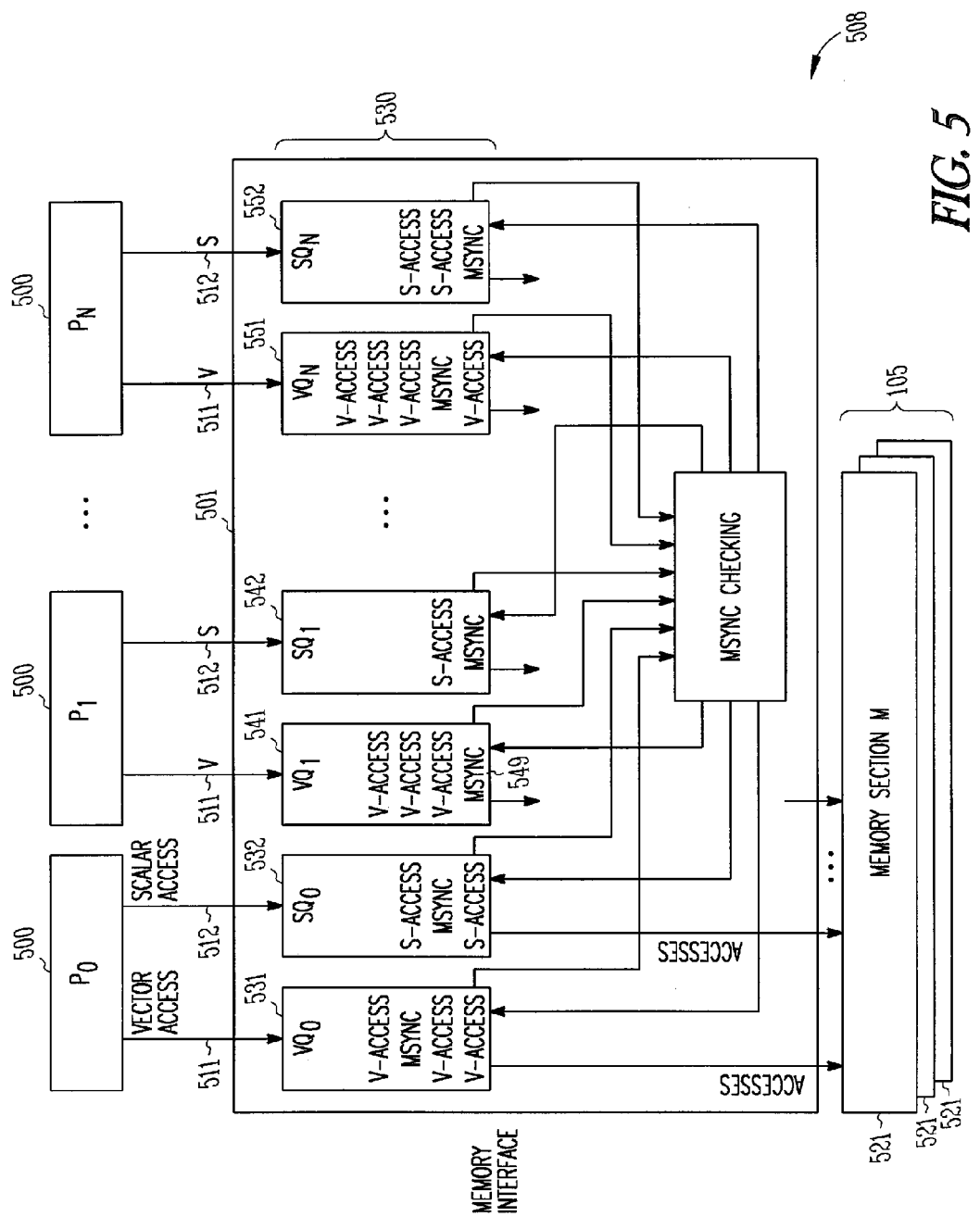
FIG. 5 shows a block diagram of a system 508 of some embodiments of the invention.

FIG. 5 shows a block diagram of a alternate system 508 of some embodiments of the invention. System 508 includes a plurality of processors 500 much like processor 100 described in FIG. 1L except that each processor has a separate output path for vector accesses and another path for scalar accesses, each connected to a plurality of E circuits or E Chips 501, which are in turn connected to memory 105.

Various types of sync instructions cause corresponding types of sync markers to be inserted into the VQs 531, 541, ... 551 and SQs 532, 542, ... 552. Thus a sync instruction, such as an Msync (described below), that requires the memory references before the sync instruction to complete (OB references) to include all scalar and vector references, would insert corresponding markers in both a VQ (e.g., VQ0 531) and the corresponding SQ (e.g., SQ0 532). Both markers would need to be at the port arbiter 191 of P0 chip 100 in order for it to send one Msync marker to Q0 230 on E0 Chip 101. In contrast, an Msync V that only synchronizes vector OB references from vector OA references would only insert a sync marker into the appropriate VQ 551, 552, ... 553.

In some embodiments, on each E Chip 501 there is a plurality of queues 530 corresponding to the number of P Chips 500 (one or more queues per P chip). In such embodiments, only vector memory references from a particular processor would be stopped once an Msync marker reached the head of that processor's VQ queue (e.g., as shown in queue 541 for processor P1, where an Msync marker 549 is at the head of queue Q1 541). In some embodiments, the memory 105 is divided into sections 521, with each processor having one or more separate queues for each section 521.

Instruction-Set Architecture for the Synchronization Instructions for Some Embodiments Sync, Global Memory (GSYNC)

TABLE 1

| 31 | 26 25 | 20 19 | 14 13 | 8 7 6 5 | 0 |
|---|---|---|---|---|---|
| g 000010 | i 000000 | j | k 000000 | t 00 | f |
| 6 | 6 | 6 | 6 | 2 | 6 |

Formats: GSYNC Aj, f=000000 SCALAR
   GSYNC Aj, A f=000010
   GSYNC Aj, R f=000011
   GSYNC Aj, CPU f=000001

Purpose:
Order loads and stores to shared memory in a multiprocessor.

Description:
The NV memory consistency model (see xxx) provides almost no guarantees on the apparent ordering of memory references issued by multiple single-stream processors. Rather, ordering can be established when desired by use of explicit synchronization instructions.

Gsync instructions provide a partial ordering of memory references issued by participating processors of the local MSP, as viewed by all processors in the system. The participating processors are identified by a mask in Aj. All participating processors must issue Gsyncs with consistent masks.

Each type of Gsync identifies two sets of memory references by participating processors: ordered before (OB) and ordered after (OA) references. The OB references consist of some or all of the participating processors' memory references that precede the Gsync in program order. The OA references consist of some or all of the participating processors' memory references that follow the Gsync in program order.

The Gsync guarantees that all of the OB references appear to occur before any of the OA references, as observed by any processor in the system. Specifically, all OB load results must be bound (their values determined) and all OB store values must be globally visible, before any OA load value can be bound or any OA store value can be observed by any other processors. The Gsync does not provide any ordering for memory references by participating processors that do not fall into either the OB or OA category.

For the regular Gsync instruction (GSYNC Aj), the OB references consist of all memory references issued by all participating processors before the Gsync instruction, and the OA references consist of all memory references issued by all participating processors after the Gsync instruction. Thus, this instruction provides a complete ordering of memory references preceding the Gsync and memory references following the Gsync.

For the acquire Gsync instruction (GSYNC Aj, A), the OB references consist of all scalar loads issued by all participating processors before the Gsync instruction, and the OA references consist of all memory references issued by all participating processors after the Gsync instruction. Thus, this instruction ensures that previous scalar loads have completed before any subsequent references are performed.

For the release Gsync instruction (GSYNC Aj, R), the OB references consist of all memory references issued by all participating processors before the Gsync instruction, and the OA references consist of all scalar stores issued by all participating processors after the Gsync instruction. Thus, this instruction ensures that all previous memory references are complete before any subsequent scalar stores are performed.

For the CPU Gsync instruction (GSYNC Aj, CPU), the OB and OA references are the same as for the regular Gsync instruction. In addition, the Gsync Aj, CPU instruction causes instruction dispatch to cease until all current CPU activity has completed. This means that all outstanding loads have completed, all outstanding stores have become globally visible, and all currently active instructions, both scalar and vector, have completed execution and written any architectural state. This is a superset of the general Gsync instruction.

For the purpose of Gsync operation, atomic memory operations are considered both scalar loads and stores. Thus, for all types of Gsync instruction, AMOs are considered OB references if preceding the Gsync in program order, and OA references if following the Gsync in program order.

Aj contains a right-justified, n-bit mask of participating processors, where n is the number of processors in an MSP. Bit p is set if processor p is participating in the barrier. Thus, a full barrier in a four-processor MSP would use a mask of 0xf. A barrier between processors 0 and 2 would use the mask 0x5.

Restrictions:

All of the participating processors must execute a Gsync instruction, else the Gsync will time out, causing a Gsync Timeout exception to be signaled at all processors waiting at the Gsync. The value of the timeout mechanism is selectable under OS control.

All participating processors must use the same type of Gsync (acquire, release, etc.), else the behavior of the instruction is Undefined. All participating processors must use the same Aj (mask) value, all bits of Aj not corresponding to a participating processor must be zero and all bits of Aj corresponding to a participating processor must be one, else the behavior of the instruction is Undefined and a Sync Error exception will be signaled at all participating processors.

Operation:

See Description above.

Exceptions:

Sync Timeout, Sync Error

Programming Notes:

The regular Gsync (GSYNC Aj) instruction is typically used in conjunction with multi-MSP synchronization mechanisms, such as critical sections and barriers. A join_barrier( ) routine, for example, might perform a Gsync before joining the barrier. This ensures that once the barrier has been satisfied, all other processors will see the results of the MSPs work (specifically, the work of those processors that participated in the Gsync).

The acquire Gsync (GSYNC Aj, A) instruction is typically used in conjunction with a lock acquisition protecting a critical section. When an acquire Gsync is issued between the access to a synchronization variable (the integer load) and accesses to data protected by the variable, it guarantees that the synchronization and data accesses occur in the correct order. However, the acquire Gsync does not wait for stores before the Gsync to complete, which would unnecessarily delay entry into the critical section. This is why the acquire Gsync is preferable to the general Gsync for acquire events.

The release Gsync (GSYNC Aj, R) instruction is typically used in conjunction with a lock release, barrier, or other synchronization event signalling to other processors that the current MSP is done performing some task. When a Gsync R is issued before writing a synchronization variable, it guarantees that any processor observing the write to the synchronization variable will subsequently be able to observe any work performed by the MSP before the release Gsync.

The release Gsync does not delay loads after the Gsync from executing until the stores before the Gsync have become globally visible. This is why the release Gsync is preferable to the general Gsync for release events.

The CPU Gsync (GSYNC Aj, CPU) should be used before context switches. It can also be used in debugging to make exceptions more "precise." Care must be taken, however, to ensure that any Gsync with multiple bits set in the mask is executed by all participating processors.

Implementation Note:

In some embodiments, an implementation does not necessarily have to serialize the full execution of memory references before and after the Gsync. The Gsync instruction requires, in some embodiments, only that the instructions appear to occur in order. Thus, OA references could begin execution so long as their effect cannot be observed by any processor. A fetch for a write miss could be initiated, for example, before an earlier Gsync has completed. The implementation must be careful, however, not to violate the global ordering guarantees provided by the memory consistency model and the Gsync instruction.

Sync, MSP (MSYNC)

TABLE 2

| 31 | 26 | 25 | 20 | 19 | 14 | 13 | 8 | 7 6 | 5 | 0 |
|---|---|---|---|---|---|---|---|---|---|---|
| g 000010 | | i 000000 | | j | | k 000000 | | t 00 | | f |
| 6 | | 6 | | 6 | | 6 | | 2 | | 6 |

Formats: MSYNC Aj f=010000 SCALAR
MSYNC Aj, P f=010001
MSYNC Aj, V f=010010

Purpose: Intra-MSP barrier and memory synchronization

Description:

The Msync instructions act as a barrier synchronization and memory ordering fence among any arbitrary set of single-stream processors within an MSP. Aj provides a mask indicating which processors of the MSP are participating in the barrier. All participating processors must issue Msyncs with consistent masks.

Each type of Msync identifies two sets of memory references by participating processors: ordered before (OB) and ordered after (OA) references. The OB references consist of some or all of the participating processors' memory references that precede the Msync in program order. The OA references consist of some or all of the participating processors' memory references that follow the Msync in program order. The processors participating in an Msync may use different types of Msyncs, which will simply determine which of each processor's memory references are included in the set of OB and OA references.

The Msync guarantees that all of the OB references appear to occur before any of the OA references, as observed by the processors participating in the Msync. Specifically, no OB read will return the result from any OA write, no OB write will overwrite the value of any OA write and all OA reads will observe all OB writes. The Msync does not provide any ordering for memory references by participating processors that do not fall into either the OB or OA category. Nor does it provide any global ordering of operations as observed by non-participating processors.

For a processor issuing the regular Msync (MSYNC Aj) instruction, its OB references consist of all memory references issued before the Msync instruction, and its OA references consist of all memory references issued after the Msync instruction. Thus, when all participants use the regular Msync, the operation provides a complete ordering of memory references by participants preceding the Msync and memory references by the participants following the Msync.

For a processor issuing the vector Msync (MSYNC Aj, V) instruction, its OB references consist of all vector memory references before the Msync instruction, and its OA references consist of all vector memory references issued after the Msync instruction. Thus its scalar references are not ordered with respect to any other references.

For a processor issuing the producer Msync (MSYNC Aj, P) instruction, its OB references consist of all memory references issued before the Msync instruction, and it has no OA references. Thus, its memory references after the Msync are not ordered with respect to any other references.

Msync does not order AMOs with respect to other memory references. Ordering of AMOs requires, in some embodiments, the use of Gsyncs.

Aj contains a right-justified, n-bit mask of participating processors, where n is the number of processors in an MSP. Bit p is set if processor p is participating in the barrier. Thus, a full barrier among a four-processor MSP would use a mask of 0xf. A barrier between processors 0 and 2 would use the mask 0x5.

Restrictions:
All of the participating processors must execute an Msync instruction, else the barrier will time out, causing an Sync Timeout exception to be signaled at all processors waiting at the Msync. The value of the timeout mechanism is selectable under OS control.

All participating processors must use the same Aj (mask) value, all bits of Aj not corresponding to a participating processor must be zero and all bits of Aj corresponding to a participating processor must be one, else the behavior of the instruction is Undefined and a Sync Error exception will be signaled at all participating processors.

Exceptions:
Sync Timeout, Sync Error

Programming Notes:
A regular Msync provides an effective barrier synchronization among the participating processors. This mechanism can be used to "park" slave processors while waiting for a master processor to execute a serial section and compute values needed by the slaves. The slave processors will stall on the first memory request after the Msync. When the master eventually executes its Msync, the slave processor loads will complete and the slave processors will resume execution. Of course the setting of the Msync time-out timer determines how long the slave processors can be parked before causing a Msync Time-out exception. Since this is a precise exception, the OS can restart a job if it determines that it is behaving properly.

The vector Msync should be used for protecting vector-vector and scalar-vector dependencies among the processors. This can avoid performance penalties to unrelated scalar references after the Msync.

The producer Msync should be used by the producer in producer-consumer synchronization. This ensures that the consumer will see all previous memory references of the producer, but avoids penalizing subsequent memory references by the producer. Note that for the producer Msync to make sense, at least one processor must use a regular or vector Msync. A synchronization event using nothing but producer Msyncs would have no functional effect at all.

Sync, Local Floating Point (LSYNC FP)

TABLE 3

| 31 | 26 25 | 20 19 | 14 13 | 8 7 | 6 5 | 0 |
|---|---|---|---|---|---|---|
| g<br>000010 | i<br>000000 | j<br>000000 | k<br>000000 | t<br>00 | f<br>001111 | |
| 6 | 6 | 6 | 6 | 2 | 6 | |

Format: LSYNC FP VECTOR

Purpose: Provide Ordering with Respect to Previous Floating Point Activity

Description:
The Lsync FP instruction causes instruction dispatch to cease until all previous scalar and vector floating point operations have completed, and their results are visible.

Restrictions:
None

Operation:
See Description above.

Exceptions:
None

Programming Notes:
Lsync FP can be used before reading the floating point status register to guarantee that the results of all previous floating point instructions are visible. It can also be used to guarantee that any floating point exceptions from previous instructions will be generated before continuing with the instruction execution.

Sync, Local Instruction Stream (LSYNC FP)

TABLE 4

| 31 | 26 25 | 20 19 | 14 13 | 8 7 | 6 5 | 0 |
|---|---|---|---|---|---|---|
| g<br>000010 | i<br>000000 | j<br>000000 | k<br>000000 | t<br>00 | f<br>001110 | |
| 6 | 6 | 6 | 6 | 2 | 6 | |

Format: LSYNC I VECTOR

Purpose:
Provide coherence between stores and instruction fetches

Description:
Lsync I, when used in conjunction with the Gsync instruction, causes subsequent instruction fetches to see the result of previous memory stores.

The results of previous scalar and vector stores by the same processor are visible to subsequent instruction fetches after performing a release Gsync (or regular or CPU Gsync) followed by an Lsync I.

The results of previous scalar and vector stores by a different processor within the same MSP are visible to subsequent instruction fetches after performing a release Gsync (or regular or CPU Gsync) that includes the writing processor, followed by an Lsync I. Msyncs are insufficient for this purpose.

To ensure that instruction fetches by processor A will see the results of stores by a processor B in a different MSP, the two processors must first synchronize via Gsyncs. After processor B performs the stores to processor A's instruction space, it must perform a release Gsync (or regular or CPU Gsync) and then synchronize with processor A (by writing a flag which processor A reads, for example). Processor A must then perform an acquire Gsync (or regular or CPU Gsync) and then perform an Lsync I. At this point, subsequent instruction fetches by processor A will observe the stores performed by processor B.

Restrictions:
None

Operation:
See Description above.

Exceptions:
None

Implementation Notes:
On a typical implementation, this instruction will simply invalidate the instruction cache, and then force subsequent instructions to be re-fetched from the instruction cache, causing re-fills from the memory hierarchy. The Gsyncs ensure that, even if instruction fetches take a different path to the memory system than loads, the previous stores to instruction space will be visible to the subsequent fetches.

Programming Notes:
This instruction can be used by de-buggers, by self-modifying code, or when dynamically generating code.

Sync, Local Scalar-Vector (LSYNC S,V)

TABLE 5

| 31 | 26 | 25 | 20 | 19 | 14 | 13 | 8 | 7 | 6 | 5 | 0 |
|---|---|---|---|---|---|---|---|---|---|---|---|
| g 000010 | | i 000000 | | j 000000 | | k 000000 | | t 00 | | | f 001000 |
| 6 | | 6 | | 6 | | 6 | | 2 | | | 6 |

Format: LSYNC S,V VECTOR

Purpose:
Provide Local Memory Ordering Between Scalar and Vector References

Description:
Lsync S,V provides ordering between scalar and vector memory references issued by the same processor. All scalar loads and stores preceding the Lsync S,V in program order appear to execute before any vector loads or stores following the Lsync S,V in program order. Lsync S,V provides no ordering among multiple vector memory references. Nor does it ensure that preceding scalar references have been globally performed before subsequent vector references are performed. LSyncs have no effect on AMO ordering.

Restrictions:
None

Operation:
See Description above.

Exceptions:
None

Programming Notes:
Scalar-vector Lsync instructions provide a lightweight mechanism for ordering scalar memory references with subsequent vector references.

Usage Examples:
Scalar Store
LSYNC S,V; protect against RAW hazard
Vector Load
. . .
Scalar Store
LSYNC S,V; protect against WAW hazards
Vector Store Implementation Notes:
Note that Lsync S,V does not require prior scalar references to be complete before allowing subsequent vector references to issue. It simply requires, in some embodiments, that they must appear to have completed. Thus, an implementation could simply ensure that subsequent vector references have no way of passing prior scalar references on the way to the cache and/or memory system.

Sync, Local Vector-Scalar (LSYNC V,S)

TABLE 6

| 31 | 26 | 25 | 20 | 19 | 14 | 13 | 8 | 7 | 6 | 5 | 0 |
|---|---|---|---|---|---|---|---|---|---|---|---|
| g 000010 | | i 000000 | | j 000000 | | k 000000 | | t 00 | | | f 001001 |
| 6 | | 6 | | 6 | | 6 | | 2 | | | 6 |

Format: LSYNC V,S VECTOR

Purpose:
Provide Local Memory Ordering Between Vector and Scalar References

Description:
Lsync V,S provides ordering between vector and scalar memory references issued by the same processor. All vector loads and stores preceding the Lsync V,S in program order appear to execute before any scalar loads or stores following the Lsync V,S in program order. Lsync V,S provides no ordering among multiple vector memory references. Nor does it ensure that preceding vector references have been globally performed before subsequent scalar references are performed. LSyncs have no effect on AMO ordering.

Restrictions:
None

Operation:
See Description above.

Exceptions:
None

Programming Notes:
Vector-scalar Lsync instructions provide a lightweight mechanism for ordering vector memory references with subsequent scalar references.

Usage Example:
Vector Store
LSYNC V, S; protect against RAW hazard
Scalar Load

Implementation Notes:
Note that Lsync V,S does not require prior vector references to be complete before allowing subsequent scalar references to issue. It simply requires, in some embodiments, that they must appear to have completed. Thus, an implementation could simply ensure that subsequent scalar references have no way of passing prior vector references on the way to the cache and/or memory system.

Sync, Local Vector-Scalar Read (LSYNC VR,S)

TABLE 7

| 31 | 26 | 25 | 20 | 19 | 14 | 13 | 8 | 7 | 6 | 5 | 0 |
|---|---|---|---|---|---|---|---|---|---|---|---|
| g 000010 | | i 000000 | | j 000000 | | k 000000 | | t 00 | | | f 001010 |
| 6 | | 6 | | 6 | | 6 | | 2 | | | 6 |

Format: LSYNC VR,S VECTOR

Purpose:
Provide local memory ordering between vector loads and scalar Stores

Description:
Lsync VR,S provides ordering between vector loads and scalar stores issued by the same processor. All vector loads preceding the Lsync VR,S in program order appear to execute before any scalar loads or stores following the Lsync VR,S in program order.

Lsync VR,S provides no ordering among multiple vector memory references or between vector stores and scalar references. Nor does it ensure that preceding vector loads have been globally performed before subsequent scalar references are performed. LSyncs have no effect on AMO ordering.

Restrictions:
    None

Operation:
    See Description above.

Exceptions:
    None

Programming Notes:
    Vector-scalar read Lsync instructions provide a lightweight mechanism for providing WAR protection between vector loads and subsequent scalar stores.

Usage example:
    Vector Load
    LSYNC VR,S; protect against WAR hazard
    Scalar Store Implementation Notes:
    Note that Lsync VR,S does not require prior vector loads to be complete before allowing subsequent scalar references to issue. It simply requires, in some embodiments, that they must appear to have completed. Thus, an implementation could simply ensure that subsequent scalar references have no way of passing prior vector loads on the way to the cache and/or memory system. Note also that this should generally be more lightweight than using the more restrictive Lsync V,S as the scalar references do not have to wait for previous vector stores to complete.
    Implementations such as X1 that decouple store addresses from store data remove the performance penalty of waiting for previous vector stores. Thus, they may choose to simply interpret and implement Lsync VR,S instructions as Lsync V,S instructions.

Sync, Local Vector-Vector (LSYNC V,V)

TABLE 8

| 31 | 26 25 | 20 19 | 14 13 | 8 7 | 6 5 | 0 |
|---|---|---|---|---|---|---|
| g<br>000010 | i<br>000000 | j<br>000000 | k<br>000000 | t<br>00 | f<br>001011 | |
| 6 | 6 | 6 | 6 | 2 | 6 | |

Format: LSYNC V,V VECTOR

Purpose:
    Provide Local Memory Ordering Between Groups of Vector References

Description:
    Lsync V,V provides ordering between vector memory references issued by the same processor. All vector loads and stores preceding the Lsync V,V in program order appear to execute before any vector loads or stores following the Lsync V,V in program order.
    Lsync V,V provides no ordering between scalar and vector memory references. Nor does it ensure that preceding vector references have been globally performed before subsequent vector references are performed. LSyncs have no effect on AMO ordering.

Restrictions:
    None

Operation:
    See Description above.

Exceptions:
    None

Programming Notes:
    Vector-vector Lsync instructions provide a lightweight mechanism for ordering vector memory references, since they imply no ordering with respect to scalar references.

Usage Examples:
    Vector Store
    LSYNC V,V; protect against RAW hazard
    Vector Load
    Vector Store
    Vector Load
    LSYNC V,V; protect against WAR and WAW hazards
    Vector Store Implementation Notes:

Note that Lsync V,V does not require prior vector references to be complete before allowing subsequent vector references to issue. It simply requires, in some embodiments, that they must appear to have completed. Thus, an implementation could simply ensure that subsequent vector references have no way of passing prior vector references on the way to the cache and/or memory system.

Sync, Local Vector Register-Vector (LSYNC Vj,V)

TABLE 9

| 31 | 26 25 | 20 19 | 18 | 14 13 | 8 7 | 6 5 | 0 |
|---|---|---|---|---|---|---|---|
| g<br>000010 | i<br>000000 | z<br>0 | j | k<br>000000 | t<br>00 | f<br>001100 | |
| 6 | 6 | 1 | 5 | 6 | 2 | 6 | |

Format: LSYNC Vj,V VECTOR

Purpose:
    Provide local memory ordering between specific vector references.

Description:
    Lsync Vj,V provides ordering between specific vector memory references issued by the same processor. The last memory reference associated with vector register Vj preceding the Lsync Vj,V in program order appears to execute before any vector loads or stores following the Lsync Vj,V in program order.
    Lsync Vj,V provides no ordering between scalar and vector memory references, or between other (than the last associated with vector register Vj) earlier vector references and subsequent vector references. Nor does it ensure that the last vector reference associated with register Vj has been globally performed before subsequent vector references are performed. LSyncs have no effect on AMO ordering.

Restrictions:
    None

Operation:
    See Description above.

Exceptions:
    None

Programming Notes:
    Vector register-vector Lsync instructions provide a targeted mechanism for ordering specific vector memory references, allowing the memory pipeline to remain full with independent memory references. If the load or store associated with register Vj has already completed locally at the time that the Lsync Vj,V is issued, then the delay due to synchronization can generally be minimized. Subsequent references do not have to wait for all currently outstanding references to complete, just the specified reference.

Usage Examples:
Vk Load; load from array A into register Vk
[Other loads, ops and stores]
LSYNC Vj, V; protect against WAR hazard involving array A
Vector Store; write to array A Implementation Notes:
Note that Lsync Vj,V does not require the specified vector reference to be complete before allowing subsequent vector references to issue. It simply requires, in some embodiments, that it must appear to have completed. Thus, an implementation could simply ensure that subsequent references have no way of passing the specified reference on the way to the cache and/or memory system.

Sync, Local Vector Register-Vector Elemental (LSYNC V,V)

TABLE 10

| 31 | 26 25 | 20 19 | 18 | 14 13 | 8 7 6 5 | | 0 |
|---|---|---|---|---|---|---|---|
| g 000010 | i 000000 | z 0 | j | k 000000 | t 00 | | f 001101 |
| 6 | 6 | 1 | 5 | 6 | 2 | | 6 |

Format: LSYNC Vj, V, EL VECTOR

Purpose:
Provide Local Memory Ordering For Specific Vector References by Elements Description:
Lsync Vj,V,EL provides ordering between individual elements of vector memory references issued by the same processor. The ordering is provided between the last memory reference associated with vector register Vj preceding the Lsync Vj,V,EL in program order, and all vector loads or stores following the Lsync Vj,V,EL in program order. Ordering is provided on a per-element basis, rather than on entire vector references. That is, each element of the earlier reference appears to execute before the corresponding (same number) element of any subsequent vector reference.

Lsync Vj,V,EL provides no ordering between scalar and vector memory references, between other (than the last associated with vector register Vj) earlier vector references and subsequent vector references, or between memory references from the local and other processors. LSyncs have no effect on AMO ordering.

Restrictions:
None

Operation:
See Description above.

Exceptions:
None

Programming Notes:
Elemental vector Lsync instructions are most useful for protecting against intra-loop anti-dependencies in the same iteration, arising from code such as:
for i=1,n
... = ... A(i) ...
A(i)= ...
In this case, the vector load from A and store to A can be scheduled in the same chime, with an elemental vector Lsync protecting against the WAR hazards on each element:

Vi Load; load from array A into Register Vk
[Other loads, ops and stores]
LSYNC Vj,V,EL; protect against WAR hazard involving array A
Vector Store; write to array A Elemental vector Lsync instructions can also be used for protecting against RAW hazards associated with a vector register spill and re-fill. With 32 vector registers, however, spills should be relatively rare.

Implementation Notes:
Note that Lsync Vj,V,EL does not require cross-pipe synchronization in a multi-pipe implementation. Therefore, even in situations in which the potentially conflicting vector references are scheduled in different chimes, the elemental Lsync can be expected to be somewhat lighter-weight than a full vector register-vector Lsync when it is applicable.

Atomic Memory Operations

In the assembler syntax shown; DL can be replaced with D or L. The symbol also can be omitted (be understood to stand for 64-bit operation when not present).

Atomic Fetch and Add

TABLE 11

| 31 | 26 25 | 20 19 | 14 13 | 8 7 6 5 | 3 2 | 0 |
|---|---|---|---|---|---|---|
| g 000100 | i | j | k | t 01 | h | f 000 |
| 6 | 6 | 6 | 6 | 2 | 3 | 3 |

Format: Ai,DL [Aj],AFADD,Ak,hint SCALAR

Purpose: Perform an atomic fetch-and-add on a memory location

Description:
The 64-bit signed integer value in Ak is added to the value in the memory location specified by Aj, and the old value of the memory location is returned into Ai. No integer overflow is detected. The read-modify-write sequence for the addition at memory is performed atomically with respect to any other atomic memory operations or stores.

All 64-bits of Ak are used and 64-bits of memory data are entered into Ai.

The hint can be na (non-allocate, h=2) or ex (cache exclusive, h=0). See for a description of the hint field values. The hint can be omitted, defaulting to na.

Restrictions:
The address in Aj must be naturally aligned. The bottom three bits must be zero, else an Address Error exception is signaled and Ai becomes Undefined.

Operand register numbers j and k must not differ by 32. If abs(k-j)=32, then Ai becomes Undefined and an Illegal Register Reference exception is signaled.

The supported range of the virtual address is implementation specific. If the virtual address in Aj lies outside the supported range, then Ai becomes Undefined and an Address Error exception is signaled.

Operation:
pAddr←AddressTranslation(ValueAR(j, L), D)
memdata←LoadMemory(D, pAddr, D)
StoreAR(i, L, memdata)
StoreMemory(D, (memdata+ValueAR(k, L)), pAddr)

Exceptions:
    TLB Miss, TLB Modify, TLB Conflict, Address Error, Illegal Register Reference Programming Notes:
    Note that atomic memory operations are not ordered by default with respect to scalar or vector loads or stores, nor are they ordered by Msyncs. Ordering of AMOs can be accomplished via Gsyncs or by true dependencies.

Atomic Compare and Swap

TABLE 12

| 31 26 | 25 20 | 19 14 | 13 8 | 7 6 5 | 3 2 | 0 |
|---|---|---|---|---|---|---|
| g<br>000100 | i | j | k | t<br>01 | h | f<br>010 |
| 6 | 6 | 6 | 6 | 2 | 3 | 3 |

Format: Ai,DL [Aj],ACSWAP,Ak SCALAR

Purpose: Perform an atomic masked swap on a memory location

Description:
    The 64-bit integer value in Ai (the comparand) is compared to the value in the Doubleword memory location specified by Aj. If the values match, then the value in Ak (the swaperand) is stored into the memory location. In either case, the old value in the memory location is returned into Ai. The read-modify-write sequence for the swap is performed atomically with respect to any other atomic memory operations or stores.
    All 64-bits of Ak are used and 64-bits of memory data are entered into Ai.

The hint can be na (non-allocate, h=2) or ex (cache exclusive, h=0). See for a description of the hint field values. The hint can be omitted, defaulting to na.

Restrictions:
    The address in Aj must be naturally aligned. The bottom three bits must be zero, else an Address Error exception is signaled and Ai becomes Undefined.

Operand register numbers j and k must not differ by 32. If abs(k-j)=32, then Ai becomes Undefined and an Illegal Register Reference exception is signaled.

The supported range of the virtual address is implementation specific. If the virtual address in Aj lies outside the supported range, then Ai becomes Undefined and an Address Error exception is signaled.

Operation:
    pAddr←AddressTranslation(ValueAR(j, L), D)
    temp←LoadMemory(D, pAddr, D)
    if (temp=ValueAR(i, L)) then
    StoreMemory(D, ValueAR(k, D), pAddr)
    endif
    StoreAR(i, L, temp)

Exceptions:
    TLB Miss, TLB Modify, TLB Conflict, Address Error, Illegal Register Reference Programming Notes:
    Note that atomic memory operations are not ordered by default with respect to scalar or vector loads or stores, nor are they ordered by Msyncs. Ordering of AMOs can be accomplished via Gsyncs or by true dependencies.

Atomic Fetch and And-Exclusive Or

TABLE 13

| 31 26 | 25 20 | 19 14 | 13 8 | 7 6 5 | 3 2 | 0 |
|---|---|---|---|---|---|---|
| g<br>000100 | i | j | k | t<br>01 | h | f<br>001 |
| 6 | 6 | 6 | 6 | 2 | 3 | 3 |

Format: Ai,DL [Aj],AFAX,Ak SCALAR

Purpose: Perform an atomic fetch and a logic function on a memory location

Description:
    Under control of a 64-bit mask value in Ai, the Doubleword memory location specified by the memory byte address value in Aj, is modified using data from the 64-bit value in Ak. The read-modify-write sequence for the masked swap is performed atomically with respect to any other atomic memory operations or stores. The old value in the memory location, before modification, is returned into Ai.

This equation represents the logic function being performed on the specified memory location:

[Aj]←(Ai and [Aj]) xor Ak
    Each bit in the target memory Doubleword is ANDed with the corresponding bit of Ai. The result Doubleword is XORed with the corresponding bit of Ak. Using various combinations of Ai and Ak data bit values, masked store operations can be performed (store byte, for example) or logical operations can be performed on the specified memory Doubleword. AND, OR, XOR and EQV operations can all be performed as shown below.
    All 64-bits of Ak and Ai are used and 64-bits of memory data are entered into Ai.

The hint can be na (non-allocate, h=2) or ex (cache exclusive, h=0). See for a description of the hint field values. The hint can be omitted, defaulting to na.

Restrictions:
    The address in Aj must be naturally aligned. The bottom three bits must be zero, else an Address Error exception is signaled and Ai becomes Undefined.

Operand register numbers j and k must not differ by 32. If abs(k-j)=32, then Ai becomes Undefined and an Illegal Register Reference exception is signaled.

The supported range of the virtual address is implementation specific. If the virtual address in Aj lies outside the supported range, then Ai becomes Undefined and an Address Error exception is signaled.

Operation:
    pAddr←AddressTranslation(ValueAR(j, L), D)
    memval←LoadMemory(D, pAddr)
    newval (ValueAR(i, L) and memval) xor ValueAR(k, L)
    StoreMemory(D, newval, pAddr)
    StoreAR(i, L, memval)

Exceptions:
    TLB Miss, TLB Modify, TLB Conflict, Address Error, Illegal Register Reference Programming Notes:
    The truth table of the logical function that is implemented by this instruction is:

TABLE 14

Truth Table for Masked Logical Instructions

| Ai | Ak | Prev Mem | New Memory | Result Ai (from Prev Mem) |
|---|---|---|---|---|
| 0 | 0 | 0 | 0 (from Ak) | 0 |
| 0 | 0 | 1 | 0 (Ak) | 1 |
| 0 | 1 | 0 | 1 (Ak) | 0 |
| 0 | 1 | 1 | 1 (Ak) | 1 |
| 1 | 0 | 0 | 0 (Prev Mem) | 0 |
| 1 | 0 | 1 | 1 (Prev Mem) | 1 |
| 1 | 1 | 0 | 1 (Complement Mem) | 0 |
| 1 | 1 | 1 | 0 (Complement Mem) | 1 |

The following Table 15 shows how to set Ai and Ak to accomplish various logical functions to memory.

TABLE 15

Logical Operations for Masked Logical Instructions

| Function | Ai | Ak | Memory Result in (Aj) |
|---|---|---|---|
| AND (Force clear on 0-bits) | operand | All zeros | (Aj) And operand |
| OR (Force set on 1-bits) | ~operand | operand | (Aj) Or operand |
| XOR | All ones | operand | (Aj) Xor operand |
| EQV | All ones | ~operand | (Aj) Eqv operand |
| Store under mask (0 in mask stores operand) | mask | operand, except 0s where mask is 1s | Store operand under mask |

Operand is the 64-bit operand value that will modify the specified memory location; the '~' symbol indicates taking the is complement.

Some Examples:

To force the bottom 6 bits of a memory location to be 1s, leaving the other 58 bits in memory unchanged, set Ai= 111 . . . 111000000, Ak to 000 . . . 000111111.

To store data into byte 1 (bits 15 . . . 8) of a memory location, leaving the other bits in the memory location unchanged, set Ai=111 . . . 1110000000011111111 and set Ak to 0000 . . . 000dddddddd00000000 where 'dddddddd' is the data byte being stored.

To set and clear bits in a memory location at the same time, something like this can be done:

A1←bits to be set

A2←bits to be cleared

A3←A1|A2

A3←~A3

A3←[A4], AFAX, A1

Note that atomic memory operations are not ordered by default with respect to scalar or vector loads or stores, nor are they ordered by Msyncs. Ordering of AMOs can be accomplished via Gsyncs or by true dependencies.

Atomic Add

TABLE 16

| 31 | 26 25 | 20 19 | 14 13 | 8 7 6 5 | 3 2 | 0 |
|---|---|---|---|---|---|---|
| g 000100 | i | j | k 000000 | t 01 | h | f 100 |
| 6 | 6 | 6 | 6 | 2 | 3 | 3 |

Format: [Aj] Ai,DL,AADD SCALAR

Purpose: Perform an atomic integer add to a memory location

Description:

The 64-bit signed integer value in Ai is added to the value in the Doubleword memory byte address specified by Aj. No integer overflow is detected. The read-modify-write sequence for the addition in memory is performed atomically with respect to any other atomic memory operations or stores. No result is returned from memory.

All 64-bits of Ai are used.

The hint can be na (non-allocate, h=2) or ex (cache exclusive, h=0). See for a description of the hint field values. The hint can be omitted, defaulting to na.

Restrictions:

The address in Aj must be naturally aligned. The bottom three bits must be zero, else an Address Error exception is signaled.

Operand register numbers j and k must not differ by 32. If abs(k-j)=32, then Ai becomes Undefined and an Illegal Register Reference exception is signaled.

The supported range of the virtual address is implementation specific. If the virtual address in Aj lies outside the supported range, then an Address Error exception is signaled.

Operation:
   pAddr←AddressTranslation(ValueAR(j, L), D)
   temp←LoadMemory(D, pAddr, D)
   StoreMemory(D, ValueAR(i, D)+temp, pAddr)

Exceptions:
   TLB Miss, TLB Modify, TLB Conflict, Address Error

Programming Notes:

This instruction is identical to the fetch and add (AFADD) instruction, except that it does not return a result. Thus it does not tie up a result register, and will likely allow more pipelining in most implementations than will the AFADD version.

AADD should be used in situations where a value in memory must be modified, but the old value is not needed, such as when updating a shared counter.

Note that atomic memory operations are not ordered by default with respect to scalar or vector loads or stores, nor are they ordered by Msyncs. Ordering of AMOs can be accomplished via Gsyncs or by true dependencies.

Atomic And-Exclusive Or

TABLE 17

| 31 | 26 25 | 20 19 | 14 13 | 8 7 6 5 | 3 2 | 0 |
|---|---|---|---|---|---|---|
| g 000100 | i | j | k | t 01 | h | f 101 |
| 6 | 6 | 6 | 6 | 2 | 3 | 3 |

Format: [Aj]Ai,DL,AAX,Ak SCALAR

Purpose: Perform an atomic masked store on a memory location

Description:

Under control of a 64-bit mask value in Ai, the Doubleword memory location specified by the memory byte address value in Aj, is modified using data from the 64-bit value in Ak. The read-modify-write sequence for the masked swap is performed atomically with respect to any other atomic memory operations or stores. No result is returned from memory.

This equation represents the logic function being performed on the specified memory location:

[Aj]←(Ai and [Aj]) xor Ak

Each bit in the target memory Doubleword is ANDed with the corresponding bit of Ai. The result Doubleword is XORed with the corresponding bit of Ak. Using various combinations of Ai and Ak data bit values, masked store operations can be performed (store byte, for example) or logical operations can be performed on the specified memory Doubleword. AND, OR, XOR and EQV operations can all be performed; see the Programming Notes for the instruction "Atomic Fetch And-Exclusive Or."

All 64-bits of Ak and Ai are used.

The hint can be na (non-allocate, h=2) or ex (cache exclusive, h=0). See for a description of the hint field values. The hint can be omitted, defaulting to na.

Restrictions:

The address in Aj must be naturally aligned. The bottom three bits must be zero, else an Address Error exception is signaled.

Operand register numbers j and k must not differ by 32. If abs(k-j)=32, then Ai becomes Undefined and an Illegal Register Reference exception is signaled.

The supported range of the virtual address is implementation specific. If the virtual address in Aj lies outside the supported range, then an Address Error exception is signaled.

Operation:

pAddr←AddressTranslation(ValueAR(j, L), D)
memval←LoadMemory(D, pAddr)
newval←(ValueAR(i, L) and memval) xor ValueAR(k, L)
StoreMemory(D, newval, pAddr)

Exceptions:

TLB Miss, TLB Modify, TLB Conflict, Address Error, Illegal Register Reference

Programming Notes:

See the Programming Notes for the instruction "Atomic Fetch and And-Exclusive Or" for full details on functionality and use. This instruction performs the same function except that the old memory contents specified by Aj are not returned.

Note that atomic memory operations are not ordered by default with respect to scalar or vector loads or stores, nor are they ordered by Msyncs.

One aspect of the invention (e.g., useful for Lsync-type operations), in some embodiments, provides an apparatus 200 or 500 that includes a first plurality of queues (e.g., 230 and 240 or 161 and 181), including a first queue and a second queue, each of the first plurality of queues for holding a plurality of pending memory requests 237 and 247. The apparatus also includes, in some embodiments, one or more instruction-processing circuits (e.g., IRQ 187 or VLSU 111), operatively coupled to the plurality of queues, that inserts one or memory requests into at least one of the queues based on a first instruction that specifies a memory operation, and that inserts a first synchronization marker into the first queue and inserts a second synchronization marker into the second queue based on a second instruction that specifies a synchronization operation, and that inserts one or memory requests into at least one of the queues based on a third instruction that specifies a memory operation. This apparatus also includes a first synchronization circuit, operatively coupled to the first plurality of queues, that selectively halts processing of further memory requests from the first queue based on the first synchronization marker reaching a predetermined point in the first queue until the corresponding second synchronization marker reaches a predetermined point in the second queue.

In some embodiments, the plurality of queues is within a processor 100, and wherein the first queue is used for only vector memory requests and synchronizations, and the second queue is used for only scalar memory requests and synchronizations.

In some embodiments, the first synchronization instruction is an Lsync-type instruction.

In some embodiments, the first synchronization instruction is an Lsync V,S-type instruction.

In some embodiments, for a second synchronization instruction, a corresponding synchronization marker is inserted to only to the first queue.

In some embodiments, the second synchronization instruction is an Lsync-type instruction.

Some embodiments further include a second plurality of queues, including a third queue and a fourth queue, each of the second plurality of queues for holding a plurality of pending memory requests, wherein the plurality of queues is in a circuit coupled to each of a plurality of processors including a first processor and a second processor, and wherein the third queue is used for only memory requests and synchronizations from the first processor, and the second queue is used for only memory requests and synchronizations from the second processor.

Some embodiments further include a second synchronization circuit, operatively coupled to the second plurality of queues, that selectively halts further processing of memory requests from the third queue based on the first synchronization marker reaching a predetermined point in the third queue until a corresponding synchronization marker from the second processor reaches a predetermined point in the fourth queue.

Some embodiments further include a fifth queue for holding a plurality of write data elements, wherein each write data element corresponds to a memory request in the first queue, and wherein the write data elements are loaded into the fifth queue decoupled from the loading of memory requests into the first queue.

Some embodiments further include a data cache, and an external cache, wherein first synchronization instruction is an Lsync V,S type instruction, preventing subsequent scalar references from accessing the data cache until all vector references have been sent to the external cache and all vector writes have caused any necessary invalidations of the data cache.

Another aspect of the invention, in some embodiments, provides a method that includes providing a first plurality of queues, including a first queue and a second queue, each of the first plurality of queues for holding a plurality of pending memory requests, inserting one or memory requests into at least one of the queues based on a first instruction that specifies a memory operation, based on a second instruction that specifies a synchronization operation inserting a first synchronization marker into the first queue and inserting a second synchronization marker into the second queue, inserting one or memory requests into at least one of the queues based on a third instruction that specifies a memory operation, processing memory requests from the first queue, and selectively halting further processing of memory requests from the first queue based on the first synchronization marker reaching a predetermined point in the first queue until the corresponding second synchronization marker reaches a predetermined point in the second queue.

In some embodiments of the method, the plurality of queues is within a first processor, and wherein the inserting to first queue is for only vector memory requests and synchronizations, and the inserting to the second queue is for only scalar memory requests and synchronizations.

In some embodiments of the method, the first synchronization instruction is an Lsync-type instruction.

In some embodiments of the method, the first synchronization instruction is an Lsync V,S-type instruction.

In some embodiments of the method, based on a second synchronization instruction that specifies a synchronization operation, inserting a corresponding synchronization marker to only the first queue.

In some embodiments of the method, the second synchronization instruction is an Lsync-type instruction.

Some embodiments of the method further include providing a plurality of processors including a first processor and a second processor, providing a second plurality of queues, including a third queue and a fourth queue, each of the second plurality of queues for holding a plurality of pending memory requests, inserting to the third queue only memory requests and synchronizations from the first processor, and inserting to the second queue only memory requests and synchronizations from the second processor.

Some embodiments of the method further include selectively halting further processing of memory requests from the third queue based on the first synchronization marker reaching a predetermined point in the third queue until a corresponding synchronization marker from the second processor reaches a predetermined point in the fourth queue.

Some embodiments of the method further include queueing a plurality of write data elements to a fifth queue, wherein each write data element corresponds to a memory request in the first queue, and wherein the write data elements are inserted into the fifth queue decoupled from the inserting of memory requests into the first queue.

Some embodiments of the method further include providing a data cache and an external cache, wherein first synchronization instruction is an Lsync V,S type instruction, and preventing subsequent scalar references from accessing the data cache until all vector references have been sent to the external cache and all vector writes have caused any necessary invalidations of the data cache based on the first synchronization instruction.

Another aspect of the invention (e.g., useful for Lsync-type operations), in some embodiments, provides an apparatus that includes a first plurality of queues, including a first queue and a second queue, each of the first plurality of queues for holding a plurality of pending memory requests, means as described herein for inserting one or memory requests into at least one of the queues based on a first instruction that specifies a memory operation, means as described herein for, based on a second instruction that specifies a synchronization operation inserting a first synchronization marker into the first queue and inserting a second synchronization marker into the second queue, means as described herein for inserting one or memory requests into at least one of the queues based on a third instruction that specifies a memory operation, means as described herein for processing memory requests from the first queue, and means as described herein for selectively halting further processing of memory requests from the first queue based on the first synchronization marker reaching a predetermined point in the first queue until the corresponding second synchronization marker reaches a predetermined point in the second queue.

In some embodiments, the plurality of queues is within a first processor, and wherein the means for inserting to first queue operates for only vector memory requests and synchronizations, and the means for inserting to the second queue operates for only scalar memory requests and synchronizations.

In some embodiments, the first synchronization instruction is an Lsync-type instruction.

Another aspect of the invention (e.g., useful for Msync-type operations), in some embodiments, provides an apparatus that includes a first plurality of processors including a first processor and a second processor, a first plurality of queues, including a first queue for holding a plurality of pending memory requests from the first processor and a second queue for holding a plurality of pending memory requests from the second processor, wherein the first processor is operable to insert a first msync marker into the first queue and the second processor is operable to insert a second msync marker into the second queue, and a synchronization circuit, operatively coupled to the first plurality of queues, that halts processing of memory requests from the first queue based on the first msync marker reaching a predetermined location in the first queue until the corresponding second msync marker reaches a predetermined location in the second queue.

In some embodiments, each msync marker includes a processor-participation mask, and wherein the synchronization circuit checks the processor participation mask of the first msync marker against the processor participation mask in the second msync marker.

Some such embodiments further include a second plurality of queues, including a third queue and a fourth queue, within the first processor, and wherein the third queue is used for only vector memory requests and synchronizations, and the fourth queue is used for only scalar memory requests and synchronizations.

In some embodiments, the first msync marker is inserted into the first queue based on a first synchronization instruction that is an Msync-type instruction.

In some embodiments, the first msync marker is inserted into the first queue based on a first synchronization instruction that is an Msync-V-type instruction.

In some embodiments, for a second synchronization instruction, a corresponding synchronization marker is inserted to only the third queue.

In some embodiments, the second synchronization instruction is an Msync-V-type instruction.

Some embodiments further include a second synchronization circuit, operatively coupled to the second plurality of queues, that selectively halts further processing of memory requests from the third queue based on the first msync marker reaching a predetermined point in the third queue until a corresponding msync marker reaches a predetermined point in the fourth queue.

Some embodiments further include a fifth queue for holding a plurality of write data elements, wherein each write data element corresponds to a memory request in the first queue, and wherein the write data elements are loaded into the fifth queue decoupled from the loading of memory requests into the first queue.

Some embodiments further include a data cache internal to each one of the first plurality of processors, and an external cache, wherein the first msync marker is inserted into the first queue based on a first synchronization instruction that is an Msync-type instruction, and is held if the data cache in the first processor is currently in bypass mode due to an earlier msync.

Another aspect of the invention, in some embodiments, provides a method that includes providing a first plurality of processors including a first processor and a second processor, providing a first plurality of queues, including a first queue for holding a plurality of pending memory requests from the first processor and a second queue for holding a plurality of pending memory requests from the second processor, inserting a first msync marker into the first queue from the first processor, inserting a second msync marker into the second queue from the second processor, and halting further processing of memory requests from the first queue based on the first msync marker reaching a predetermined location in the first queue until the corresponding second msync marker reaches a predetermined location in the second queue.

In some embodiments, each msync marker includes a processor-participation mask, and the method further includes checking the processor participation mask of the first msync marker against the processor participation mask in the second msync marker, and causing special processing if the participation masks do not match.

Some embodiments further include providing a second plurality of queues, including a third queue and a fourth queue, within the first processor, inserting memory requests only if for vector accesses, and appropriate msync markers to the third queue, and inserting memory requests only if for scalar accesses, and appropriate msync markers to the fourth queue.

In some embodiments, the inserting of the first msync marker into the first queue based on a first synchronization instruction that is an Msync-type instruction.

In some embodiments, the inserting of the first msync marker into the first queue based on a first synchronization instruction that is an Msync-V-type instruction.

Some embodiments further include, based a second synchronization instruction, inserting a corresponding synchronization marker to only the third queue.

In some embodiments, the second synchronization instruction is an Msync-V-type instruction.

Some embodiments further include providing a second synchronization circuit, operatively coupled to the second plurality of queues, that selectively halts further processing of memory requests from the third queue based on the first msync marker reaching a predetermined point in the third queue until a corresponding msync marker reaches a predetermined point in the fourth queue.

Some embodiments further include providing a fifth queue for holding a plurality of write data elements, wherein each write data element corresponds to a memory request in the first queue, and loading the write data elements into the fifth queue in a manner that is decoupled from the loading of memory requests into the first queue.

Some embodiments further include providing a data cache internal to each one of the first plurality of processors, providing an external cache, wherein the first msync marker is inserted into the first queue based on a first synchronization instruction that is an Msync-type instruction, and holding further processing if the data cache in the first processor is currently in bypass mode due to an earlier msync.

Some embodiments further include preventing subsequent scalar references in each processor from accessing the data cache until all vector references have been sent to the external cache and all vector writes have caused any necessary invalidations of the data cache.

Yet another aspect of the invention, in some embodiments, provides an apparatus that includes a first plurality of processors including a first processor and a second processor, a first plurality of queues, including a first queue for holding a plurality of pending memory requests from the first processor and a second queue for holding a plurality of pending memory requests from the second processor, means as described herein for inserting a first msync marker into the first queue from the first processor, means as described herein for inserting a second msync marker into the second queue from the second processor, and means as described herein for halting further processing of memory requests from the first queue based on the first msync marker reaching a predetermined location in the first queue until the corresponding second msync marker reaches a predetermined location in the second queue.

Some embodiments further include means as described herein for checking the processor participation mask of the first msync marker against the processor participation mask in the second msync marker.

Some embodiments further include a second plurality of queues, including a third queue and a fourth queue, within the first processor, means as described herein for inserting memory requests but only if for vector accesses to the third queue, and means as described herein for inserting memory requests but only if for scalar accesses to the fourth queue.

Yet another aspect of the invention (e.g., useful for Gsync-type operations), in some embodiments, provides an apparatus that includes a first plurality of processors including a first processor and a second processor, a first plurality of queues, including a first queue for holding a plurality of pending memory requests from the first processor and a second queue for holding a plurality of pending memory requests from the second processor, wherein the first processor is operable to insert a first gsync marker into the first queue and the second processor is operable to insert a second gsync marker into the second queue, and a synchronization circuit, operatively coupled to the first plurality of queues, that halts processing of memory requests from the first queue based on the first gsync marker reaching a predetermined location in the first queue until the corresponding second gsync marker reaches a predetermined location in the second queue and until all outstanding prior memory accesses have completed, whichever is later.

In some embodiments, each gsync marker includes a processor-participation mask, and wherein the synchronization circuit checks the processor participation mask of the first gsync marker against the processor participation mask in the second gsync marker.

Some embodiments further include a second plurality of queues, including a third queue and a fourth queue, within the first processor, and wherein the third queue is used for only vector memory requests and synchronizations, and the fourth queue is used for only scalar memory requests and synchronizations.

In some embodiments, the first gsync marker is inserted into the first queue based on a first synchronization instruction that is an Gsync-type instruction. In some embodiments, for a second synchronization instruction, a corresponding synchronization marker is inserted to only the third queue.

In some embodiments, the second synchronization instruction is an Gsync-V-type instruction.

Some embodiments further include a second synchronization circuit, operatively coupled to the second plurality of queues, that selectively halts further processing of memory requests from the third queue based on the first gsync marker reaching a predetermined point in the third queue until a corresponding gsync marker reaches a predetermined point in the fourth queue.

Some embodiments further include a fifth queue for holding a plurality of write data elements, wherein each write data element corresponds to a memory request in the first queue, and wherein the write data elements are loaded into the fifth queue decoupled from the loading of memory requests into the first queue.

Some embodiments further include a data cache internal to each one of the first plurality of processors, and an external cache, wherein the first gsync marker is inserted into the first queue based on a first synchronization instruction that is an Gsync-type instruction, and is held if the data cache in the first processor is currently in bypass mode due to an earlier gsync.

Yet another aspect of the invention (e.g., useful for Gsync-type operations), in some embodiments, provides a method that includes providing a first plurality of processors including a first processor and a second processor, providing a first plurality of queues, including a first queue for holding a plurality of pending memory requests from the first processor and a second queue for holding a plurality of pending memory requests from the second processor, inserting a first gsync marker into the first queue from the first processor, inserting a second gsync marker into the second queue from the second processor, and halting further processing of memory requests from the first queue based on the first gsync marker reaching a predetermined location in the first queue until the corresponding second gsync marker reaches a predetermined location in the second queue and until all outstanding prior memory accesses have completed.

In some embodiments, each gsync marker includes a processor-participation mask, and the method further includes checking the processor participation mask of the first gsync marker against the processor participation mask in the second gsync marker, and causing special processing if the participation masks do not match.

Some embodiments further include providing a second plurality of queues, including a third queue and a fourth queue, within the first processor, inserting memory requests only if for vector accesses, and appropriate gsync markers to the third queue, and inserting memory requests only if for scalar accesses, and appropriate gsync markers to the fourth queue.

In some embodiments, the inserting of the first gsync marker into the first queue based on a first synchronization instruction that is an Gsync-type instruction.

Some embodiments further include based a second synchronization instruction, inserting a corresponding synchronization marker to only the third queue.

In some embodiments, the second synchronization instruction is an Gsync-V-type instruction.

Some embodiments further include providing a second synchronization circuit, operatively coupled to the second plurality of queues, that selectively halts further processing of memory requests from the third queue based on the first gsync marker reaching a predetermined point in the third queue until a corresponding gsync marker reaches a predetermined point in the fourth queue.

Some embodiments further include providing a fifth queue for holding a plurality of write data elements, wherein each write data element corresponds to a memory request in the first queue, and loading the write data elements into the fifth queue in a manner that is decoupled from the loading of memory requests into the first queue.

Some embodiments further include providing a data cache internal to each one of the first plurality of processors, providing an external cache, wherein the first gsync marker is inserted into the first queue based on a first synchronization instruction that is an Gsync-type instruction, and holding further processing if the data cache in the first processor is currently in bypass mode due to an earlier gsync.

Some embodiments further include preventing subsequent scalar references in each processor from accessing the data cache until all vector references have been sent to the external cache and all vector writes have caused any necessary invalidations of the data cache.

Yet another aspect of the invention (e.g., useful for Gsync-type operations), in some embodiments, provides an apparatus that includes a first plurality of processors including a first processor and a second processor, a first plurality of queues, including a first queue for holding a plurality of pending memory requests from the first processor and a second queue for holding a plurality of pending memory requests from the second processor, means as described herein for inserting a first gsync marker into the first queue from the first processor, means for inserting a second gsync marker into the second queue from the second processor, and means for halting further processing of memory requests from the first queue based on the first gsync marker reaching a predetermined location in the first queue until the corresponding second gsync marker reaches a predetermined location in the second queue and until all outstanding prior memory accesses have completed.

In some embodiments, each gsync marker includes a processor-participation mask, and the apparatus further includes means for checking the processor participation mask of the first gsync marker against the processor participation mask in the second gsync marker.

Some embodiments further include a second plurality of queues, including a third queue and a fourth queue, within the first processor, means for inserting memory requests but only if for vector accesses to the third queue, and means for inserting memory requests but only if for scalar accesses to the fourth queue.

In the above discussion, the term "computer" is defined to include any digital or analog data processing unit. Examples include any personal computer, workstation, set top box, mainframe, server, supercomputer, laptop or personal digital assistant capable of embodying the inventions described herein.

Examples of articles comprising computer readable media are floppy disks, hard drives, CD-ROM or DVD media or any other read-write or read-only memory device or network connection.

Portions of the above description have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

It is understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

What is claimed is:

1. An apparatus comprising:
    a memory interface;
    a plurality of queues connected to the memory interface, including a first queue and a second queue, wherein each of the plurality of queues holds pending memory requests and enforces an ordering in the commitment of the pending memory requests to memory;
    one or more instruction-processing circuits, wherein each instruction-processing circuit is operatively coupled through the plurality of queues to the memory interface and wherein each of the plurality of instruction-processing circuits inserts one or more memory requests into at least one of the queues based on a first memory operation instruction, inserts a first synchronization marker into the first queue and inserts a second synchronization marker into the second queue based on a synchronization operation instruction and inserts one or more memory requests into at least one of the queues based on a second memory operation instruction; and
    a first synchronization circuit, operatively coupled to the first plurality of queues, that selectively halts processing of further memory requests from the first queue based on the first synchronization marker reaching a predetermined point in the first queue until the corresponding second synchronization marker reaches a predetermined point in the second queue;
    wherein each of the memory requests is a memory reference, wherein the memory reference is generated as a result of instructions by the instruction-processing circuits,
    wherein the first queue is used for only synchronization markers and vector memory references, and the second queue is used for only synchronization markers and scalar memory references,
    wherein the synchronization operation instruction is an Lsync V,S-type instruction,
    wherein the instruction-processing circuits include a data cache and wherein the Lsync V,S-type instruction prevents subsequent scalar references from accessing the data cache until all vector references have been sent to an external cache and all vector writes have caused any necessary invalidations of the data cache.

2. The apparatus of claim 1, wherein, for a second synchronization operation instruction, a corresponding synchronization marker is inserted to in only the first queue.

3. The apparatus of claim 2, wherein the second synchronization instruction is an Lsync-type instruction.

4. The apparatus of claim 1, wherein the first queue includes two subqueues, including a first subqueue and a second subqueue, wherein the first subqueue is for holding the vector memory references and synchronization markers associated with the vector memory references and wherein the second subqueue is for holding a plurality of store data elements and synchronization markers associated with the store data elements, wherein each store data element in the second subqueue corresponds to a one of the memory requests in the first subqueue, and wherein the store data elements are loaded into the second subqueue decoupled from the loading of the memory requests into the first subqueue.

5. A method comprising:
    providing a memory interface;
    providing a plurality of queues connected to the memory interface, including a first queue and a second queue, wherein each of first plurality of queues holds pending memory requests and enforces an ordering in the commitment of the pending memory requests to memory;
    providing one or more instruction-processing circuits, wherein each instruction-processing circuit is operatively coupled through the plurality of queues to the memory interface;
    inserting one or more memory requests into at least one of the queues based on a first memory operation instruction executed in one of the instruction-processing circuits;
    inserting a first synchronization marker into the first queue and inserting a second synchronization marker into the second queue based on a synchronization operation instruction executed in one of the instruction-processing circuits;
    inserting one or more memory requests into at least one of the queues based on a second memory operation instruction based on a second memory operation instruction executed in one of the instruction-processing circuits;
    processing memory requests from the first queue; and
    selectively halting further processing of memory requests from the first queue based on the first synchronization marker reaching a predetermined point in the first queue until the corresponding second synchronization marker reaches a predetermined point in the second queue;
    wherein each of the memory requests is a memory reference,
    wherein the first queue stores only synchronization markers and vector memory references, and wherein the second queue stores only synchronization markers and scalar memory references,
    wherein the synchronization operation instruction is an Lsync V,S-type instruction,
    wherein providing the instruction processing circuits includes providing a data cache and wherein performing the Lsync V,S type instruction includes preventing subsequent scalar references from accessing the data cache until all vector references have been sent to an external cache and all vector writes have caused any necessary invalidations of the data cache.

6. The method of claim 5, wherein the first queue includes two subqueues, including a first subqueue and a second subqueue, wherein the first subqueue stores the vector memory references and synchronization markers associated with the vector memory references and wherein the second subqueue stores a plurality of store data elements and synchronization markers associated with the store data elements, wherein each store data element in the second subqueue corresponds to one of the memory requests in the first subqueue, and wherein the store data elements are inserted into the second subqueue decoupled from the inserting of the memory requests into the first subqueue.

7. An apparatus comprising:
a memory interface;
a plurality of queues connected to the memory interface, including a first queue and a second queue, wherein each of the plurality of queues holds pending memory requests and enforces an ordering in the commitment of the pending memory requests to memory;
one or more instruction-processing circuits, wherein each instruction-processing circuit is operatively coupled through the plurality of queues to the memory interface and wherein each of the plurality of instruction-processing circuits includes:
means for inserting one or more memory requests into at least one of the queues based on a first memory operation instruction executed in one of the instruction-processing circuits;
means for inserting a first synchronization marker into the first queue and inserting a second synchronization marker into the second queue based on a synchronization operation instruction executed in one of the instruction-processing circuits;
means for inserting one or more memory requests into at least one of the queues based on a second memory operation instruction based on a second memory operation instruction executed in one of the instruction-processing circuits;
means for processing memory requests from the first queue;
and means for selectively halting further processing of memory requests from the first queue based on the first synchronization marker reaching a predetermined point in the first queue until the corresponding second synchronization marker reaches a predetermined point in the second queue;
wherein each of the memory requests is a memory reference,
wherein means for inserting to the first queue operates for only vector memory requests and synchronizations, and means for inserting to the second queue operates for only scalar memory requests and synchronizations,
wherein the synchronization operation instruction is an Lsync V,S-type instruction,
wherein the instruction-processing circuits include a data cache and wherein the Lsync V,S-type instruction prevents subsequent scalar references from accessing the data cache until all vector references have been sent to an external cache and all vector writes have caused any necessary invalidations of the data cache.

8. A system comprising:
a plurality of processors, including a first processor and a second processor, wherein each of the processors includes:
a memory interface;
a plurality of Lsync queues connected to the memory interface, including a first Lsync queue and a second Lsync queue,
wherein each of the plurality of Lsync queues holds pending memory requests and enforces an ordering in the commitment of the pending memory requests to memory;
one or more instruction-processing circuits, wherein each instruction-processing circuit is operatively coupled through the plurality of Lsync queues to the memory interface and wherein each of the plurality of instruction-processing circuits inserts one or more memory requests into at least one of the Lsync queues based on a first memory operation instruction, inserts a first Lsync synchronization marker into the first Lsync queue and inserts a second Lsync synchronization marker into the second Lsync queue based on a synchronization operation instruction, and inserts one or more memory requests into at least one of the Lsync queues based on a second memory operation instruction; and
a Lsync synchronization circuit, operatively coupled to the plurality of Lsync queues, that selectively halts processing of further memory requests from the first Lsync queue based on the first Lsync synchronization marker reaching a predetermined point in the first Lsync queue until the corresponding second Lsync synchronization marker reaches a predetermined point in the second Lsync queue; and
one or more Msync circuits, wherein each of the Msync circuits is connected to the plurality of processors and wherein each of the Msync circuits includes:
a plurality of Msync queues, including a first Msync queue and a second Msync queue, each of the plurality of Msync queues for holding a plurality of pending memory requests received from the Lsync queues, wherein the first Msync queue stores only Msync synchronization markers and memory requests from the first processor, and the second Msync queue stores only Msync synchronization markers and memory requests from the second processor; and
an Msync synchronization circuit, operatively coupled to the plurality of Msync queues, that selectively halts further processing of the memory requests from the first Msync queue based on an Msync synchronization marker reaching a predetermined point in the first Msync queue until a corresponding Msync synchronization marker from the second processor reaches a predetermined point in the second Msync queue;
wherein each of the memory requests is a memory reference, wherein the memory reference is generated as a result of execution of instructions by instruction-processing circuits in each processor,
wherein each processor includes a data cache and wherein each Msync synchronization circuit includes an external cache, wherein the data cache and the external cache are used to perform an Lsync V,S type instruction, wherein the Lsync V,S type instruction prevents subsequent scalar references from accessing the data cache until all vector references have been sent to the external cache in a corresponding Msync synchronization circuit and all vector writes have caused any necessary invalidations of the data cache.

9. The system of claim 8, wherein the Msync synchronization circuit includes a plurality of stall lines, wherein each of the stall lines is connected to one of the plurality of Msync queues and wherein each of the stall lines is for halting further processing of the memory requests from a corresponding Msync queue.

10. A method comprising:
providing a plurality of processors, including a first processor and a second processor, wherein each of the processors includes a memory interface, a plurality of Lsync queues connected to the memory interface, including a first Lsync queue and a second Lsync queue, wherein each of the plurality of Lsync queues holds pending memory requests and enforces an ordering in the commitment of the pending memory requests to memory, and one or more instruction-processing circuits, each of the instruction-processing circuits operatively coupled through the plurality of Lsync queues to the memory interface;

providing one or more Msync circuits, wherein each of the Msync circuits is connected to the plurality of processors and wherein each of the Msync circuits includes a plurality of Msync queues, including a first Msync queue and a second Msync queue, each of the plurality of Msync queues operatively coupled to the plurality of Lsync queues in one of the plurality of processors;

inserting one or more memory requests into at least one of the Lsync queues based on a first memory operation instruction executed in one of the instruction-processing circuits;

inserting a first Lsync synchronization marker into the first Lsync queue and inserting a second Lsync synchronization marker into the second Lsync queue based on a synchronization operation instruction executed in one of the instruction-processing circuits;

inserting one or more memory requests into at least one of the Lsync queues based on a second memory operation instruction executed in one of the instruction-processing circuits; processing memory requests from the first Lsync queue; selectively halting further processing of memory requests from the first Lsync queue based on the first Lsync synchronization marker reaching a predetermined point in the first Lsync queue until the corresponding second Lsync synchronization marker reaches a predetermined point in the second Lsync queue, inserting Msync synchronization markers and memory requests received from the Lsync queues in the first processor into the first Msync queue;

inserting Msync synchronization markers and memory requests received from the Lsync queues in the second processor into the second Msync queue; and selectively halting further processing of the memory requests from the first Msync queue based on an Msync synchronization marker reaching a predetermined point in the first Msync queue until a corresponding Msync synchronization marker from the second processor reaches a predetermined point in the second Msync queue;

wherein each of the memory requests is a memory reference, wherein selectively halting further processing of memory requests from the first Lsync queue includes performing an Lsync V,S type instruction, wherein performing the Lsync V,S type instruction includes preventing subsequent scalar references from accessing a data cache in the processor until all vector references have been sent to an external cache in a corresponding Msync synchronization circuit and all vector writes have caused any necessary invalidations of the data cache.

11. The method of claim 10, wherein selectively halting further processing of the memory requests from the first Msync queue includes sending a stall signal to the Msync queues.

* * * * *

UNITED STATES PATENT AND TRADEMARK OFFICE
CERTIFICATE OF CORRECTION

| | | |
|---|---|---|
| PATENT NO. | : 7,437521 B1 | Page 1 of 10 |
| APPLICATION NO. | : 10/643741 | |
| DATED | : October 14, 2008 | |
| INVENTOR(S) | : Scott et al. | |

It is certified that error appears in the above-identified patent and that said Letters Patent is hereby corrected as shown below:

Title Page; item (56);
On page 2, under "Other Publications", in column 2, line 13, delete "dimenstional" and insert -- dimensional --, therefor.

On page 2, under "Other Publications", in column 2, line 47, delete "Journakl" and insert -- Journal --, therefor.

On page 3, under "Other Publications", in column 1, line 13, before "Architectures" delete "Parallel".

On page 3, under "Other Publications", in column 1, line 41, delete "Spacial" and insert -- Spatial --, therefor.

On page 3, under "Other Publications", in column 2, line 50, after "Office" insert -- Action --.

On page 3, under "Other Publications", in column 2, line 52, after "Office" insert -- Action --.

On page 4, under "Other Publications", in column 2, line 52, delete "OARN" and insert -- NOAR --, therefor.

On page 4, under "Other Publications", in column 2, line 53, delete "AL1owance" and insert -- Allowance --, therefor.

In column 8, line 13, delete "useg" and insert -- used --, therefor.

In column 9, line 23, delete "$[Aj]_2$" and insert -- $[Aj]^2$ --, therefor.

In column 9, line 40, delete "and exclusive" and insert -- and-exclusive --, therefor.

In column 14, line 26, delete "LClk" and insert -- Lclk --, therefor.

In column 14, line 55, delete "VS118" and insert -- VS 118 --, therefor.

In column 16, line 13, delete "LCLK." and insert -- Lclk. --, therefor.

In column 17, line 8, delete "LCLK," and insert -- Lclk, --, therefor.

UNITED STATES PATENT AND TRADEMARK OFFICE
CERTIFICATE OF CORRECTION

PATENT NO.        : 7,437521 B1
APPLICATION NO. : 10/643741
DATED             : October 14, 2008
INVENTOR(S)       : Scott et al.

It is certified that error appears in the above-identified patent and that said Letters Patent is hereby corrected as shown below:

In column 18, line 59, delete "LCLK." and insert -- Lclk. --, therefor.

In column 18, line 64, delete "LCLK" and insert -- Lclk --, therefor.

In column 19, line 4, delete "LCLK." and insert -- Lclk. --, therefor.

In column 19, line 10, delete "LCLK." and insert -- Lclk. --, therefor.

In column 19, line 17, delete "LCLK." and insert -- Lclk. --, therefor.

In column 20, line 40, delete "LCLK" and insert -- Lclk --, therefor.

In column 20, line 40, delete "v issues" and insert -- vissues --, therefor.

In column 20, line 41, delete "LCLK." and insert -- Lclk. --, therefor.

In column 20, line 49, delete "LClk" and insert -- Lclk --, therefor.

In column 21, line 22, delete "LCLK." and insert -- Lclk. --, therefor.

In column 21, line 26, delete "LCLK." and insert -- Lclk. --, therefor.

In column 21, line 60, delete "LCLK" and insert -- Lclk --, therefor.

In column 21, line 61, delete "LCLK." and insert -- Lclk --, therefor.

In column 22, line 5, delete "LCLK." and insert -- Lclk. --, therefor.

In column 22, line 7, delete "LCLK." and insert -- Lclk. --, therefor.

In column 22, line 15, delete "LCLK." and insert -- Lclk. --, therefor.

In column 23, line 19, delete "LCLK" and insert -- Lclk --, therefor.

In column 23, line 20, delete "LCLK," and insert -- Lclk, --, therefor.

In column 23, line 31, delete "LCLK." and insert -- Lclk. --, therefor.

UNITED STATES PATENT AND TRADEMARK OFFICE
CERTIFICATE OF CORRECTION

| | | |
|---|---|---|
| PATENT NO. | : 7,437521 B1 | Page 3 of 10 |
| APPLICATION NO. | : 10/643741 | |
| DATED | : October 14, 2008 | |
| INVENTOR(S) | : Scott et al. | |

It is certified that error appears in the above-identified patent and that said Letters Patent is hereby corrected as shown below:

In column 23, line 51, delete "(VMAP0_VMAP31)" and insert -- (VMAP0-VMAP31) --, therefor.

In column 24, line 42, delete "LCLK" and insert -- Lclk --, therefor.

In column 24, line 43, delete "LCLK" and insert -- Lclk --, therefor.

In column 24, line 48, delete "LCLK" and insert -- Lclk --, therefor.

In column 24, line 54, delete "LCLK" and insert -- Lclk --, therefor.

In column 24, line 59, delete "LCLK" and insert -- Lclk --, therefor.

In column 24, line 63, delete "LCLK" and insert -- Lclk --, therefor.

In column 24, line 65, delete "LCLK" and insert -- Lclk --, therefor.

In column 25, line 3, delete "LClk" and insert -- Lclk --, therefor.

In column 25, line 8, delete "LClk" and insert -- Lclk --, therefor.

In column 25, line 32, delete "LClk" and insert -- Lclk --, therefor.

In column 25, line 32, delete "v issues" and insert -- vissues --, therefor.

In column 25, line 35, delete "LClk." and insert -- Lclk. --, therefor.

In column 25, line 41, delete "LClk" and insert -- Lclk --, therefor.

In column 25, line 45, delete "(VBFlage)" and insert -- (VBFlag) --, therefor.

In column 25, line 54, delete "VBFlag" and insert -- VBFlag --, therefor.

In column 26, line 8, delete "LClk." and insert -- Lclk. --, therefor.

In column 26, line 12, delete "LClk." and insert -- Lclk. --, therefor.

UNITED STATES PATENT AND TRADEMARK OFFICE
CERTIFICATE OF CORRECTION

| | |
|---|---|
| PATENT NO. | : 7,437521 B1 |
| APPLICATION NO. | : 10/643741 |
| DATED | : October 14, 2008 |
| INVENTOR(S) | : Scott et al. |

It is certified that error appears in the above-identified patent and that said Letters Patent is hereby corrected as shown below:

In column 26, line 41, delete "LClks" and insert -- Lclks --, therefor.

In column 26, line 41, after "two" delete "LClks." and insert -- Lclks. --, therefor.

In column 26, line 51, delete "LClk." and insert -- Lclk. --, therefor.

In column 27, line 3, after "instructions" insert -- . --.

In column 27, line 60, delete "LClk." and insert -- Lclk. --, therefor.

In column 28, line 9, delete "LClk." and insert -- Lclk. --, therefor.

In column 28, line 19, delete "LClk." and insert -- Lclk. --, therefor.

In column 28, line 31, delete "LClk." and insert -- Lclk. --, therefor.

In column 28, line 33, delete "LClk," and insert -- Lclk, --, therefor.

In column 28, line 34, delete "LClk" and insert -- Lclk --, therefor.

In column 28, line 62, delete "VBFlag" and insert -- VBFlag --, therefor.

In column 28, line 63, delete "LClk." and insert -- Lclk. --, therefor.

In column 29, line 9, delete "LClk." and insert -- Lclk. --, therefor.

In column 29, line 18, delete "LClk" and insert -- Lclk --, therefor.

In column 29, line 24, delete "LClk." and insert -- Lclk. --, therefor.

In column 29, line 32, delete "(VTLB0_VTLB3)" and insert -- (VTLB0-VTLB3) --, therefor.

In column 30, line 42, delete "VMS126." and insert -- VMS 126. --, therefor.

In column 30, line 58, delete "(LBUF0_LBUF7)" and insert -- (LBUF0-LBUF7) --, therefor.

UNITED STATES PATENT AND TRADEMARK OFFICE
CERTIFICATE OF CORRECTION

PATENT NO.         : 7,437521 B1
APPLICATION NO.    : 10/643741
DATED              : October 14, 2008
INVENTOR(S)        : Scott et al.

It is certified that error appears in the above-identified patent and that said Letters Patent is hereby corrected as shown below:

In column 31, line 23, delete "VBFlag" and insert -- VBFlag --, therefor.

In column 31, line 55, delete "LCLK" and insert -- Lclk --, therefor.

In column 31, line 62, delete "LCLK." and insert -- Lclk. --, therefor.

In column 32, line 6, delete "fourVTLBs" and insert -- four VTLBs --, therefor.

In column 32, line 6, delete "(VTLB0_VTLB3)." and insert -- (VTLB0-VTLB3). --, therefor.

In column 32, line 64, delete "EFU" and insert -- EIU --, therefor.

In column 33, line 3, delete "(6.5)" and insert -- (6 . . . 5) --, therefor.

In column 33, line 23, delete "LClk," and insert -- Lclk, --, therefor.

In column 33, line 29, delete "LClk." and insert -- Lclk. --, therefor.

In column 37, line 3, delete "LClk" and insert -- Lclk --, therefor.

In column 37, line 10, delete "LClk." and insert -- Lclk. --, therefor.

In column 37, line 14, delete "LClk," and insert -- Lclk, --, therefor.

In column 38, line 16, delete "Q1240." and insert -- Q1 240. --, therefor.

In column 38, line 43, delete "Instruction Processing" and insert
-- Instruction-Processing --, therefor.

In column 39, line 61, delete "Lsync V,S" and insert -- Lsync V, S --, therefor.

In column 40, line 5, delete "Lsync_V_s" and insert -- Lsync_v_s --, therefor.

UNITED STATES PATENT AND TRADEMARK OFFICE
CERTIFICATE OF CORRECTION

| | | |
|---|---|---|
| PATENT NO. | : 7,437521 B1 | |
| APPLICATION NO. | : 10/643741 | |
| DATED | : October 14, 2008 | |
| INVENTOR(S) | : Scott et al. | |

It is certified that error appears in the above-identified patent and that said Letters Patent is hereby corrected as shown below:

In column 40, line 11, delete "lsync_V_s_flag" and insert -- lsync_v_s_flag --, therefor.

In column 41, line 27, delete "theVU" and insert -- the VU --, therefor.

In column 41, line 28, delete "V 113" and insert -- VU 113 --, therefor.

In column 41, line 42, delete "sendsthe" and insert -- sends the --, therefor.

In column 41, line 42, delete "V 113" and insert -- VU 113 --, therefor.

In column 41, line 54, delete "I Msync" and insert -- Msync --, therefor.

In column 46, lines 43-44, delete ""Timeouts"" and insert -- "Time-outs" --, therefor.

In column 48, line 14, delete "thatfollow" and insert -- that follow --, therefor.

In column 60, line 57, delete "newval (ValueAR(i, L)" and insert -- newval(ValueAR(i, L) --, therefor.

In column 61, line 41, delete "is" and insert -- 1s --, therefor.

In column 61, line 51, delete "0000" and insert -- 000 --, therefor.

In column 64, line 54, delete "S type" and insert -- S-type --, therefor.

In column 65, line 48, delete "S type" and insert -- S-type --, therefor.

In column 68, line 38, delete "gsync" and insert -- Gsync --, therefor.

In column 68, line 39, delete "gsync" and insert -- Gsync --, therefor.

In column 68, line 42, delete "gsync" and insert -- Gsync --, therefor.

In column 68, line 44, delete "gsync" and insert -- Gsync --, therefor.

UNITED STATES PATENT AND TRADEMARK OFFICE
CERTIFICATE OF CORRECTION

| | |
|---|---|
| PATENT NO. | : 7,437521 B1 |
| APPLICATION NO. | : 10/643741 |
| DATED | : October 14, 2008 |
| INVENTOR(S) | : Scott et al. |

It is certified that error appears in the above-identified patent and that said Letters Patent is hereby corrected as shown below:

In column 68, line 48, delete "gsync" and insert -- Gsync --, therefor.

In column 68, line 51, delete "gsync" and insert -- Gsync --, therefor.

In column 68, line 52, delete "gsync" and insert -- Gsync --, therefor.

In column 68, line 59, delete "gsync" and insert -- Gsync --, therefor.

In column 69, line 2, delete "gsync" and insert -- Gsync --, therefor.

In column 69, line 4, delete "gsync" and insert -- Gsync --, therefor.

In column 69, line 14, delete "gsync" and insert -- Gsync --, therefor.

In column 69, line 17, delete "gsync." and insert -- Gsync. --, therefor.

In column 69, line 25, delete "gsync" and insert -- Gsync --, therefor.

In column 69, line 27, delete "gsync" and insert -- Gsync --, therefor.

In column 69, line 29, delete "gsync" and insert -- Gsync --, therefor.

In column 69, line 31, delete "gsync" and insert -- Gsync --, therefor.

In column 69, line 34, delete "gsync" and insert -- Gsync --, therefor.

In column 69, line 39, delete "gsync" and insert -- Gsync --, therefor.

In column 69, line 43, delete "gsync" and insert -- Gsync --, therefor.

In column 69, line 45, delete "gsync" and insert -- Gsync --, therefor.

In column 69, line 47, delete "gsync" and insert -- Gsync --, therefor.

In column 69, line 58, delete "gsync" and insert -- Gsync --, therefor.

In column 69, line 60, delete "gsync" and insert -- Gsync --, therefor.

UNITED STATES PATENT AND TRADEMARK OFFICE
CERTIFICATE OF CORRECTION

PATENT NO. : 7,437521 B1
APPLICATION NO. : 10/643741
DATED : October 14, 2008
INVENTOR(S) : Scott et al.

It is certified that error appears in the above-identified patent and that said Letters Patent is hereby corrected as shown below:

In column 70, line 3, delete "gsync" and insert -- Gsync --, therefor.

In column 70, line 7, delete "gsync." and insert -- Gsync. --, therefor.

In column 70, line 21, delete "gsync" and insert -- Gsync --, therefor.

In column 70, line 22, delete "gsync" and insert -- Gsync --, therefor.

In column 70, line 25, delete "gsync" and insert -- Gsync --, therefor.

In column 70, line 27, delete "gsync" and insert -- Gsync --, therefor.

In column 70, line 30, delete "gsync" and insert -- Gsync --, therefor.

In column 70, line 34, delete "gsync" and insert -- Gsync --, therefor.

In column 71, line 42, in Claim 1, delete "instruction" and insert -- instruction, --, therefor.

In column 71, line 46, in Claim 1, before "plurality" delete "first".

In column 71, line 54, in Claim 1, after "of" insert -- execution of --.

In column 72, line 23, in Claim 5, before "plurality" delete "first".

In column 72, line 37, in Claim 5, delete "circuits;" and insert -- circuits; and --, therefor.

In column 72, line 40, in Claim 5, after "tion" delete "based on a second memory operation instruction".

In column 72, line 56, in Claim 5, delete "instruction processing" and insert -- instruction-processing --, therefor.

In column 72, line 58, in Claim 5, delete "S type" and insert -- S-type --, therefor.

In column 73, lines 31-32, in Claim 7, after "instruction" delete "based on a second memory operation instruction".

UNITED STATES PATENT AND TRADEMARK OFFICE
CERTIFICATE OF CORRECTION

| | | |
|---|---|---|
| PATENT NO. | : 7,437521 B1 | |
| APPLICATION NO. | : 10/643741 | |
| DATED | : October 14, 2008 | |
| INVENTOR(S) | : Scott et al. | |

It is certified that error appears in the above-identified patent and that said Letters Patent is hereby corrected as shown below:

In column 73, lines 61-67, in Claim 8, delete "a plurality of Lsync queues connected to the memory interface, including a first Lsync queue and a second Lsync queue,
  wherein each of the plurality of Lsync queues holds pending memory requests and enforces an ordering in the commitment of the pending memory requests to memory;" and insert -- a plurality of Lsync queues connected to the memory interface, including a first Lsync queue and a second Lsync queue, wherein each of the plurality of Lsync queues holds pending memory requests and enforces an ordering in the commitment of the pending memory requests to memory; --, therefor.

In column 74, line 49, in Claim 8, delete "S type" and insert -- S-type --, therefor.

In column 74, line 50, in Claim 8, delete "S type" and insert -- S-type --, therefor.

In columns 75-76, lines 25-32 and lines 1-3, in Claim 10, delete "inserting one or more memory requests into at least one of the Lsync queues based on a
  second memory operation instruction executed in one of the
instruction-processing circuits; processing memory requests from the first Lsync queue; selectively halting further processing of memory requests from the first Lsync queue based on the first Lsyne synchronization marker reaching a predetermined point in the first Lsync queue until the corresponding second Lsync synchronization marker reaches a predetermined point in the second Lsync queue," and insert -- inserting one or more memory requests into at least one of the Lsync queues based on a second memory operation instruction executed in one of the instruction-processing circuits;
  processing memory requests from the first Lsync queue;
selectively halting further processing of memory requests from the first Lsync queue based on the first Lsync synchronization marker reaching a predetermined point in the first Lsync queue until the corresponding second Lsync synchronization marker reaches a predetermined point in the second Lsync queue; --, therefor.

UNITED STATES PATENT AND TRADEMARK OFFICE
CERTIFICATE OF CORRECTION

PATENT NO. : 7,437521 B1
APPLICATION NO. : 10/643741
DATED : October 14, 2008
INVENTOR(S) : Scott et al.

It is certified that error appears in the above-identified patent and that said Letters Patent is hereby corrected as shown below:

In column 76, line 21, in Claim 10, delete "S type" and insert -- S-type --, therefor.

In column 76, line 22, in Claim 10, delete "S type" and insert -- S-type --, therefor.

Signed and Sealed this

Tenth Day of March, 2009

JOHN DOLL
*Acting Director of the United States Patent and Trademark Office*